United States Patent
Stevenson et al.

(10) Patent No.: US 10,654,007 B2
(45) Date of Patent: May 19, 2020

(54) WINE BOTTLE AERATOR

(71) Applicants: Robert A. Stevenson, Canyon Country, CA (US); Wendy L. Stevenson, Canyon Country, CA (US); Jennifer L. Stevenson, Newbury Park, CA (US); Ryan A. Stevenson, Woodinville, WA (US); Douglas Frederick Widney, Corte Madera, CA (US)

(72) Inventors: Robert A. Stevenson, Canyon Country, CA (US); Wendy L. Stevenson, Canyon Country, CA (US); Jennifer L. Stevenson, Newbury Park, CA (US); Ryan A. Stevenson, Woodinville, WA (US); Douglas Frederick Widney, Corte Madera, CA (US)

(73) Assignees: Robert A. Stevenson, Santa Clarita, CA (US); Wendy L. Stevenson, Santa Clarita, CA (US)

( * ) Notice: Subject to any disclaimer, the term of this patent is extended or adjusted under 35 U.S.C. 154(b) by 76 days.

(21) Appl. No.: 15/230,716

(22) Filed: Aug. 8, 2016

(65) Prior Publication Data

US 2016/0339398 A1 Nov. 24, 2016

Related U.S. Application Data

(63) Continuation-in-part of application No. 15/089,582, filed on Apr. 3, 2016, now Pat. No. 9,440,199, which
(Continued)

(51) Int. Cl.
*B01F 3/04* (2006.01)
*C12H 1/14* (2006.01)
(Continued)

(52) U.S. Cl.
CPC ...... *B01F 3/04794* (2013.01); *B01F 3/04262* (2013.01); *B01F 3/04801* (2013.01);
(Continued)

(58) Field of Classification Search
CPC .......... B01F 2215/0072; B01F 3/04794; B01F 15/00519; B01F 3/04262; B01F 13/002;
(Continued)

(56) References Cited

U.S. PATENT DOCUMENTS 2,680,010 A * 6/1954 Dubay ................... B05B 11/06
261/124
3,309,067 A 3/1967 Brewster
(Continued)

FOREIGN PATENT DOCUMENTS

GB 399352 * 10/1933
GB 498536 * 1/1939

OTHER PUBLICATIONS

Wikipedia "Gasket" published Oct. 8, 2012 accessed at <https://en.wikipedia.org/w/index.php?title=Gasket&oldid=516616155>.*
(Continued)

*Primary Examiner* — Stephen Hobson
(74) *Attorney, Agent, or Firm* — Hackler Daghighian Martino & Novak

(57) ABSTRACT

An aeration assembly for aerating liquids including wine and other alcoholic beverages includes an expansion chamber and an aerating device. The expansion chamber is configured to be in fluid communication with an inside of the uncorked and/or opened bottle when engaged by a bottom portion of the expansion chamber. The aerating device comprises a gas conduit having a proximal end in fluid communication with a distal end. The distal end is disposable below the bottom portion of the expansion chamber. A gas source is in fluid communication with the proximal end
(Continued)

of the gas conduit. The expansion chamber is configured to temporarily contain an expansion of bubbles during an aeration process. The expansion chamber and aerating device are not permanently connected, wherein the aerating device can be fully removed from the expansion chamber before, during or after the aeration process.

44 Claims, 68 Drawing Sheets

Related U.S. Application Data is a continuation-in-part of application No. 14/294,157, filed on Jun. 3, 2014, now Pat. No. 9,321,019, application No. 15/230,716, which is a continuation-in-part of application No. 15/089,584, filed on Apr. 3, 2016, now Pat. No. 9,579,612, which is a continuation-in-part of application No. 14/294,157, filed on Jun. 3, 2014, now Pat. No. 9,321,019.

(51) Int. Cl.
*B01F 13/00* (2006.01)
*B01F 15/00* (2006.01)

(52) U.S. Cl.
CPC ...... *B01F 13/002* (2013.01); *B01F 15/00519* (2013.01); *C12H 1/14* (2013.01); *B01F 2003/049* (2013.01); *B01F 2003/04872* (2013.01); *B01F 2003/04879* (2013.01); *B01F 2215/0072* (2013.01)

(58) Field of Classification Search
CPC ............ B01F 3/04801; B01F 2003/049; B01F 2003/04879; B01F 2003/04872; C12H 1/14
See application file for complete search history.

(56) References Cited

U.S. PATENT DOCUMENTS

| | | | | |
|---|---|---|---|---|
| 3,549,051 | A * | 12/1970 | Bencic | B67D 1/0027 222/129.2 |
| 4,494,452 | A * | 1/1985 | Barzso | B01F 3/04794 261/122.1 |
| 4,763,803 | A | 8/1988 | Schneider | |
| 4,785,724 | A * | 11/1988 | Vassallo | B01F 3/04794 261/124 |
| 5,095,710 | A * | 3/1992 | Black | A23G 9/045 62/136 |
| 5,154,112 | A * | 10/1992 | Wettern | B01F 3/04794 215/228 |
| 2,408,306 | A | 4/1994 | Flournoy | |
| 5,595,104 | A * | 1/1997 | Delaplaine | B01F 3/04794 261/124 |
| 6,568,660 | B1 | 5/2003 | Flanbaum | |
| 8,561,970 | B1 * | 10/2013 | Mills | B01F 13/002 261/124 |
| 8,567,305 | B2 * | 10/2013 | Bregman | B01F 3/04262 261/122.1 |
| D701,080 | S | 3/2014 | Mills et al. | |
| D701,081 | S | 3/2014 | Mills et al. | |
| D705,004 | S * | 5/2014 | Mills | D7/300.2 |
| D716,661 | S | 11/2014 | Dubitsky et al. | |
| 9,168,495 | B2 * | 10/2015 | Connors | B01F 3/04262 |
| 9,283,526 | B2 * | 3/2016 | Smith | B01F 3/04751 |
| 9,321,018 | B2 | 4/2016 | Connors | |
| 9,321,019 | B2 | 4/2016 | Stevenson et al. | |
| 9,795,934 | B2 * | 10/2017 | Connors | B01F 3/04794 |
| 2010/0258509 | A1 * | 10/2010 | Iwaki | B01F 3/04539 210/749 |
| 2011/0297006 | A1 * | 12/2011 | Belcher | B01F 3/04262 99/323.1 |
| 2013/0292857 | A1 * | 11/2013 | Connors | B01F 3/04241 261/30 |
| 2014/0065266 | A1 * | 3/2014 | Shalev | A47J 31/4403 426/89 |
| 2014/0242241 | A1 * | 8/2014 | Chen | B67D 1/0085 426/474 |

OTHER PUBLICATIONS

Wikipedia "Counterbore" published Oct. 4, 2012 accessed at <https://en.wikipedia.org/w/index.php?title=Counterbore&oldid=516021455>.*
RS "Peltier effect heat pumps" published Mar. 1999.*
Sensidyne "Gilian 5000" published Jul. 2012.*
Dcminatl Amazon review (Year: 2015).*
Brilliant "Math of soap bubbles and honeycombs" (Year: 2019).*
Wikipedia "Gasket" published Oct. 8, 2012 accessed at <https://en.wikipedia.org/w/index.php?title=Gasket&oldid=516616155> (Year : 2012).*
Wikipedia "Counterbore" published Oct. 4, 2012 accessed at <https://en.wikipedia.org/w/index.php?title=Counterbore&oldid=516021455> (Year: 2012).*
RS "Peltier effect heat pumps" published Mar. 1999 (Year: 1999).*
Sensidyne "Gilian 5000" published Jul. 2012 (Year: 2012).*

* cited by examiner

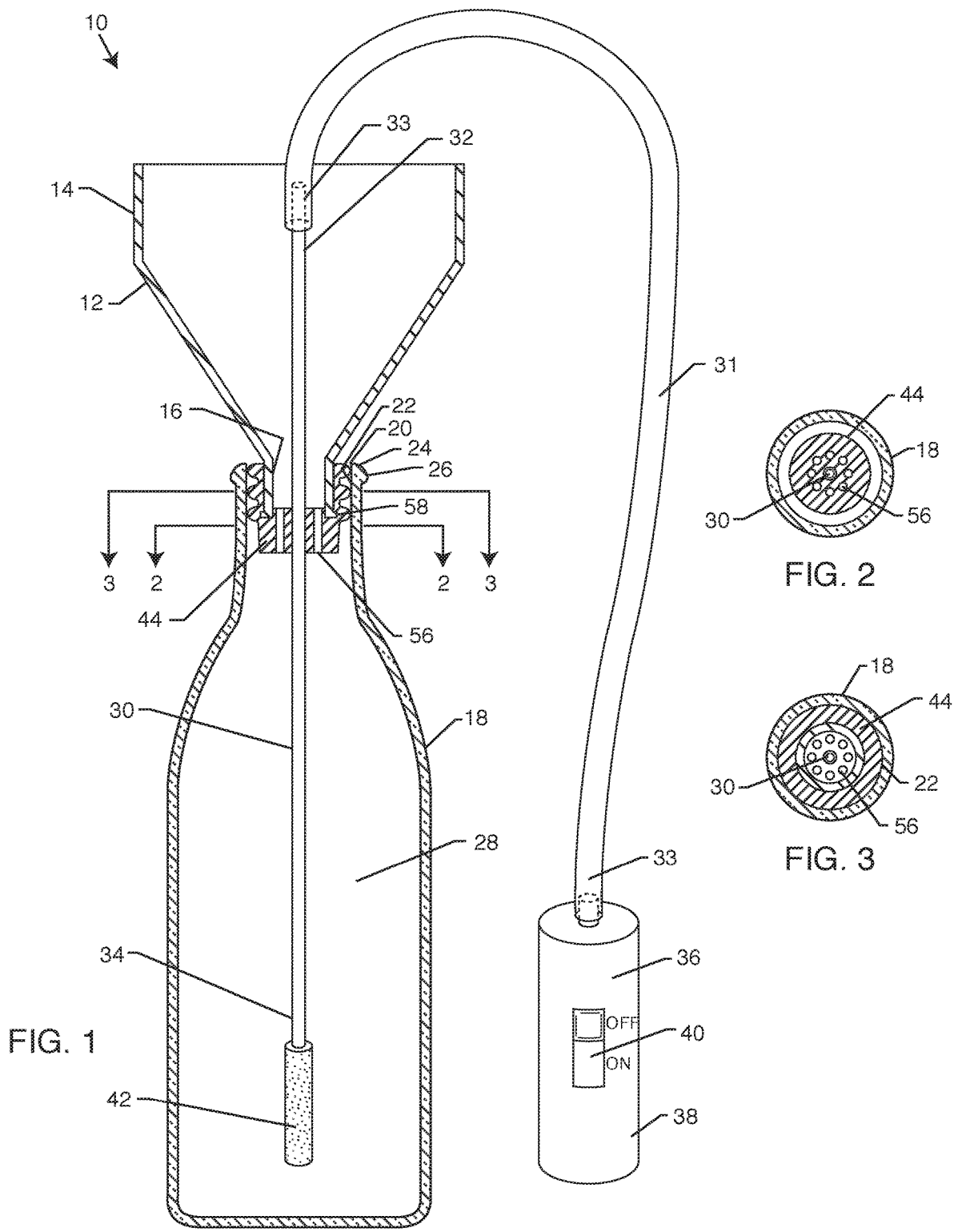

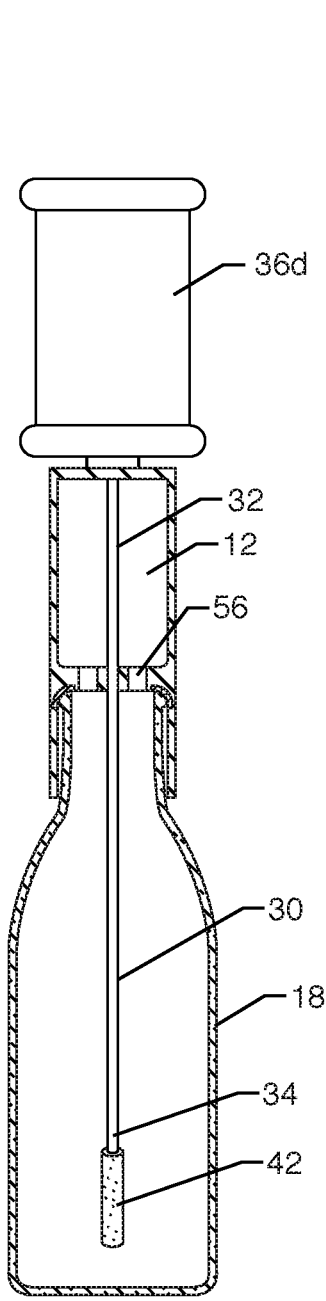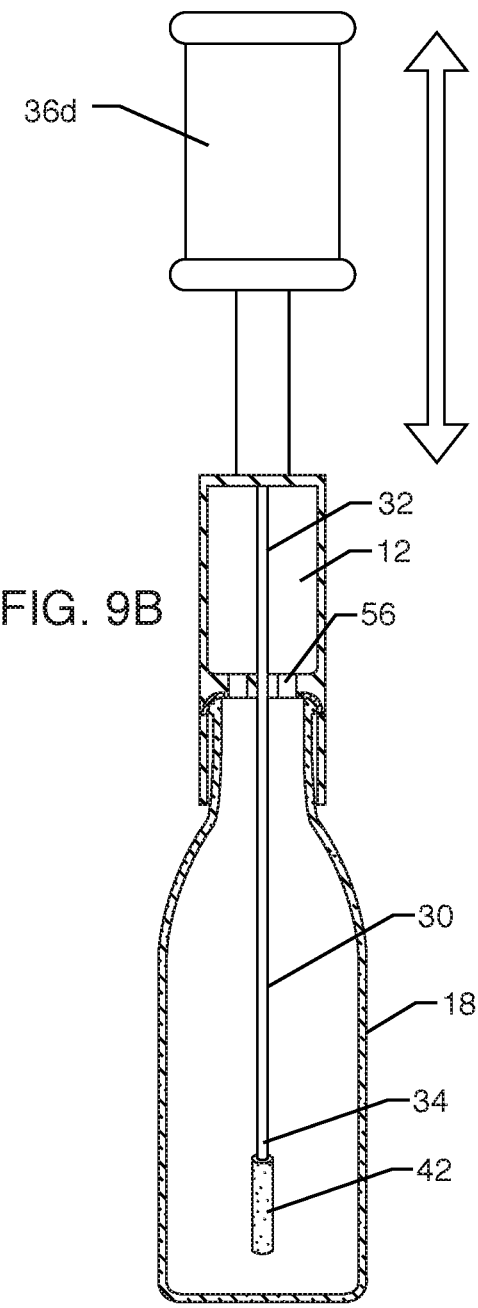

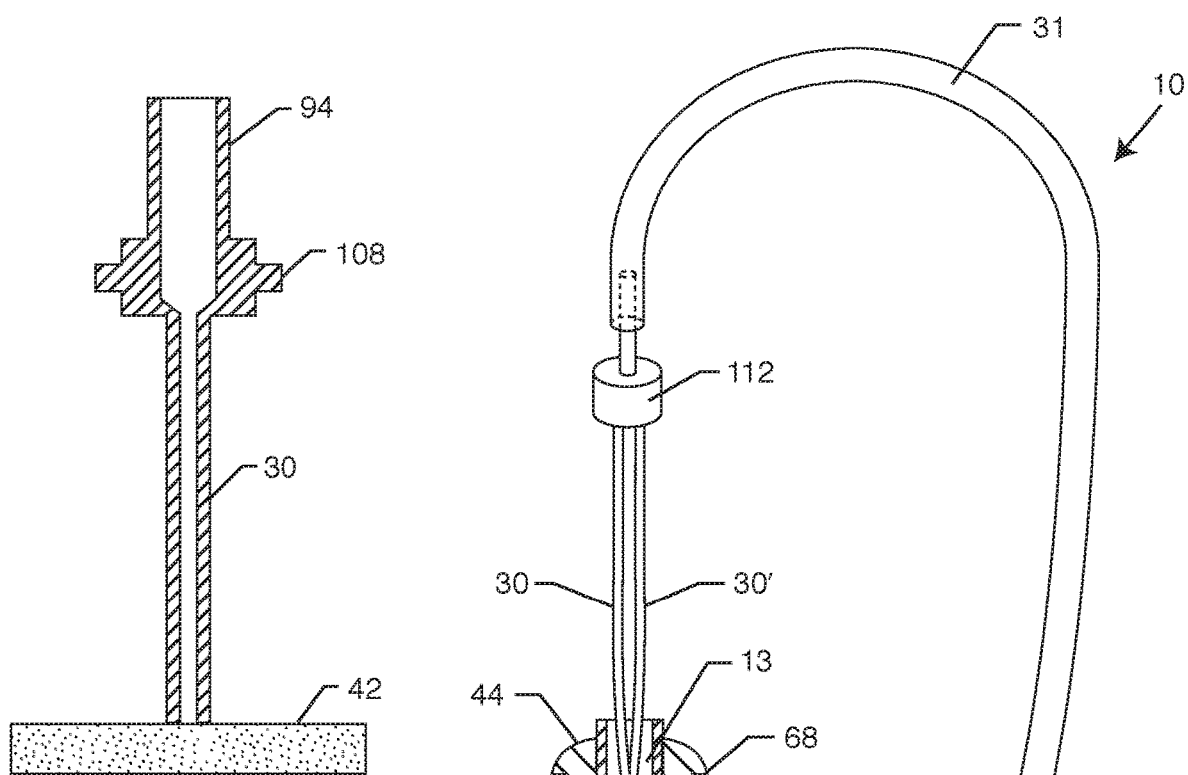
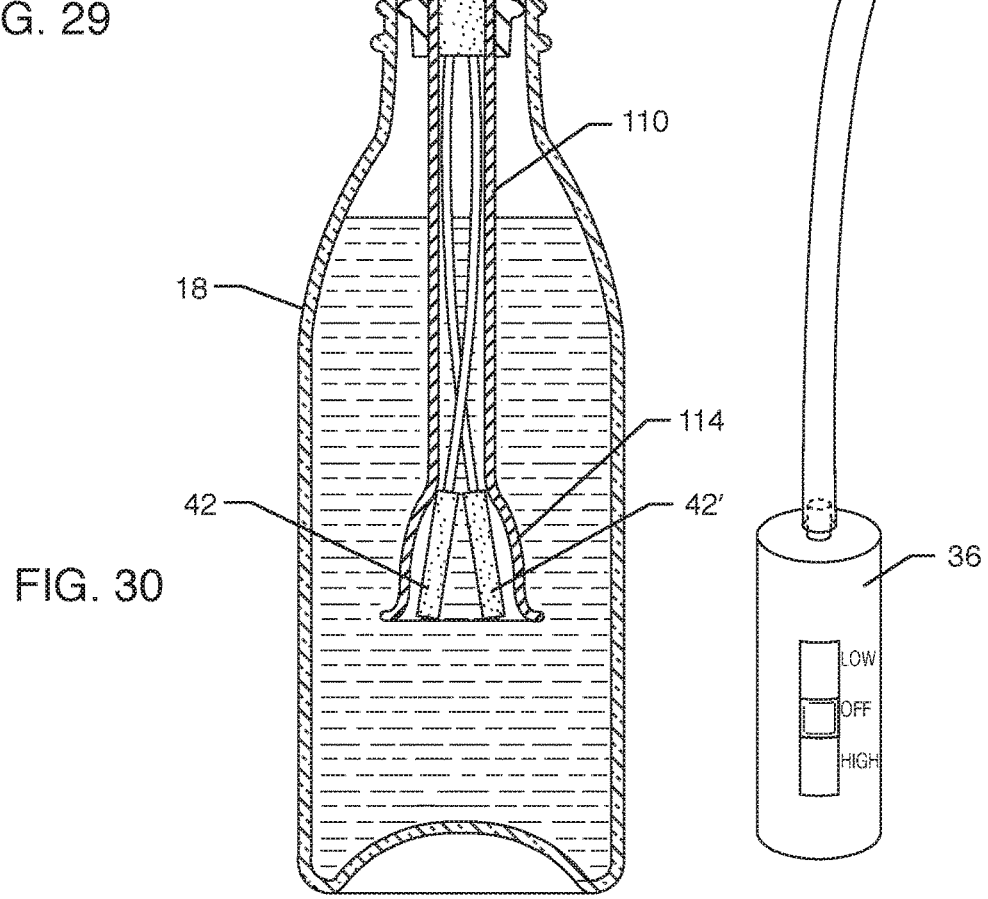
FIG. 29
FIG. 30

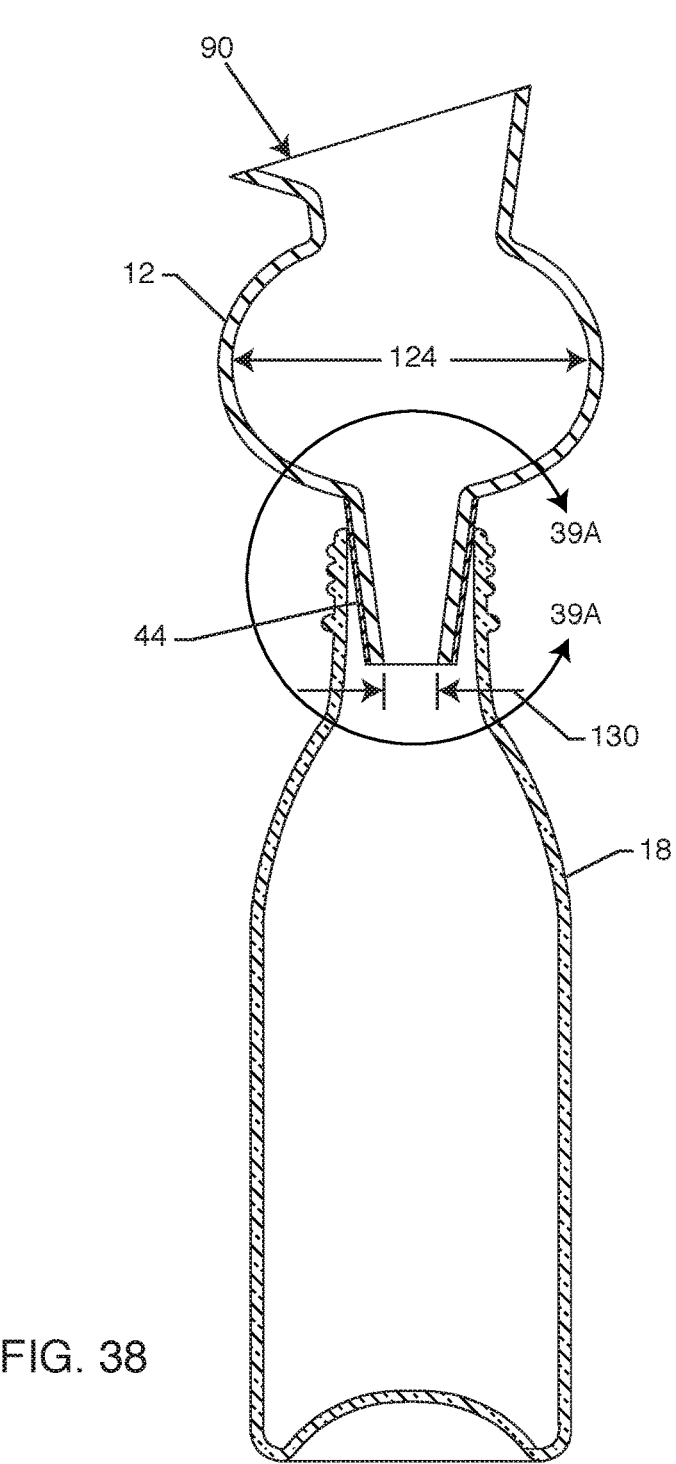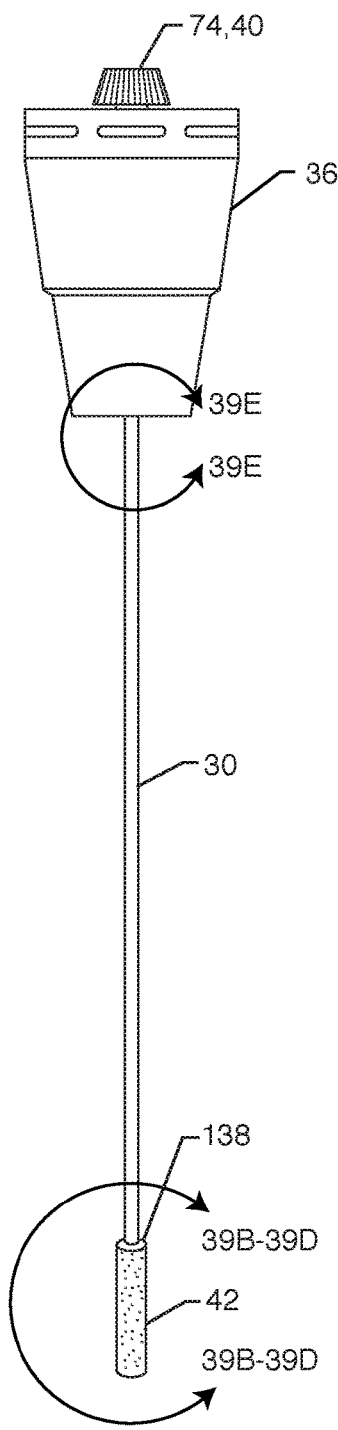
FIG. 38
FIG. 39

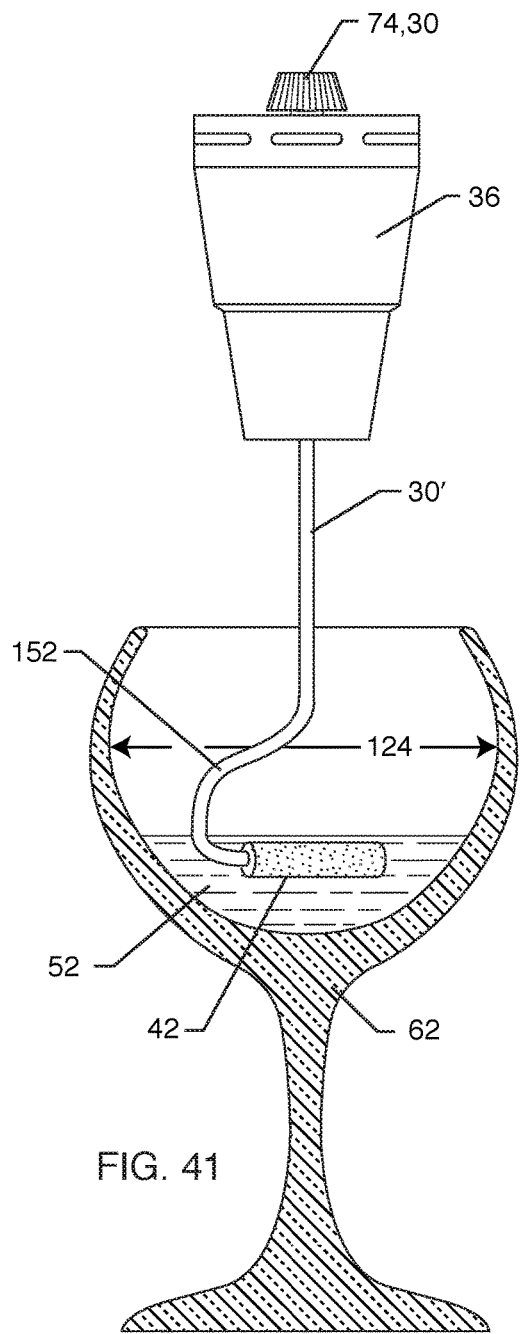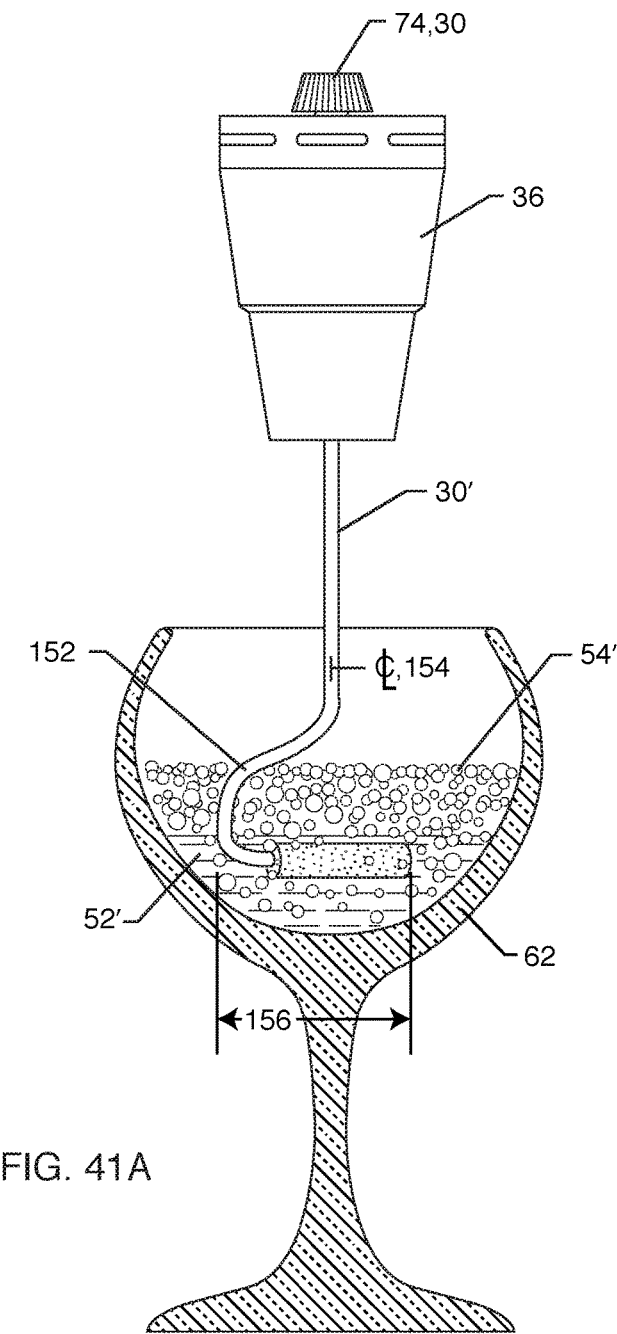

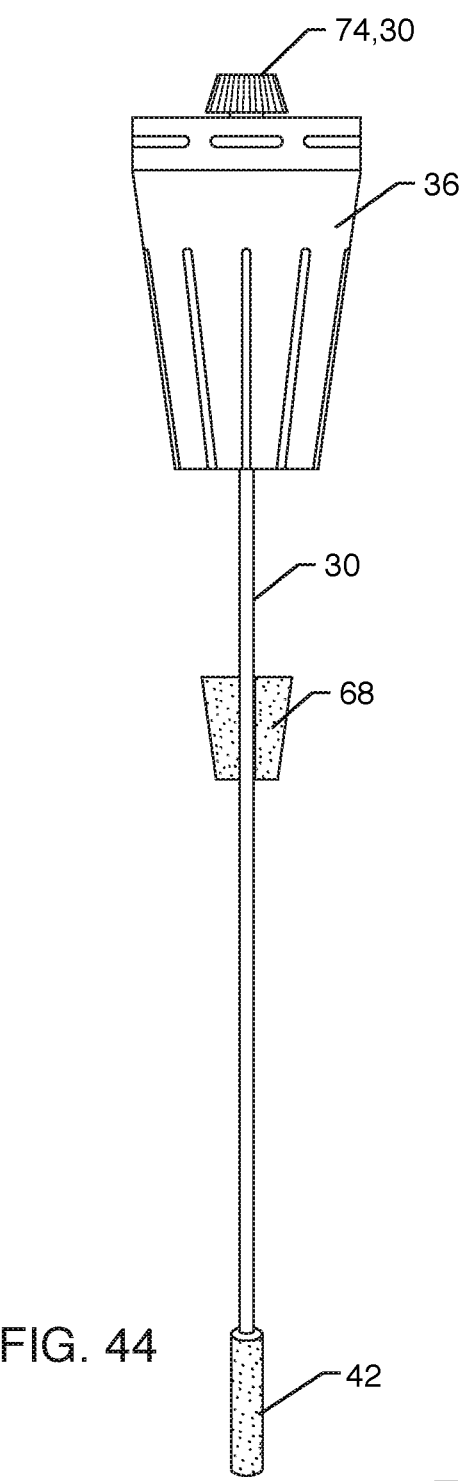
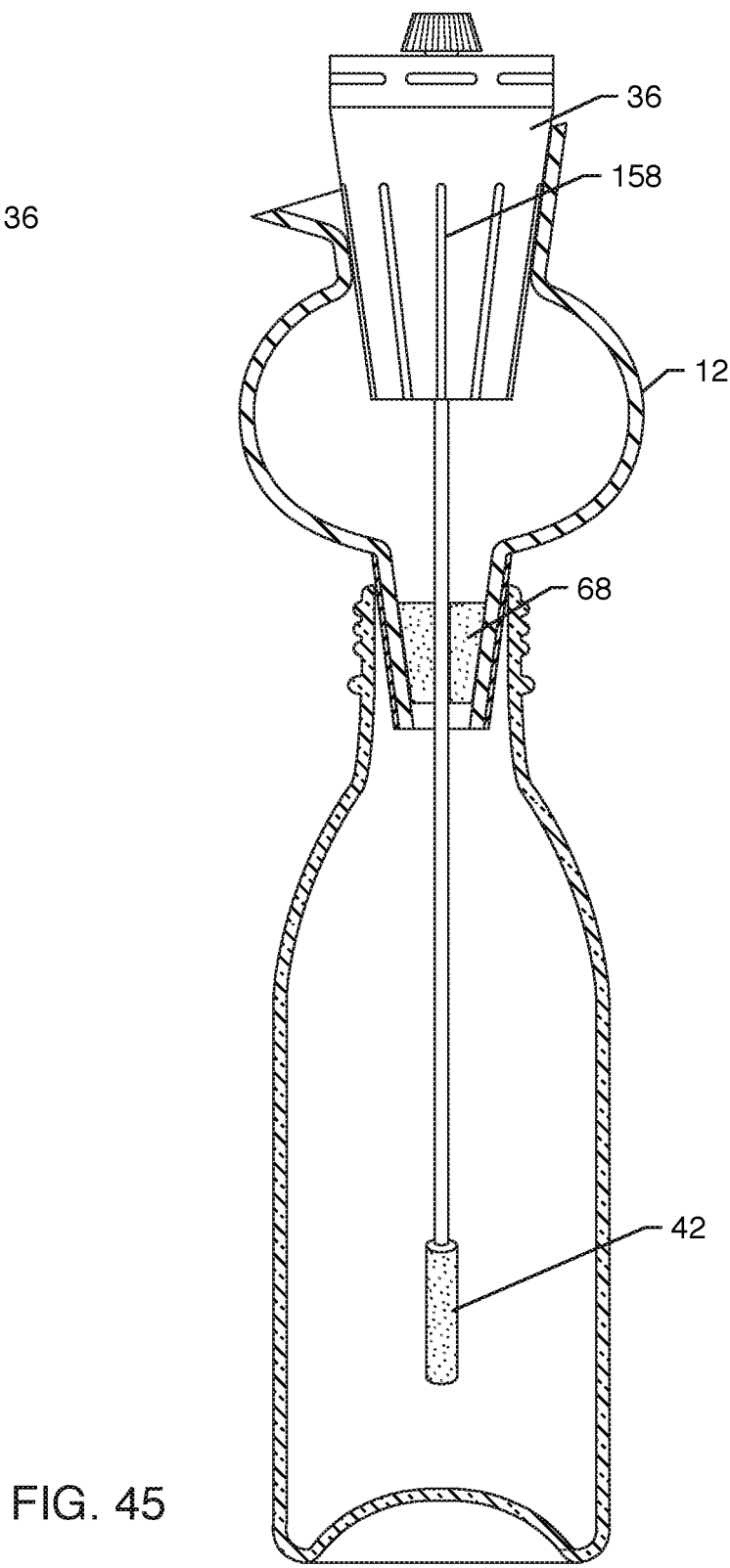
FIG. 44
FIG. 45

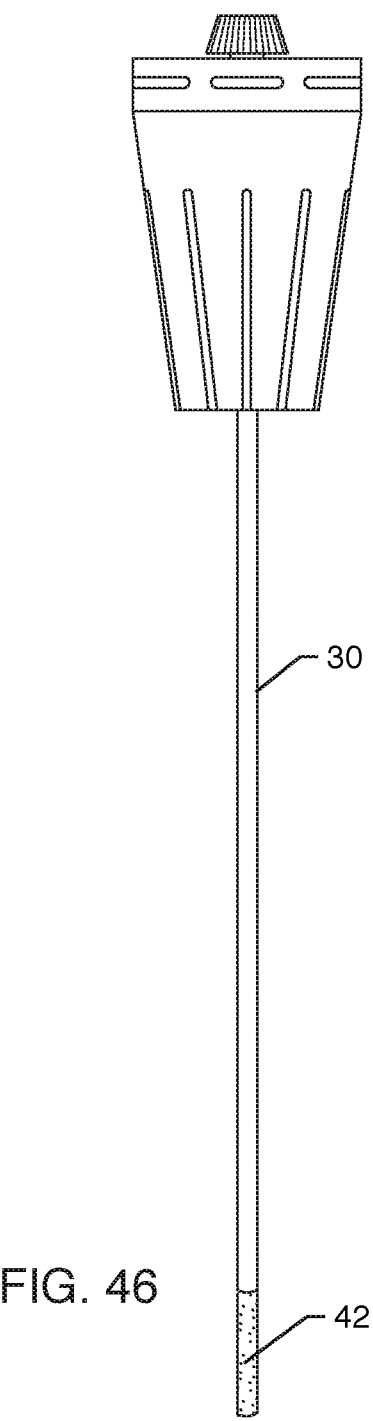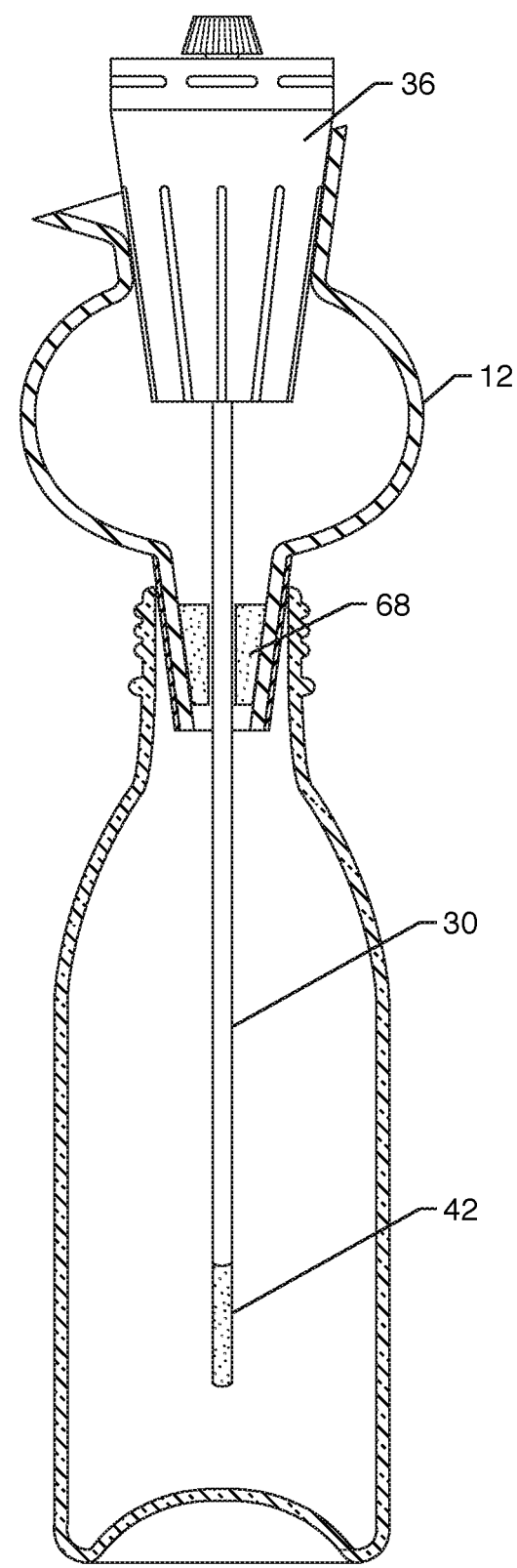
FIG. 46
FIG. 47

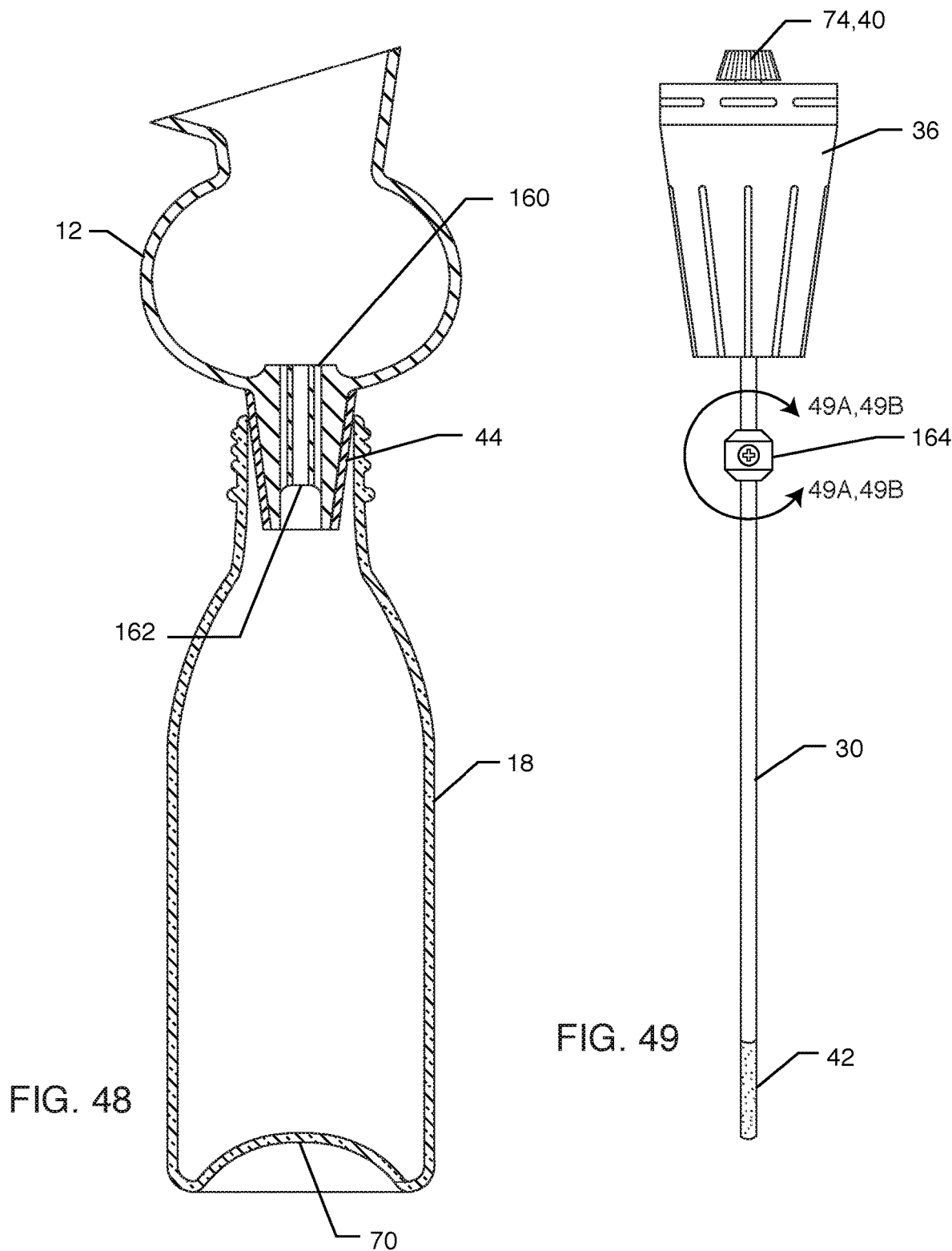

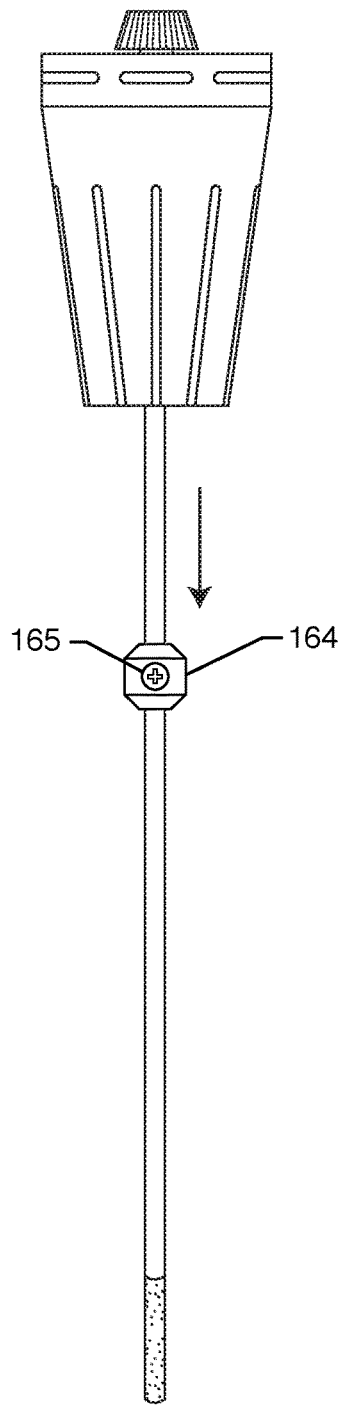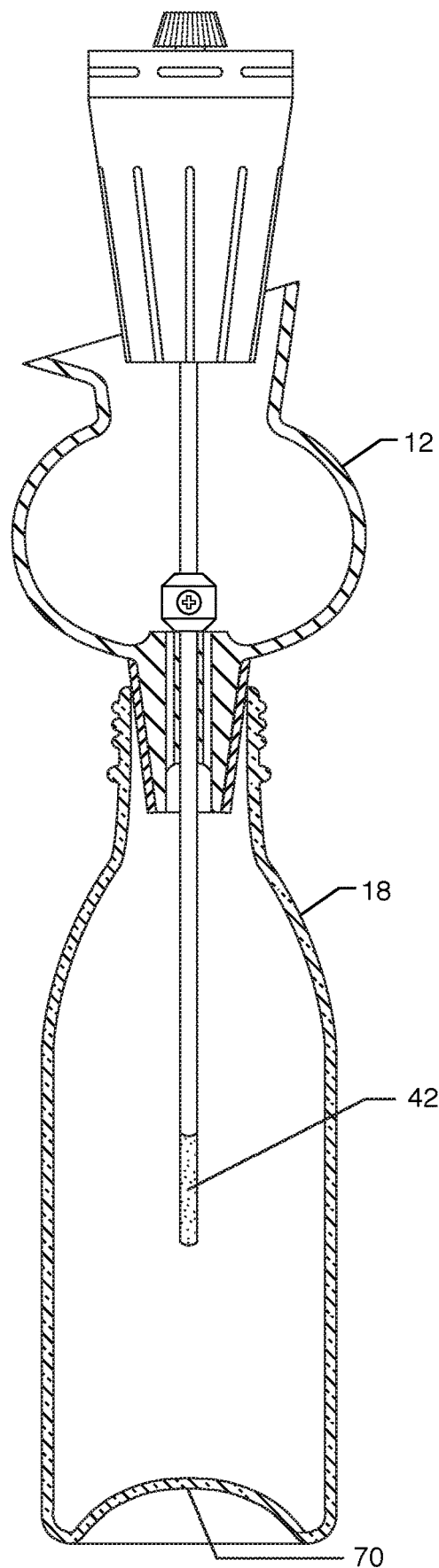
FIG. 51
FIG. 52

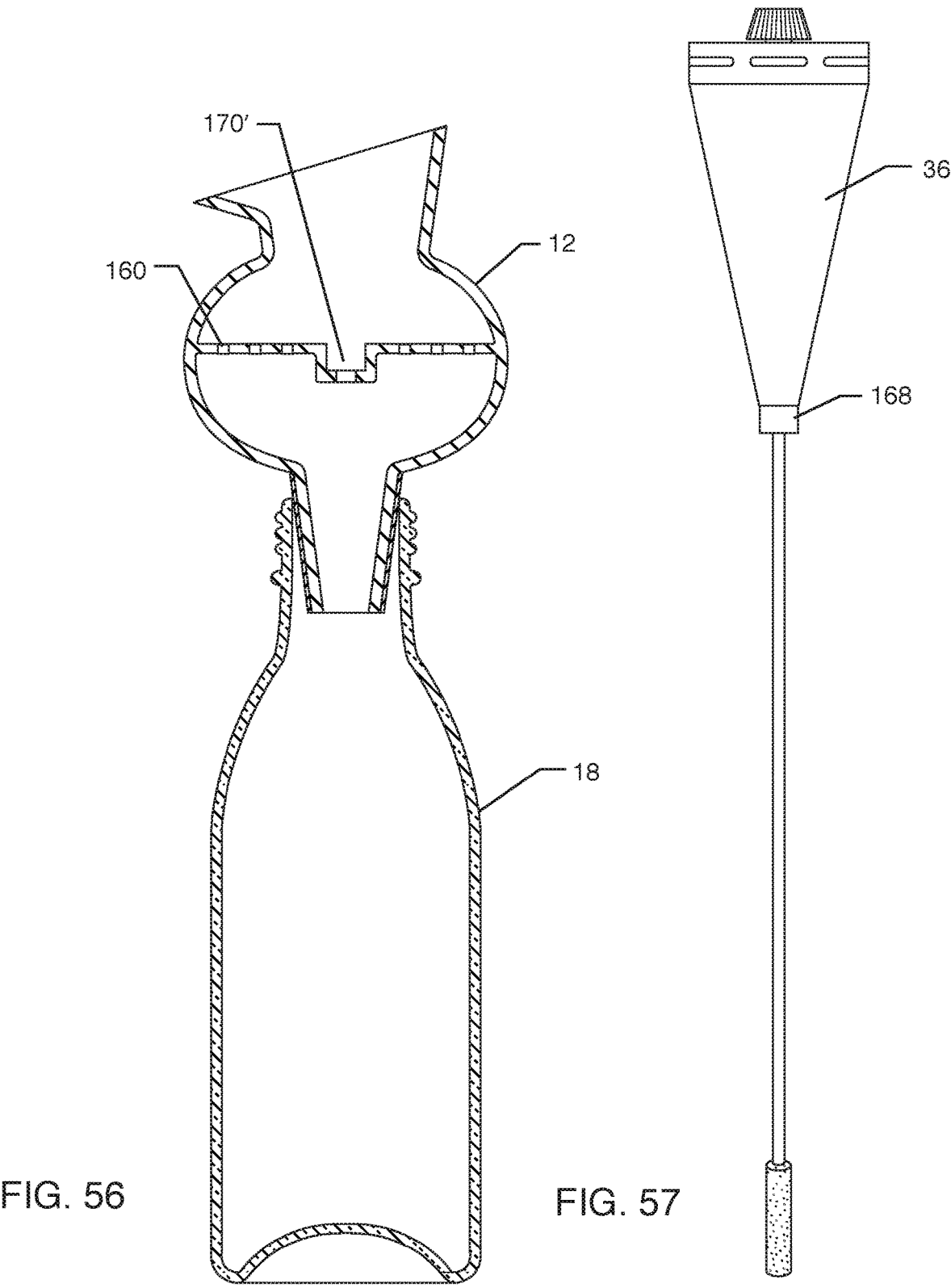

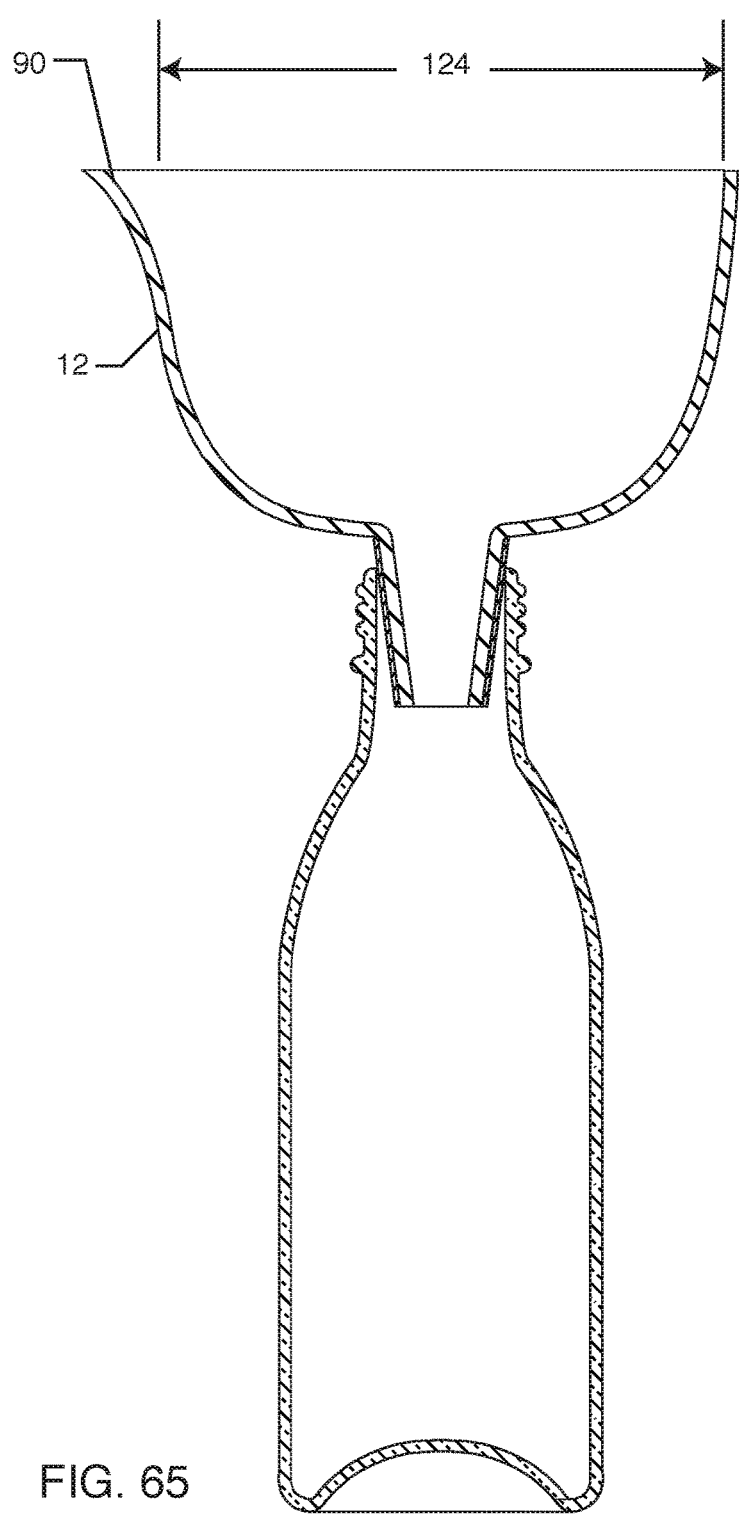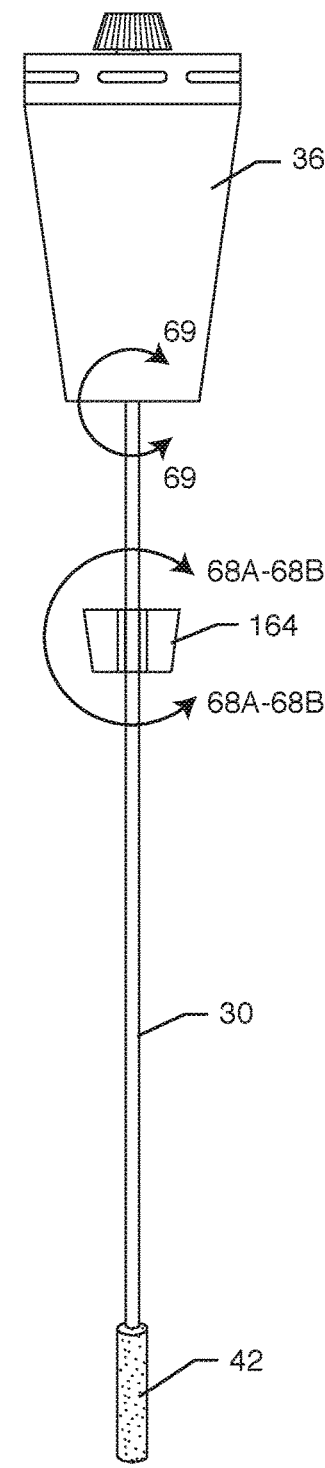
FIG. 65
FIG. 66

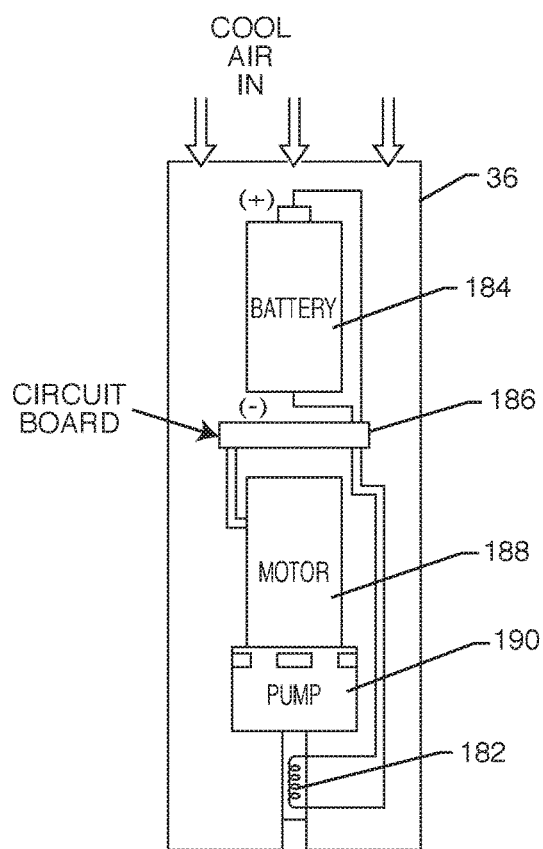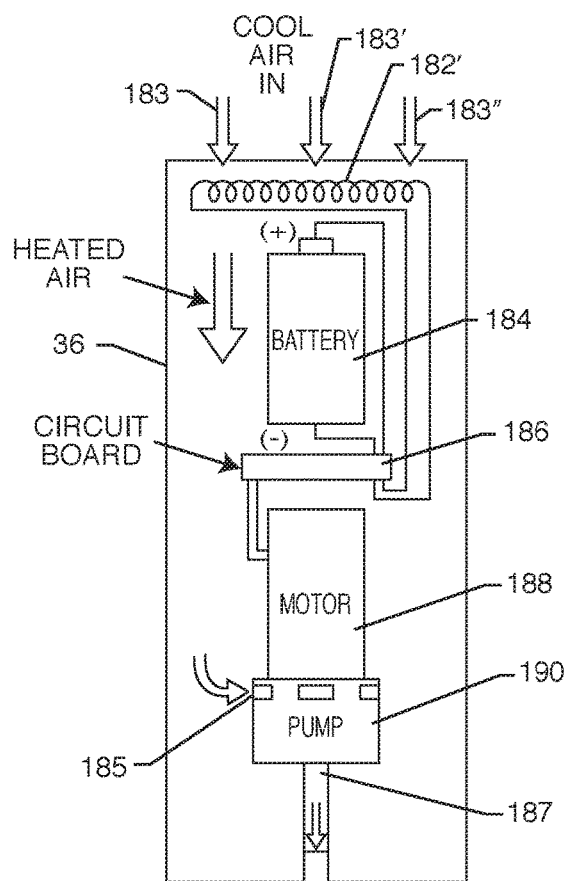
FIG. 72
FIG. 73

WINE BOTTLE AERATOR

CROSS-REFERENCE TO RELATED APPLICATIONS

This continuation-in-part application claims priority to continuation-in-part application Ser. No. 15/089,582 filed on Apr. 3, 2016 and also continuation-in-part application Ser. No. 15/089,584 filed on Apr. 3, 2016. Continuation-in-part application Ser. No. 15/089,582 filed on Apr. 3, 2016 claims priority to application Ser. No. 14/294,157 filed on Jun. 3, 2014. Continuation-in-part application Ser. No. 15/089,584 filed on Apr. 3, 2016 also claims priority to application Ser. No. 14/294,157 filed on Jun. 3, 2014. The contents of all the applications cited above are fully incorporated herein with these references.

FIELD OF THE INVENTION

The present invention generally relates to aeration of wine. More particularly, the present invention relates to devices that aerates wine in a wine glass, bottle or other container at an accelerated rate through the expansion and control of aeration bubbles.

BACKGROUND OF THE INVENTION

Decanting of red wine has been a long tradition in the wine industry. In decanting, the wine is simply poured into another container, usually one of clear glass or crystal. Decanting is particularly important for most young red wines (between three to ten years old). These younger wines can be harsh or astringent if consumed directly after opening the bottle. Such wines have this harsh character because red wine has been maintained in a relatively oxygen-free environment during aging in a bottle. Over time, this environment results in a closed character for the beverages that is derived from the accumulation of particular aroma compounds. A wine's aroma will change during the first ten to thirty minutes after the bottle is opened. Decanting accelerates the breathing process, which increases the wine's aromas from natural fruit and oak by allowing a few volatile substances to evaporate. Decanting also softens the taste of tannins that cause harshness and astringency in young wines. In older red wines, the tannin reactions have proceeded long enough to reduce astringency. As a result, the taste is not as harsh when the wine is drunk straight out of the bottle. In comparison to reds, white wines have little tannin and are not aged in bottles for very long before serving. Thus, they have very little opportunity to develop bottle aromas that need evaporation. Instead, their natural fruit aromas more specifically define their taste. There are however, a number of white wines that can benefit from decanting, or specifically aeration.

In the past, it was quite common for wines poured from both barrel and bottle to contain a considerable amount of solid matter (i.e. sediments). However, most wines on the shelves today have gone through a filtering process and are substantially clear. Certain high end wines, particularly after long term storage, can still have substantial sediments. Decanting a young wine (particularly one with no sediment) involves pouring the wine into another decanter and letting it sit for twenty minutes or so before you serve it and you will likely notice a dramatic increase in subtlety and complexity. If you have the luxury of time, one can continue tasting the wine over a period of hours. Many wines keep evolving and improving over time. Some experts believe that decanting all types of wines from Bordeaux to Burgundy and even whites can beneficially affect the wine.

Of course the problem with decanting is that it takes a substantially long period of time for the oxygen to work its miraculous effects on the taste of the wine. If one knows, for example, a day in advance that they are going to be having a meal with a particular type of wine, the wine may be uncorked and decanted as much as a day before. Some experts have recommended the following process for properly drinking a bottle of red wine: First, chill the red wine in a refrigerator for at least two hours. Second, uncork the bottle of wine and decant it. Allow it to come back to room temperature over a period of hours. Third, taste and then drink the wine. The process of warming back up tends to pull more oxygen in from the surrounding air thereby refining the wine. The inventors have actually done this process and it works amazingly well. The downside is that is very time consuming.

However, all of this historical decanting and ritual that one goes through with wine (particularly red wine) ignores the simple physics. It is really only the act of pouring the wine from one bottle to a different container that has any real meaningful effect as this is when surface tension is broken up and oxygen from the surrounding air actually has a chance to interact with wine molecules. Once the wine is decanted and sitting again in a calm state, there is a surface tension across the surface of the fluid thereby making gas exchange a very slow and long process.

Accordingly, there is a need to rapidly aerate wine and perfect an oxygen exchange to remove the astringent taste and reduce the tannin levels. U.S. Pat. No. 4,785,724 to Vassallo describes an apparatus for aerating bottled wine. Referring to FIG. 1 of Vassallo, one can see a wine bottle 1 which is full of wine and an aeration tube 20, 21 disposed into the bottle of wine terminating at a distal end 22 in a structure with fine holes to break up the air flow into final bubbles. The problem with the Vassallo invention is that the air flow rate through the tube 20, 21 has to be extremely low so that the wine does not form bubbles and froth out the top and create a mess all over the base unit 2. The inventors have experimented with such techniques and have found that this is no more efficient than decanting. In other words, it can take up to 20 minutes by very slowly putting bubbles into the wine and creating a slight surface agitation such that the wine will not froth out of the bottle.

Reference is also made to U.S. Pat. No. 5,154,112 to Wettern. In the Wettern invention, there is a manual pump disposed over the top of the wine bottle which one manually compresses. Referring to FIGS. 1 and 2 of the '112 patent, one can see the end of the pump 8 and a seating collar 13 where it sits on the neck of the wine bottle. Referring to FIG. 2, one can see the manual pump in cross-section and one can see the area 13 and note that there is not a liquid tight seal formed. This means that as air is injected down into the wine bottle, as shown in FIG. 1, it would have to be an extremely low flow rate. If a bubble froth was formed, that would mean that liquid and bubbles would escape between the neck of the wine bottle and the collar 13 which only loosely rests on the end of the wine bottle. This is a major deficiency of the invention as previously described in the Vassallo '724 patent. In other words, the Wettern invention would only work at extremely low flow rates.

Another wine bottle aerator is described in U.S. Pat. No. 5,595,104 to Delaplaine. FIG. 1 of Delaplaine shows an air pump housing 12, a sealing apparatus 14, an extension tube 16 and an end with aeration holes 18. There is an air escape hole 24, as shown. The '104 patent suffers from all of the same deficiencies as described in the Vassallo and Wettern patents. The deficiency is the air flow out of the distal tip 18 would have to be extremely low such that a bubble and froth wasn't created, which would cause wine to overflow the outside of the wine bottle and pour, for example, down onto a countertop.

U.S. Pat. No. 8,561,970 to Mills, et al. describes another type of low volume aeration system. The Mills, et al. aeration system does not have an expansion chamber and is therefore, by definition a low volume system. This is in marked contrast to the present invention, which is a high volume aeration system able to achieve complete aeration and reduction of tannins in the wine in less than 10 seconds or some specific time period much shorter than the prior art. All of the aforementioned prior art requires at least several minutes of aeration at a very slow rate. The reason for this is simple physics. If one drives a very high volume of gas, such as air or oxygen into the bottle of a bottle of wine, a great deal of bubble formation and froth will immediately occur. Unless there is an expansion chamber, this froth will spill over the top of the wine bottle and create a mess.

Accordingly, there is a need for a device that can aerate wine at an accelerated rate. The present invention fulfills these needs and provides other related advantages.

SUMMARY OF THE INVENTION

An exemplary embodiment of an aeration assembly for aerating liquids including wine and other alcoholic beverages includes an expansion chamber and an aerating device. The expansion chamber is defined as having a top portion and a bottom portion, wherein both the top portion and the bottom portion have an opening disposed there through. The bottom portion is configured to engage an opening of an uncorked and/or opened bottle. The top portion is disposed above the opening of the uncorked and/or opened bottle when the bottom portion is engaged with the opening of the uncorked and/or opened bottle. The expansion chamber is configured to be in fluid communication with an inside of the uncorked and/or opened bottle when the bottom portion is engaged with the opening of the uncorked and/or opened bottle. The aerating device comprises a gas conduit having a proximal end in fluid communication with a distal end, wherein the gas conduit is configured to pass through the opening of the bottom portion of the expansion chamber. The distal end is disposable below the bottom portion of the expansion chamber while the proximal end is disposable above the bottom portion of the expansion chamber. A gas source is in fluid communication with the proximal end of the gas conduit. The expansion chamber is configured to temporarily contain an expansion of bubbles during an aeration process. The expansion chamber and aerating device are not permanently connected, wherein the aerating device can be fully removed from the expansion chamber before, during or after the aeration process.

In other exemplary embodiments, the expansion chamber may be optically transparent or translucent.

In other exemplary embodiments, a sealing element may be attached to the bottom portion of the expansion chamber, wherein the sealing element is configured to seal against an inside surface, a top surface or an outside surface of the opening of the uncorked and/or opened bottle. The sealing element may comprises an elastic or rubber-like material.

In other exemplary embodiments, an aeration element may be attached to the distal end of the gas conduit.

In other exemplary embodiments, the opening at the bottom portion of the expansion chamber may be larger than a maximum width of the aeration element and/or the distal end of the gas conduit.

In other exemplary embodiments, at least an inside portion of the expansion chamber may be in fluid communication with surrounding air through the opening at the top portion.

In other exemplary embodiments, a middle portion and/or the top portion of the expansion chamber may be larger in cross-sectional area as compared to the bottom portion of the expansion chamber. The middle portion and/or top portion of the expansion chamber that is larger in cross-sectional area as compared to the bottom portion of the expansion chamber may have a diameter of at least 2 inches.

In other exemplary embodiments, the gas source may comprise an electrically powered air pump, a manually powered air pump or a pressurized cartridge. The electrically powered air pump may be electrically powered by a battery or by an electrical plug.

In other exemplary embodiments, the gas source may be disposed remote from the gas conduit or the gas source may be attached to a portion of the gas conduit.

In other exemplary embodiments, the expansion chamber may include at least one pour spout disposed at or near the top portion of the expansion chamber.

In other exemplary embodiments, a bubble-reducing filter element may be disposed within the expansion chamber and/or connected to the gas conduit.

In other exemplary embodiments, the opening at the bottom portion of the expansion chamber may be larger than a maximum width of the aeration element and/or distal end of the gas conduit.

In other exemplary embodiments, the gas conduit may be removably attachable to the gas source with the use of an O-ring and/or seal ring.

In other exemplary embodiments, a second gas conduit removably may be attachable to the gas source, the second gas conduit comprising at least one bend and an aeration element disposed at its distal end, wherein the aeration element is positioned perpendicular in relation to the proximal end of the second gas conduit.

In other exemplary embodiments, the aerating device may include an LED configured to illuminate into the expansion chamber when the distal end of the gas conduit of the aerating device is disposed through the bottom portion of the expansion chamber.

In other exemplary embodiments, the aerating device may be configured to be removably captured by the expansion chamber.

In other exemplary embodiments, a stop may be attached to a portion of the gas conduit, wherein the stop is removably engageable with a portion of the expansion chamber, the stop locating and removably securing the aerating device relative to the expansion chamber.

In other exemplary embodiments, the aerating device may comprise a housing, where a distal end of the housing engages a counter-bore formed in the retention chamber, the distal end of the housing and counter-bore locating and removably securing the aerating device relative to the expansion chamber.

In other exemplary embodiments, the aerating device may comprise an air restriction valve controlling a flow of gas from the gas source to the gas conduit.

In other exemplary embodiments, the aerating device may comprise a bleeder valve controlling a flow of gas from the gas source to the gas conduit.

In other exemplary embodiments, the aerating device may comprise a heater element disposed in fluidic communication with the gas source and/or gas conduit, the heater element configured to heat a flow of gas supplied to the gas conduit.

In other exemplary embodiments, the heater element may be a thermoelectric heater configured to utilize the Peltier effect to create a heat flux between a junction of two different types of materials.

In other exemplary embodiments, a middle portion of the expansion chamber may be larger in cross-sectional area as compared to the bottom portion and the top portion of the expansion chamber. The middle portion of the expansion chamber that is larger in cross-sectional area as compared to the bottom portion and top portion of the expansion chamber may have a diameter of at least 2 inches.

In other exemplary embodiments, the opening at the bottom portion of the expansion chamber may have a diameter greater than 0.45 inches.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a sectional side view of an exemplary embodiment of an aerator of the present invention;

FIG. 2 is a sectional view taken from lines 2-2 from the structure of FIG. 1;

FIG. 3 is a sectional view taken from lines 3-3 from the structure of FIG. 1;

FIG. 9A is a sectional view of another embodiment of an aerator with a manual air pump in the down position;

FIG. 9B is the structure of FIG. 9A now showing the manual air pump in the up position;

FIG. 29 is a section view similar to FIG. 28 now showing a new embodiment of an aeration element disposed in a horizontal direction;

FIG. 30 is a sectional view of another exemplary embodiment of a multitude of bubble-generating aeration elements disposed in a housing;

FIG. 38 is a side sectional view of another embodiment of a retention chamber having a widened diameter;

FIG. 39 is a side view of another embodiment of an aerator configured to fit within the retention chamber of FIG. 38;

FIG. 41 is a side sectional view of a novel gas conduit inserted into the wine in a wine glass;

FIG. 41A is a side sectional view of the structure of FIG. 41 now showing the bubble formation in the wine and into the wine glass;

FIG. 44 is a side view of another embodiment of an aerator with a bubble reducing filter element attached to the gas conduit;

FIG. 45 is a side sectional view of the structure of FIG. 44 installed within a novel retention chamber of the present invention;

FIG. 46 is a side view similar to the structure of FIG. 44 now with the bubble reducing filter element removed;

FIG. 47 is a side sectional view of the structure of FIG. 46 installed within a novel retention chamber that includes a bubble reducing filter element;

FIG. 48 is a side sectional view of another embodiment of a retention chamber now having an air passage for a gas conduit;

FIG. 49 is a side view of another embodiment of an aerator with an adjustable stop disposed along the gas conduit;

FIG. 51 is a side view similar to that of FIG. 49 now showing the stop adjusted to a new location;

FIG. 52 is a side view similar to that of FIG. 50 now showing the stop adjusted to a new location;

FIG. 56 is a side sectional view of another embodiment of a retention chamber now having a counter-bore for capturing an aeration device;

FIG. 57 is a side view of another embodiment of an aerator designed to fit within the counter-bore of FIG. 56;

FIG. 65 is a side sectional view of another embodiment of a retention chamber installed onto a bottle;

FIG. 66 is a side view of another embodiment of an aerator having a stop designed to fit within the narrowed neck of the retention chamber of FIG. 65;

FIG. 72 is schematic and side view of a novel aerator of the present invention now including a heating element; and FIG. 73 is schematic and side view of a novel aerator of the present invention similar to FIG. 72 now showing the heating element in a different location.

DETAILED DESCRIPTION OF THE PREFERRED EMBODIMENTS

Figure 4:
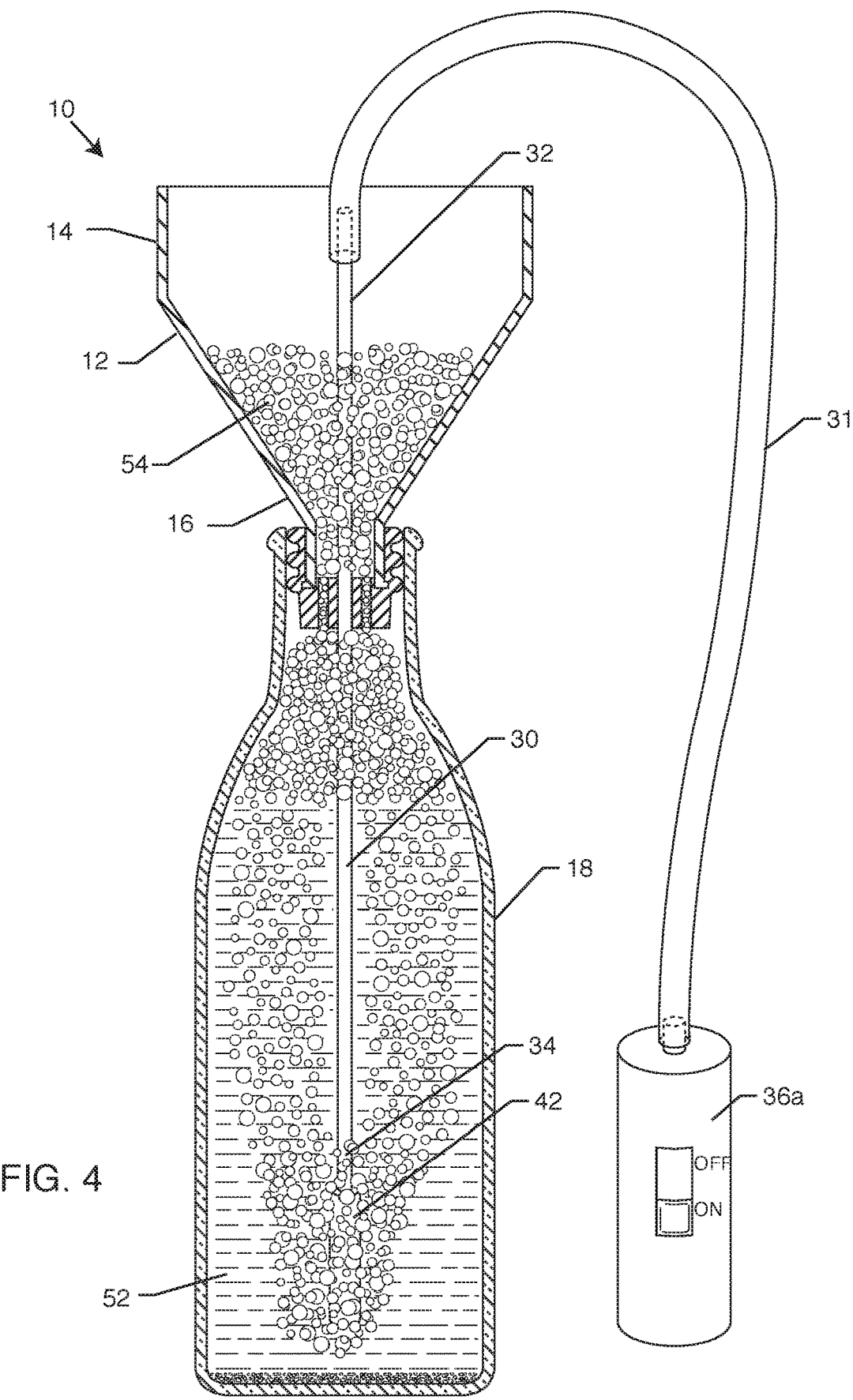
FIG. 4 is a sectional view similar to FIG. 1 now showing wine being aerated and expanding into an expansion chamber.

FIG. 1 illustrates a cross-section of a wine bottle 18 with an aerator 10 of the present invention. Most wine bottles 18 are a standard 750 ml. However, there are magnum bottles and even super magnum bottles, which may have different neck sizes. Shown, is an expansion chamber 12 in accordance with the present invention. The expansion chamber 12 has a top portion 14 and a bottom portion 16 which is necked down to fit into the opening 20 of the bottle 18. A sealing element 44, such as a rubber seal, is shown such that fluid and or bubbles cannot escape and flow down the outside of the wine bottle 18. As shown here, the sealing element 44 is in contact with an inside surface 22 of the bottle opening 20. A sealing element 44 could also be configured to seal to a top surface 24 of the bottle opening 20 or to an outside surface 26 of the bottle opening 20.

Figure 8:
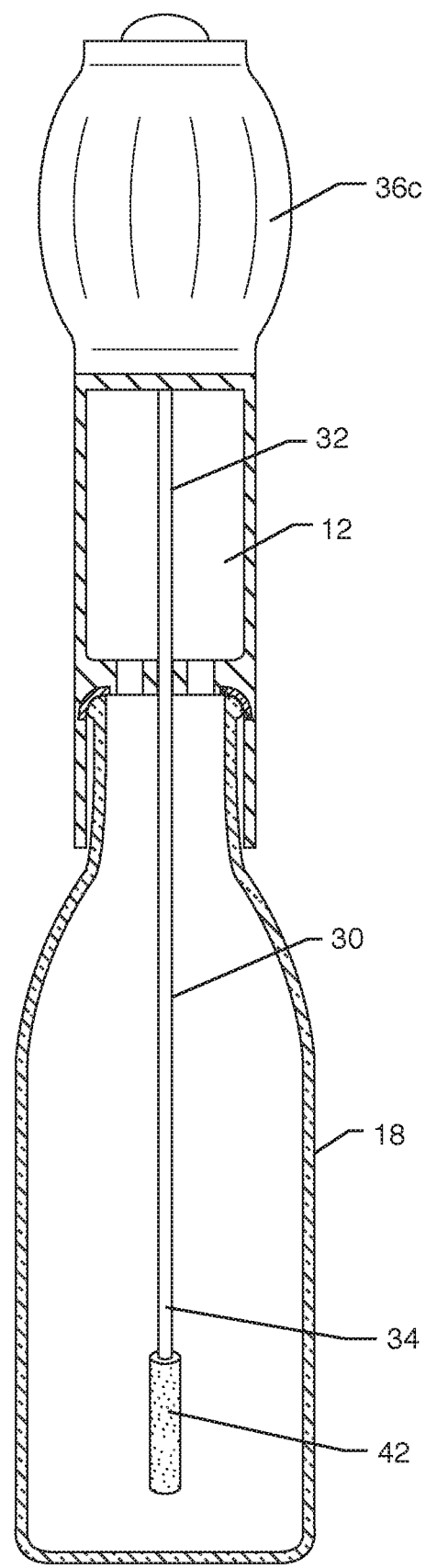
FIG. 8 is a sectional view of another embodiment of an aerator with a manual air pump.

There is a gas source 36 shown, which may be an air pump 36a (FIG. 4), a compressed air source 36b (FIG. 4A) (a compressed oxygen source or CO2 source) or a manual air pump 36c (FIGS. 8, 9A, 9B). Shown here is an on/off switch 40. In this particular embodiment, the gas source 36 is a self-contained air pump and has an internal battery 38 or could be connected to an electrical outlet via an electrical cable and plug (not shown). The gas flow is directed through gas conduit 30 from the proximal end 32 to the distal end 34. Shown here the air conduit 30 has a flexible extension 31 that allows the gas source 36 to be placed remotely from the expansion chamber 12 and bottle 18. For the sake of simplifying the figures, the gas conduit 31 is typically shown in a simplified manner without a wall thickness, but does in fact have a wall thickness as is understood by those skilled in the art.

At the distal end 34 of the gas conduit 30 is a fine aeration element 42. This aeration element 42 could be constructed of a stainless steel cylinder with multiple small perforations, or an alcohol-resistant stone structure such that micro-bubbles are formed at a high flow rate.

As gas pressure is introduced into an inside 28 of the bottle 18 as best seen in FIG. 4, the pressure on the inside 28 of the bottle 18 will tend to increase along with the formation of a large amount of froth and bubbles 54 from the wine 52. Passageways 56 (FIGS. 2 and 3) allow these bubbles and froth to collect on the inside of the expansion chamber 12. This process is so fast that several inches of froth will develop in just a few seconds. Referring once again to sealing element 44, one will see that it has a catch 58 which is part of the expansion chamber 12 so that the rubber stopper/sealing element 44 will not easily or mistakenly slide off.

Figure 4A:
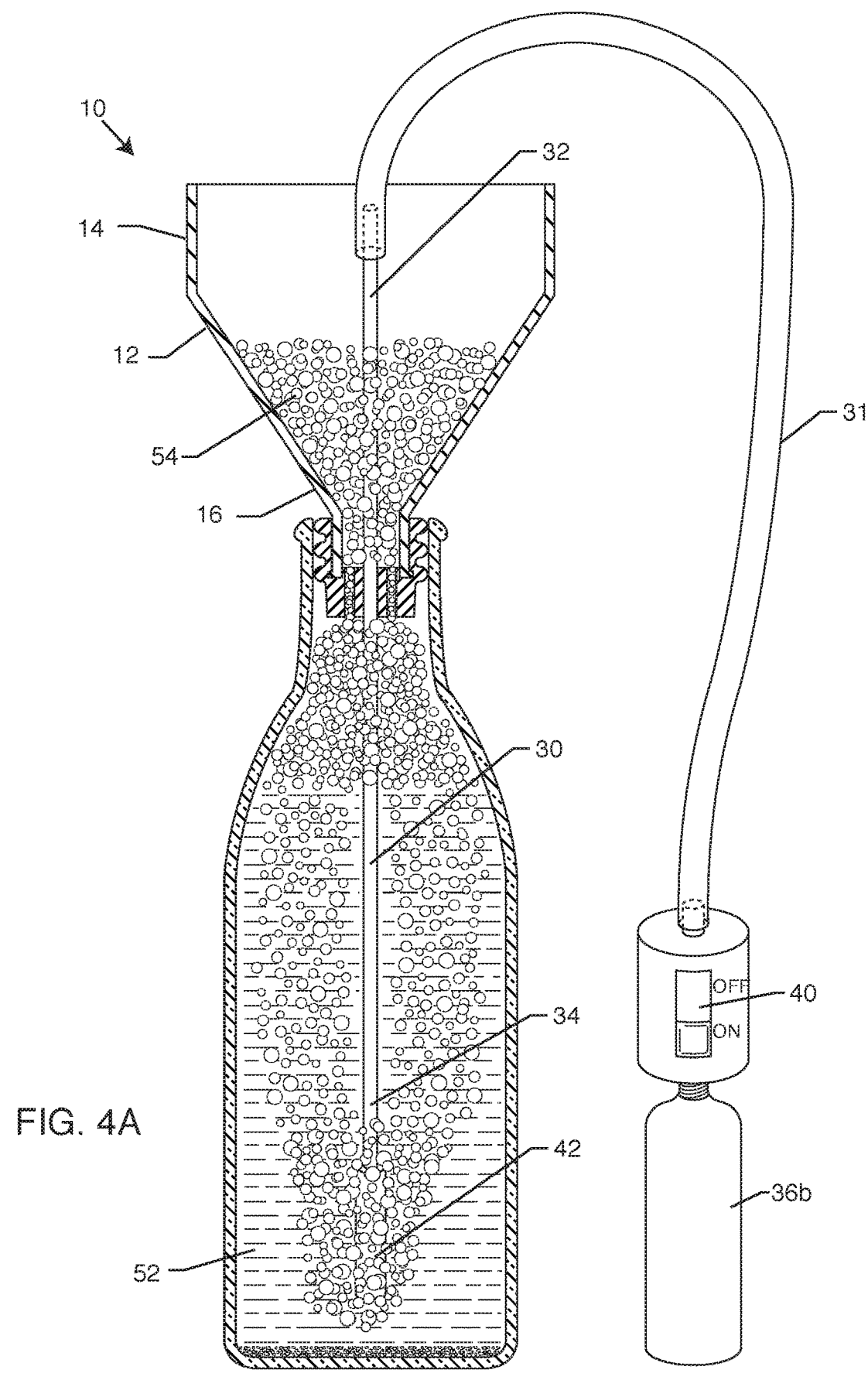
FIG. 4A is a view similar to FIG. 4, where now the gas source is a compressed gas canister.

Referring once again to the gas source 36, it can be a self-contained battery operated air pump or use electrical cord (not shown). As another embodiment of the gas source 36, it could even be a self-contained compressed gas source 36b as best shown in FIG. 4A. The compressed gas source 36b could be a CO2 canister, compressed air canister or compressed oxygen canister. The canister can be screwed into or connected to the switch 40.

Referring once again to FIG. 1, the expansion chamber 12 could be made of many different materials. In a preferred embodiment, the expansion chamber 12 would be translucent so one could enjoy the effect of watching the wine 52 froth build up and then dissipate back down into the bottle 18. Of course, this could also be stainless steel, plastic or any other material suitable material. In one preferred embodiment, this would be of a crystalline glass structure and can even be etched with some grapes or other ornamentation.

Referring again to FIG. 1, the tubing material 31, in a preferred embodiment, would be a clear type of surgical or food-grade tubing. It would have a slip-fit 33 onto the end of the rigid proximal end 32 of the gas conduit 30. At the distal end 34 of the gas conduit 30 would be the aeration element 42. The gas conduit itself 34 could be of glass, stainless steel, or the like. In a preferred embodiment, the material would be stainless steel to provide mechanical strength. It is also noted herein that the gas conduit 30 is preferred to be rigid, but could also be a flexible gas conduit 30 as well.

FIGS. 2 and 3 are taken from FIG. 1 and show how the sealing element 44 functions. In FIG. 2, on can see the passageways 56 through the sealing element 44 that connect the expansion chamber 12 and the inside 28 of the bottle 18 in fluid communication. Also seen is the air conduit 30 passing there through. FIG. 3 shows how the sealing element 44 is sealed against the inside surface 22 of the bottle 18.

FIG. 4 dramatically illustrates one difference in the present invention over all of the other prior art. As one can see, the volume of gas flow injected at or near the bottom of the wine bottle 18 is extremely high producing a huge bubble formation and froth 54, which is temporarily collected in the expansion chamber 12. This whole process is amazingly quick. The inventors have demonstrated that all it takes to completely remove the tannins and astringent properties of a wine 52 is just a few seconds of high volume bubbling like this. This is in stark contrast with all of the other prior art where the bubble formation is so low it will not overflow the container. The flow rates of the present invention tend to be at least an order or magnitude greater than the prior art. The inventors have done a set of very interesting experiments using the configuration shown in FIG. 4. These experiments have been performed by pinching down the flexible extension tube 31, wherein, no expansion chamber 12 was used. In other words, the inventors wanted to see if a very small amount of air bubble formation could be produced, such that the wine would not overflow the top of the wine bottle. This was found to be the case. By reducing the air flow down to a relatively miniscule amount (less than 0.1 liters per minute), the bubble formation 54 can be reduced to the point where the bubbles do not overflow the top of the wine bottle 18. However, experimentation has shown that one must do this for at least several minutes to properly aerate the wine and as much as 10 to 20 minutes, or in some cases hours. This makes this pinching technique hardly any more efficient than the old method of decanting.

Again, in the present invention, there is such a huge bubble formation that occurs in just a few seconds that tremendous surface area is created which is then captured and contained by the expansion chamber 12. Surface area is created around the outside of each bubble that's formed in the expansion chamber 12 and also the inside of each bubble. In other words, gas or air is in contact with an enormous surface area of the wine 52. Double blinded testing in large groups of people has repeatedly shown that the high volume approach has a remarkable effect on the aroma, taste, and reduction of tannins of almost all wines. The present invention is so effective, it also removes astringency from any white wines.

Referring to FIG. 4A, one can see that the wine bottle and retention chamber of FIG. 4 is shown. In this case, instead of a battery operated air pump 36a, we have a gas canister 36b. These compressed air gas canisters are generally readily available in the marketplace and are used for life rafts, compressed air guns and the like. It would be desirable if the compressed gas canister 36b was filled with either oxygen or air. This is because as the bubbles are formed, you would get an oxygen exchange with the tannins on both the inside surface of the wine bubble and the outside surfaces of the wine bubble once it is escaped into the air. However, it should be realized that even if the compressed air cylinder 36b was filled with nitrogen, carbon dioxide or the like, the invention would still work albeit at a much slower rate. The reason for this is the inside of the air bubbles would be filled with a relatively inert gas and as they float upward through the liquid wine, little to no oxygen exchange would occur with the tannins and other elements of the wine that promote a better taste. However, once these formed bubbles exit the liquid surface of the wine and enter the expansion chamber 12, they are exposed to surrounding air. These bubbles still have a very large surface area and an oxidation exchange would occur between the exposed environmental air on the outside of the bubbles. Accordingly, this would work, but would not be as effective.

Figure 5:
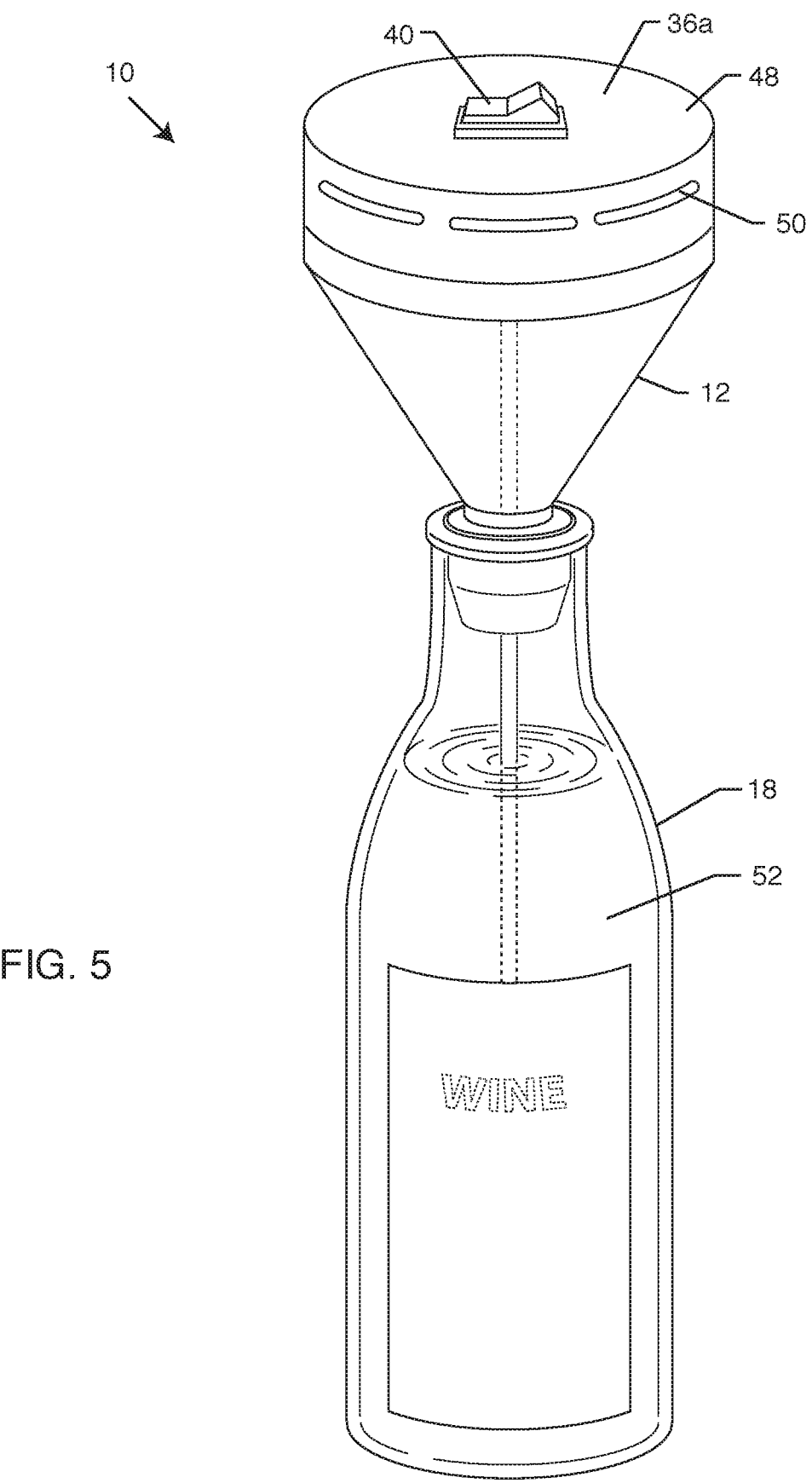
FIG. 5 is a perspective view of another exemplary embodiment of an aerator of the present invention.

FIG. 5 illustrates an alternative embodiment of the present aeration invention 10 showing a wine bottle 18, where the air pump 36a is integral to the expansion chamber 12. As one can see in FIG. 5, there is a switch 40 on the top of the housing 48 and batteries (internal batteries not shown) and an internal air pump with a vent 50 to allow excess gas pressure to escape during the wine bubble 54 (best shown in FIGS. 4 and 4A) formation in expansion chamber 12.

Figure 6:
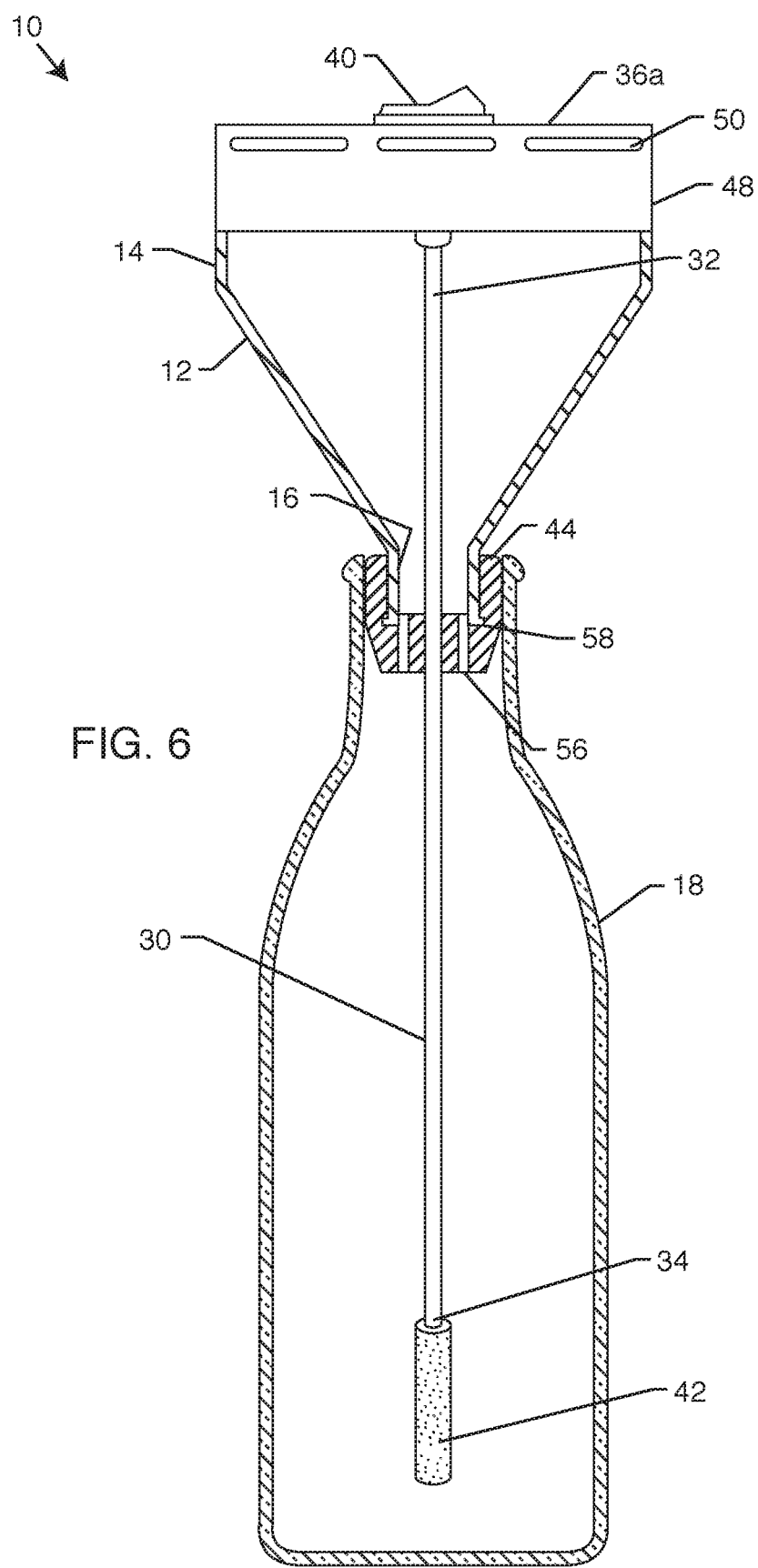
FIG. 6 is a sectional view of the structure of the FIG. 5.

FIG. 6 is a cross-sectional view taken from FIG. 5 showing that the proximal end of the gas conduit 32 is fitted into the end of the removable gas pump housing 48.

Figure 6A:
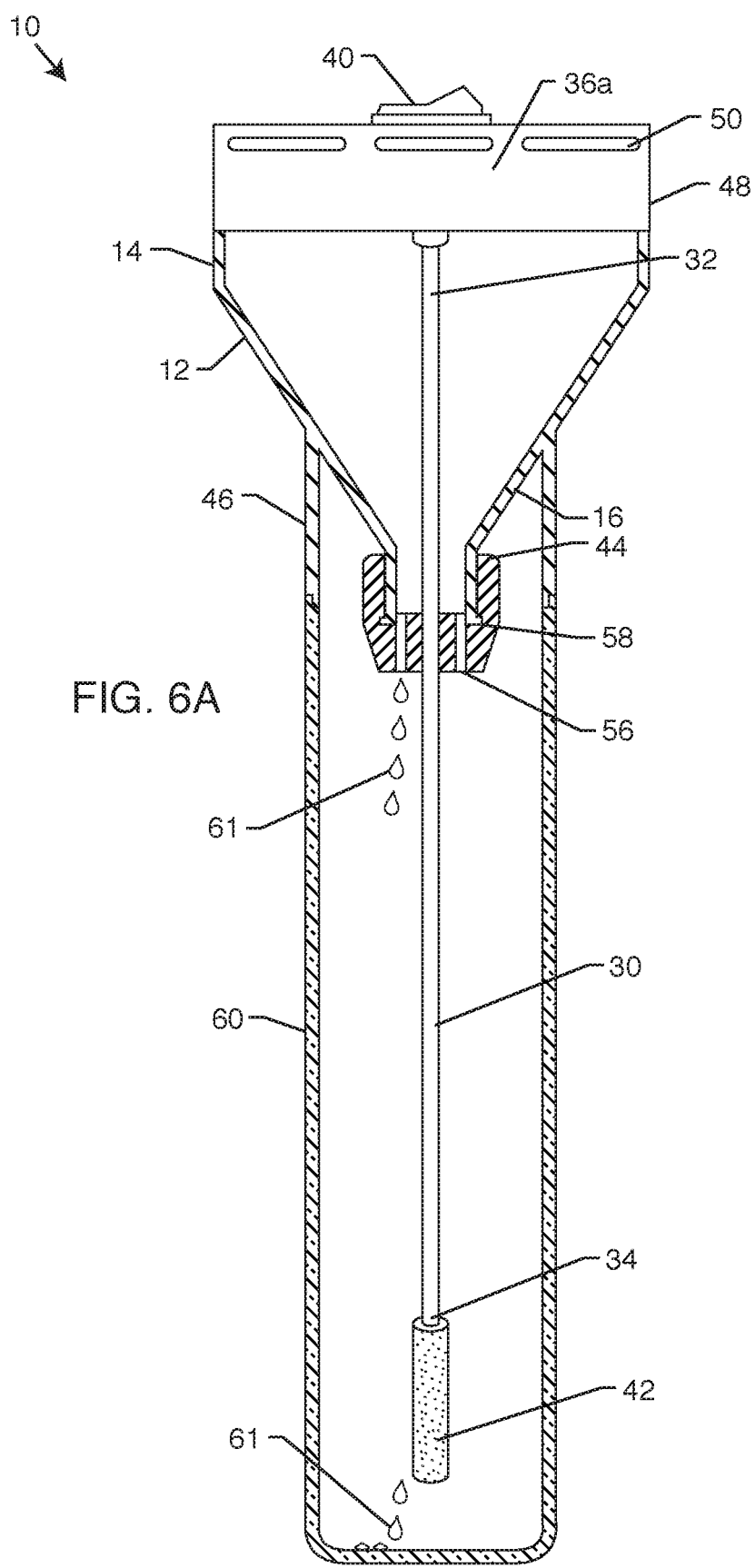
FIG. 6A is a view similar to FIG. 6 now showing an embodiment with a case.

FIG. 6A shows the modification to the expansion chamber 12 including an extension 46 which allows the entire air pump assembly 48 and gas conduit 30 to be inserted into a convenient storage case 60. In a preferred embodiment, the storage case 60 would be of stainless steel or even of clear crystalline glass. The storage case can be adapted to any of the drawings of the present invention and serves several very important functions. First, it provides a convenient way to transport the aerator 10 to a table in a restaurant. Second, after completion of the wine aeration, it provides a convenient place in which to quickly insert the wine aeration assembly 10 and gas conduit 30 such that any drips 61 that would emanate from the distal end 34 of aeration element 42 to then collect in the bottom of the case 60 where it could be easily wiped out. Drips 61 could also come from the passageways 56, as shown. Again, the case 60 could be made of any material, including plastics and the like.

Figure 7:
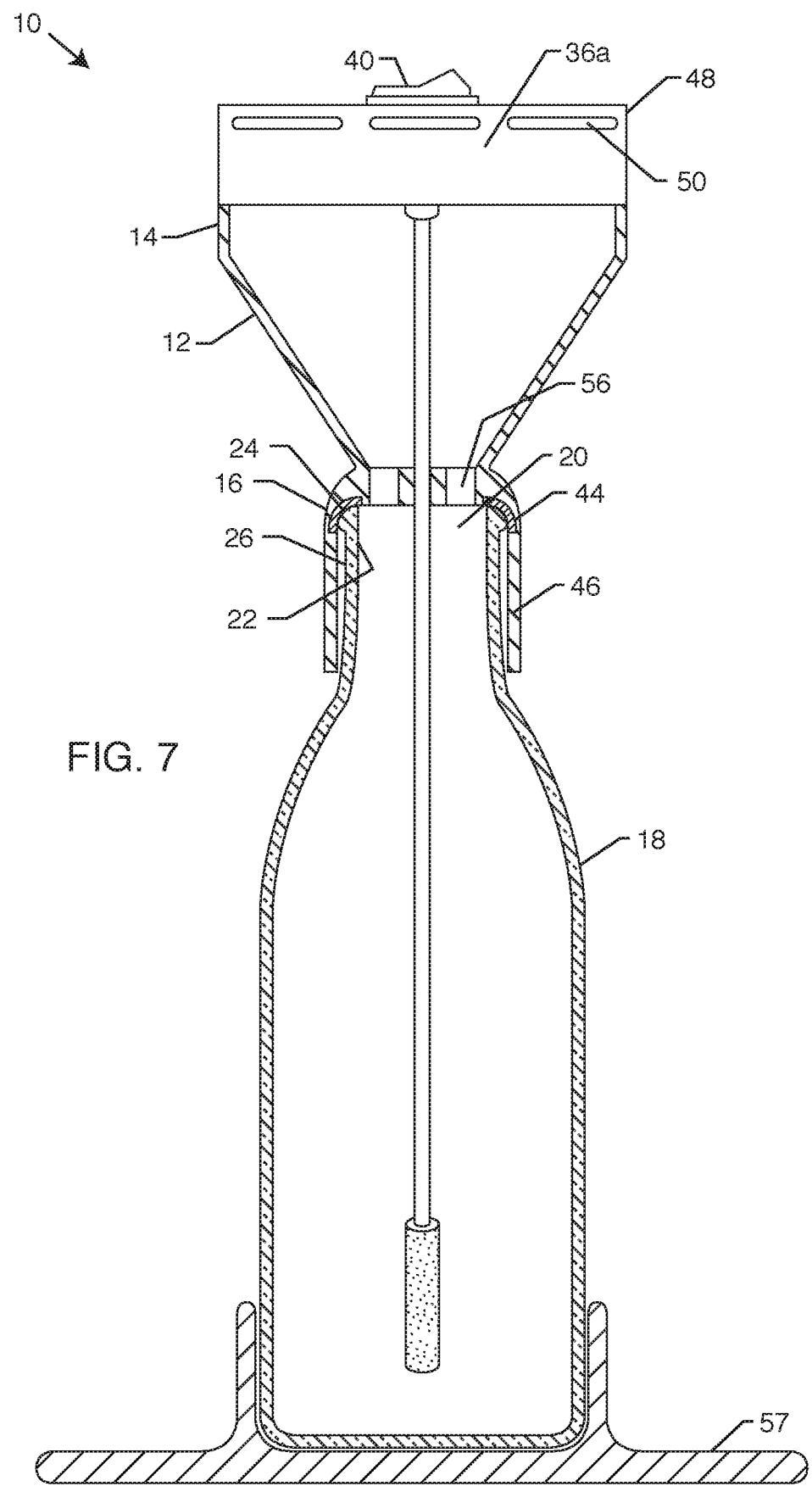
FIG. 7 is a sectional view of another exemplary embodiment with a different sealing element and a base.

FIG. 7 is very similar to the apparatus previously described in FIG. 6, except that in this case, there is an extension 46 that extends over the neck of the wine bottle 18. This provides some structural stability to avoid tipping of the aeration assembly 10 when in use. In this case, the sealing element 44 abuts to the outside surface 26 of the wine bottle opening 20, which fits tightly in place so that the froth and bubble formation 54 from FIGS. 4 and 4A will not leak down the outside of the wine bottle 18. Also shown is an optional base 57 into which the wine bottle can be inserted to further prevent tipping. This base piece 57 could be of glass, stainless steel, a plastic ring or the like.

Figure 7A:
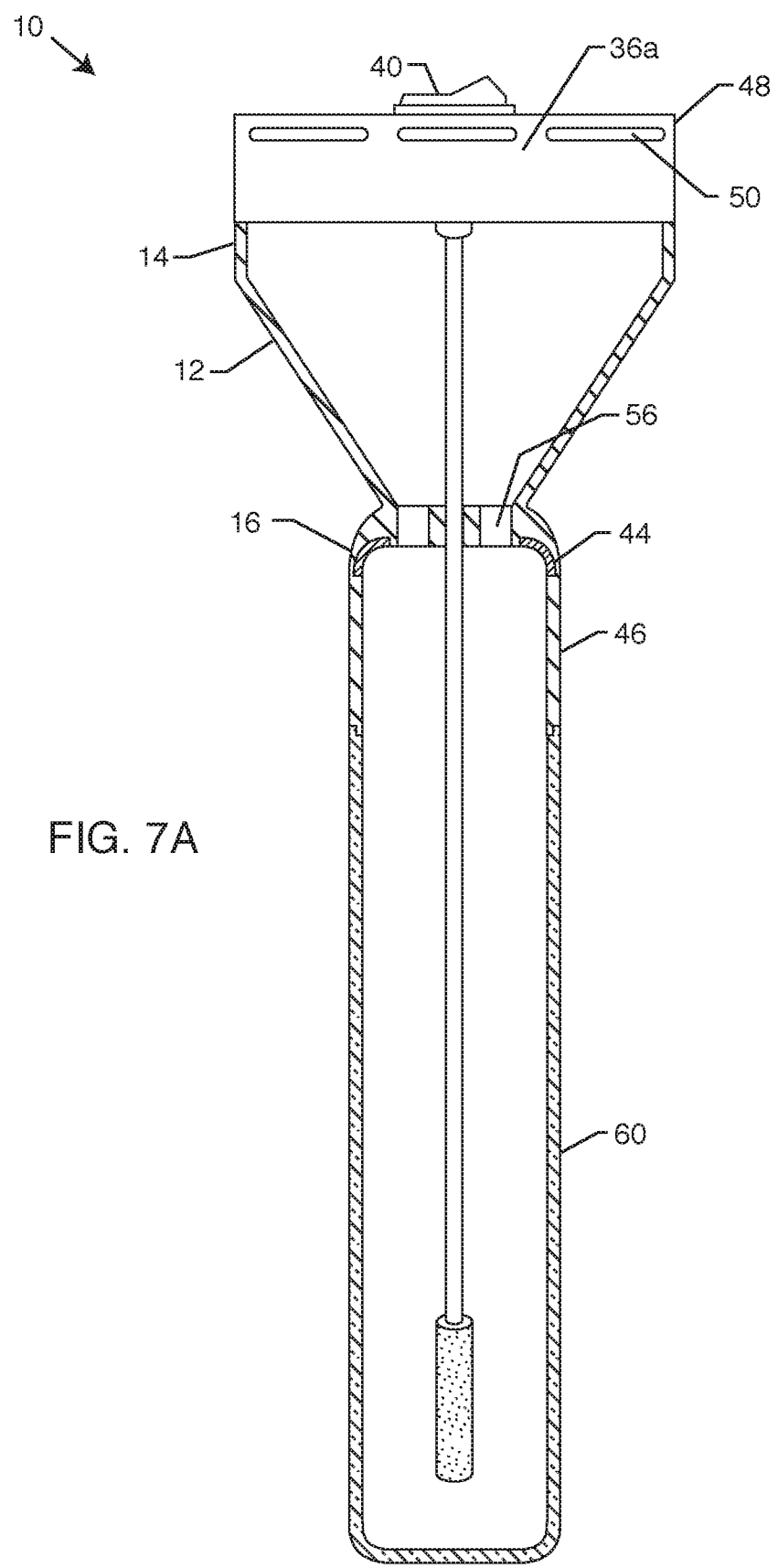
FIG. 7A is a view similar to FIG. 7 now showing the aerator with a case.

FIG. 7A is very similar to FIG. 7, except that it is shown mated with a case 60 as previously described in FIG. 6A.

FIG. 8 is very similar to FIG. 7, except that the electrically operated pump structure 36a (previously shown in FIG. 4) has been replaced by a manual squeeze ball pump 36c. When a user squeezes the ball pump 36c, air is forced through the gas conduit 30 from the proximal end 32 to the distal end 34 and out through the aeration element 42. In this case, the expansion chamber 12 is shown below the squeeze ball 36c. The expansion chamber 12 is cylindrical in shape as compared to the previous cone shapes. It is understood that the expansion chamber 12 may take a variety of shapes and configurations and this disclosure is not limited to the precise forms described herein.

FIGS. 9A and 9B illustrate that the squeeze ball 36c of FIG. 8 could be replaced by a manual piston-type air pump 36d, as illustrated. The piston-type pump 36d may provide pressure and gas through the gas conduit 30 on either one motion of direction (typically going downward) or even both directions of motion through the use of various one-way valves.

Figure 10:
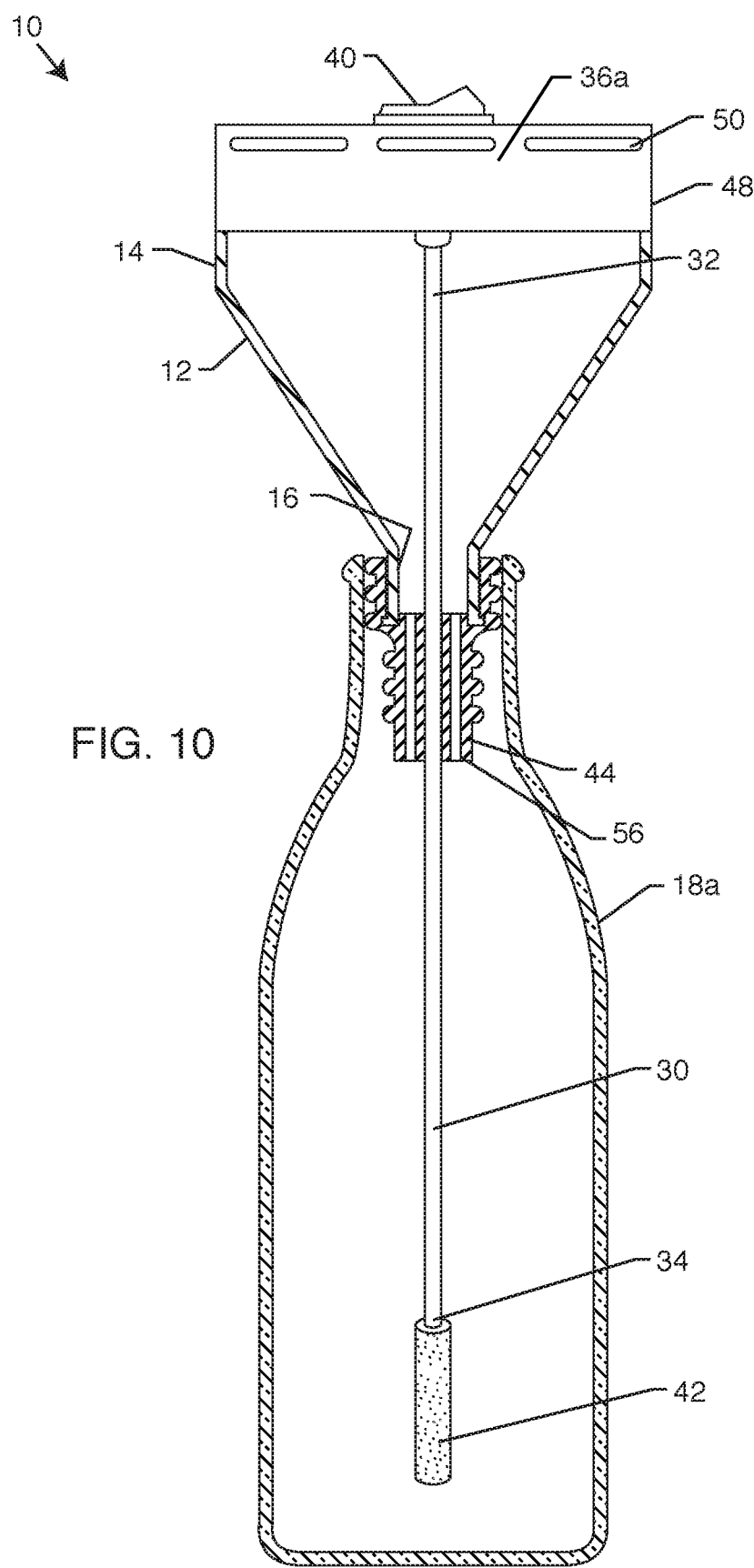
FIG. 10 is a sectional view of another exemplary embodiment of an aerator now with a sealing element configured to seal into different sized wine bottles.

FIG. 10 shows that the sealing element 44 can comprise a variety of shapes such that it is insertable and sealable into both the standard 750 mL wine bottles 18 and even larger wine bottles 18a as shown herein. The sealing element 44 has at least two sizes of seals that are configured to engage into the at least two sizes of wine bottles 18 and 18a.

The use of fluid communication as used herein describes the ability to transport gases, air and/or liquids and is not limited to the transportation of just liquids.

Figure 11:
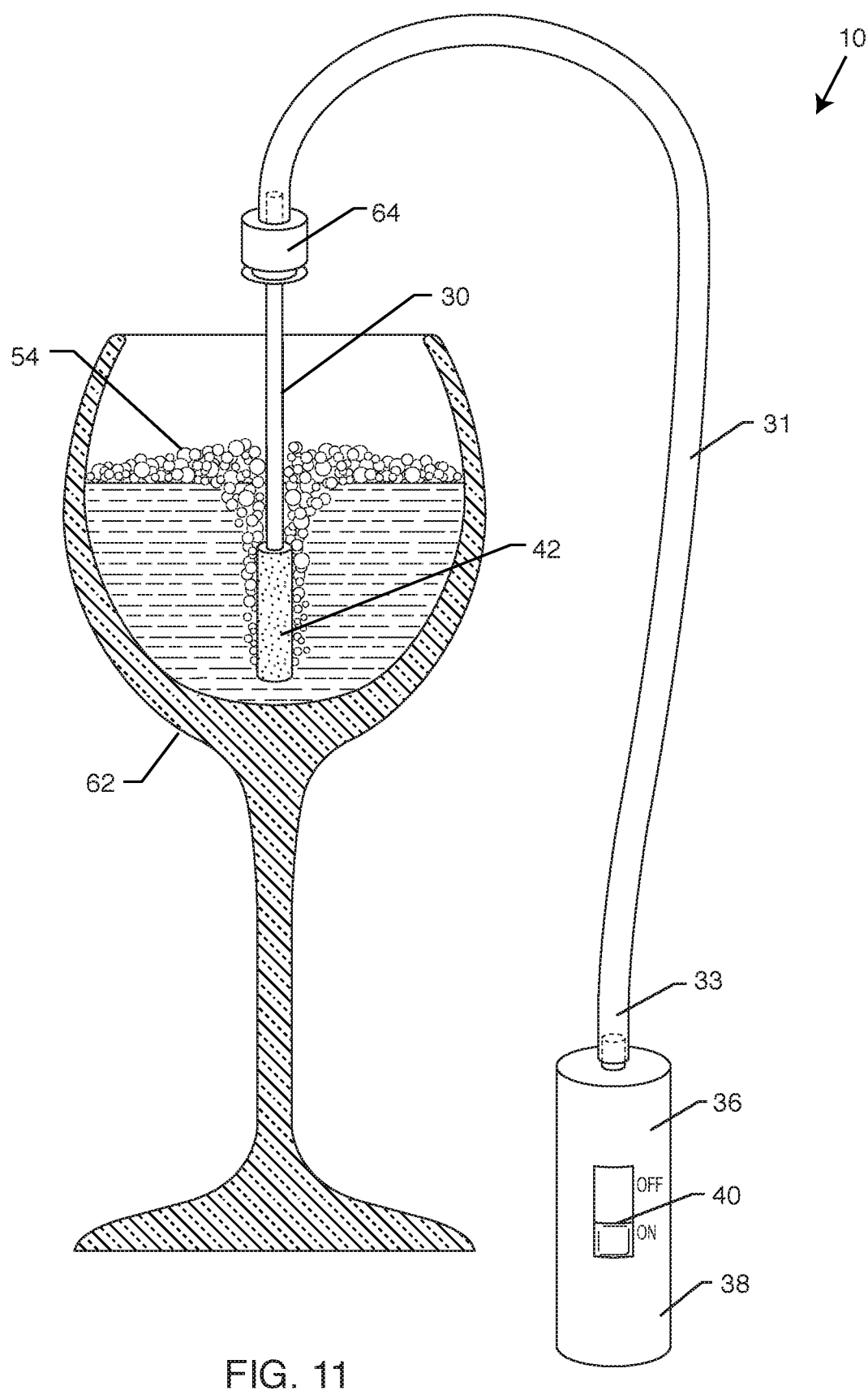
FIG. 11 is a sectional view of another exemplary embodiment of an aerator now with a quick-disconnect feature.

FIG. 11 illustrates a wine glass 62. In general, connoisseurs of red wine prefer relatively large wine glasses, such as the Libbey 8414 Citation 12 ounce glass. The reason that red wine glasses have evolved to have very large surface area has to do with improving the taste of the wine by swirling it or letting it sit for extremely long periods of time, thereby facilitating oxygen exchange. In the present invention, the wine glass 62 can be of any shape or dimension, even one small in diameter and/or like a tall champagne flute. This is because the present invention can provide aeration to the wine in any shape of wine glass.

Aeration element 42 has been previously described and can have various densities providing varying diameters and velocities of the air bubble 54. Element 64 is a quick disconnect allowing one to disconnect the gas conduit 30 from the gas conduit extension 31. Having this quick disconnect facilitates a number of things. For example, by disconnecting the gas conduit 30 from the gas conduit extension, one can then place the subassembly of the gas conduit 30 with aeration element 42 into a dishwasher for cleaning. This also facilitates changing out various aeration elements for different types of wine. For example, having a more aggressive aeration for a heavy body wine like Burgundy would be in marked contrast to a lesser body wine like a Zinfandel, where finer bubbles may be optimal.

Figure 12:
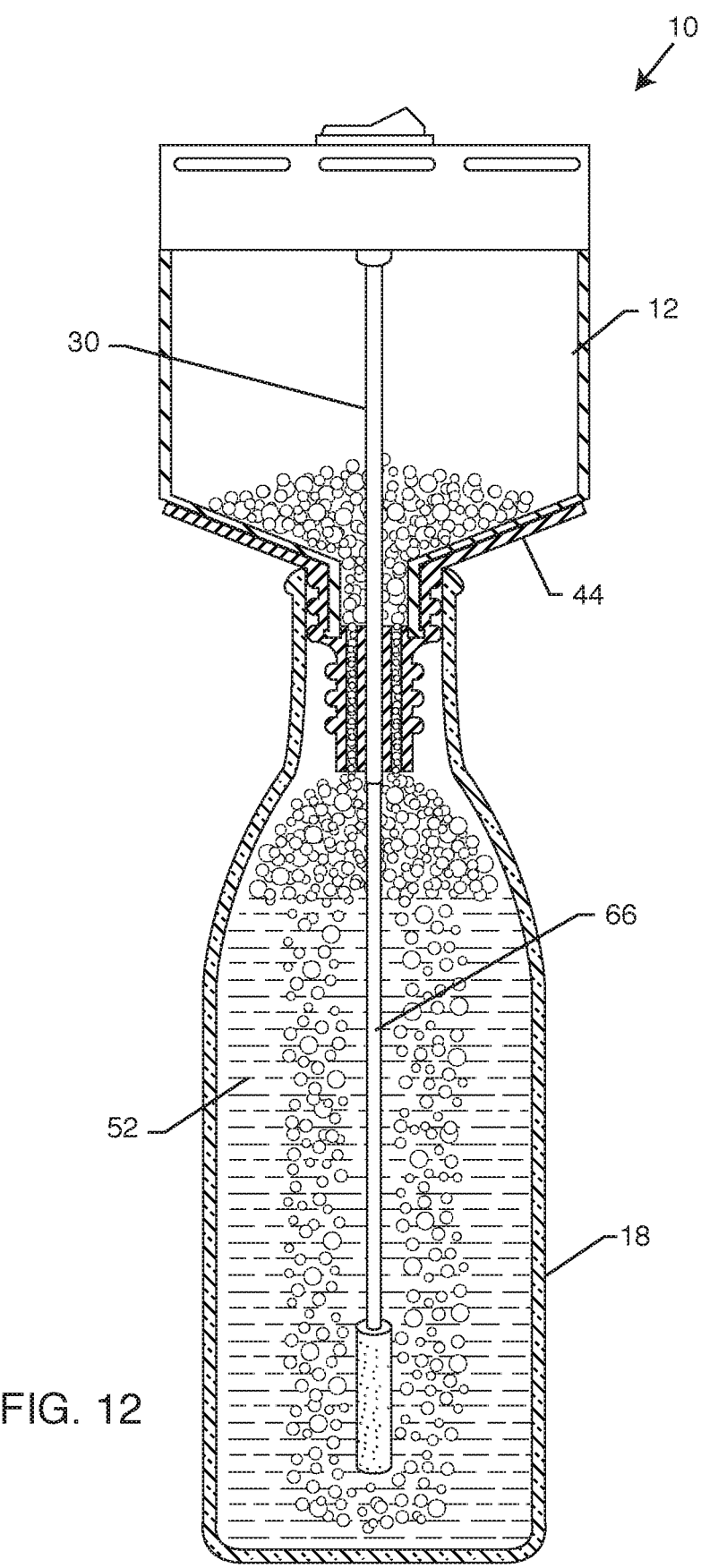
FIG. 12 is a sectional view of another exemplary embodiment of an aerator now with a telescoping gas conduit inside of a wine bottle.

FIG. 12 illustrates that the previous gas conduit 30 can be made into a telescoping gas conduit 66 (30). This is useful, for example, a shorter bottle of wine (also called a split) and a taller or regular bottle of wine or even a magnum bottle of wine, which is much taller. Referring once again to FIG. 12, one can see that the expansion chamber 12 has an integral rubber seal 44. By its own weight, this causes a seal between the top lip of the wine bottle and the chamber 12. This is important so that the wine bottles do not leak out and overflow down the sides of the wine bottle. Instead, this way the bubbles form inside the wine bottle and then are transferred into the expansion chamber 12 without leakage.

Figure 13:
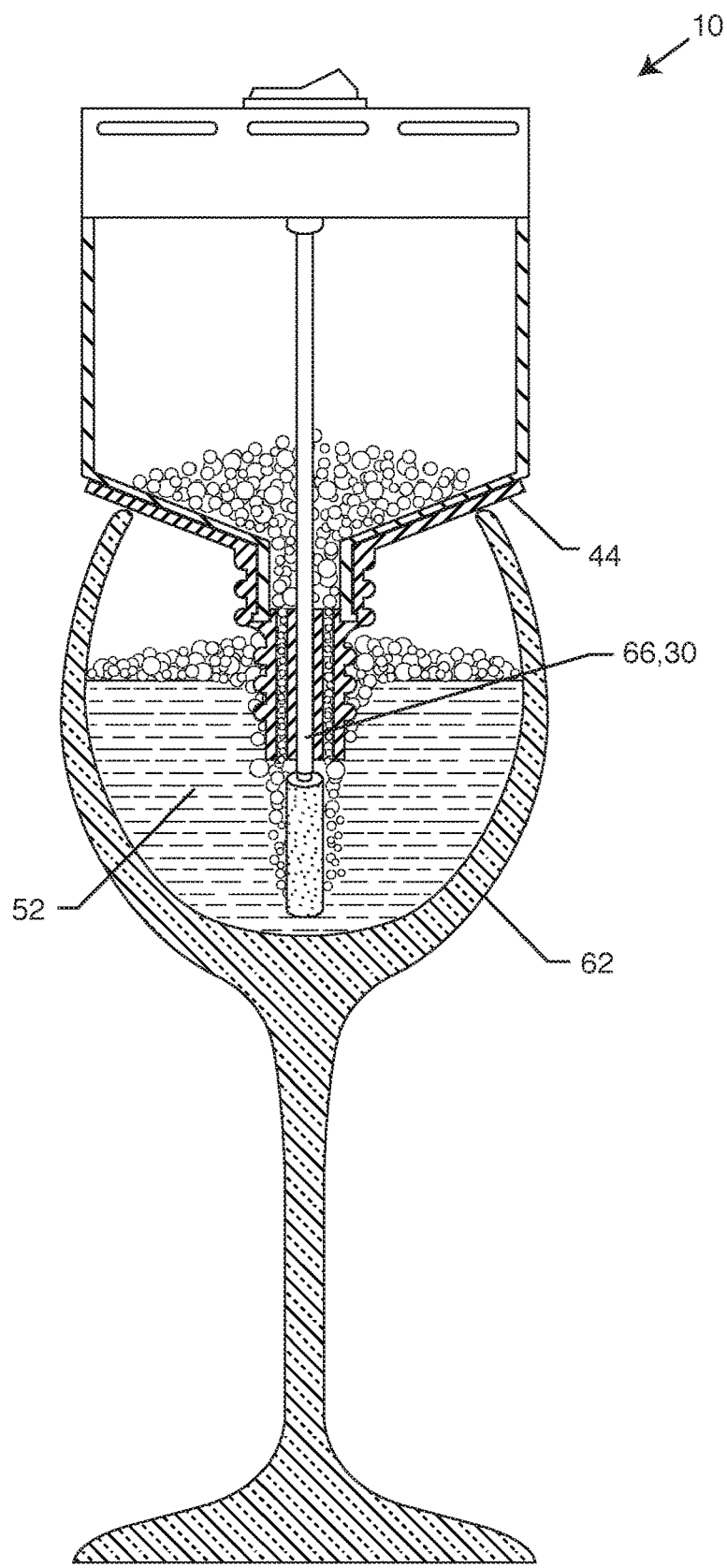
FIG. 13 is a view similar to FIG. 12, now showing the telescoping gas conduit retracted to fit a wine glass.

FIG. 13, in some ways, is very similar to FIG. 12, in that, the gas conduit 66 (30) is telescoped such that the entire apparatus will fit a wine glass 62. Again, there is a rubber, foam or seal 44 that prevents wine bubbles from overflowing the wine glass. The design of the seal 44, which is matched to the diameter of aerator assembly 10 allows a seal to be made with various diameter and sizes of wine glasses.

Figure 14:
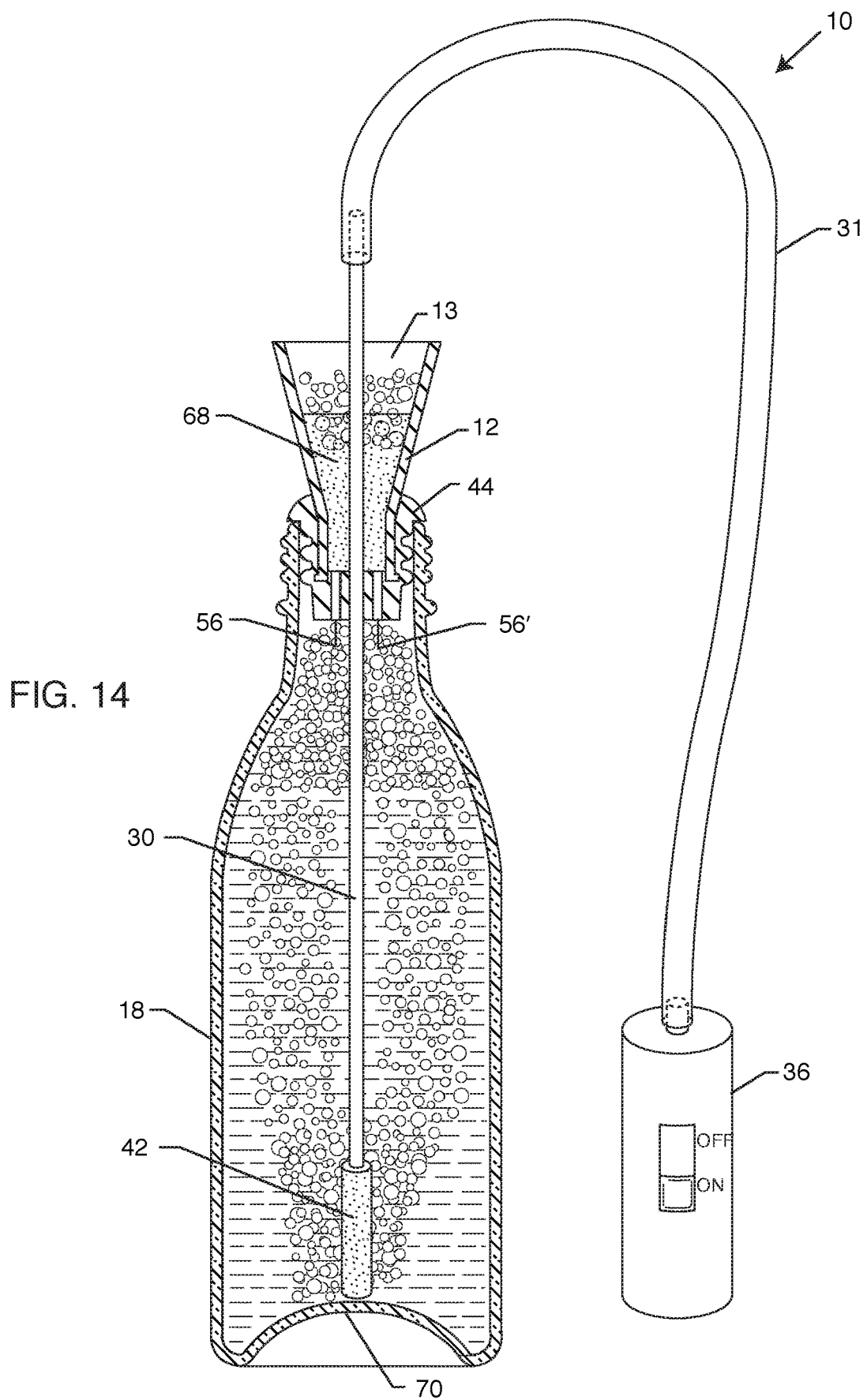
FIG. 14 is a sectional view of another exemplary embodiment of an aerator now with an additional bubble-reducing, aeration element.

The wine aerator apparatus 10 illustrated in FIG. 14 embodies dramatic improvements over all the previous embodiments previously described. Aerator system 10 of FIG. 14 eliminates the need for an open and large expansion chamber 12 sitting on top of the wine bottle whereas a smaller expansion chamber 13 may be utilized. First of all, the wine bottle 18 is more accurately drawn, in that, it includes a punt 70. Almost all wine bottles have a punt 70. This not only increases the strength of the wine bottle, but also leaves an area on either side of the punt (think of this as a diameter) where sediments may collect. In general, the aeration element may ideally be spaced at or slightly above the punt so it will not stir up the sediments.

Air bubbles flow out of the aeration element 42 and foam up on the top surface of the liquid inside of the wine bottle. These air bubbles, which are now under some pressure, go through the sealing area opening holes 56, 56', 56n (in other words, any number of air passage holes may be provided). The air bubbles would flow right out of the much smaller volume expansion chamber 13, except in this case, a novel secondary filtering element 68 is included. This element 68 is a bubble-reducing or bubble breaking filter element. This causes the bubbles to break up and turn back to a liquid whereby gravitational action will return the liquid back to the inside of the wine bottle.

It is desirable (but not necessarily required) that there be a space 13 above the bubble-reducing, filter element 68 so that one can readily observe whether the bubbles are exceeding the capacity of the remaining expansion chamber to hold them from overflowing. Also, the bubble-reducing filter element 68 may have a range of heights, diameters and porosities. For example, the bubble-reducing filter element 68 may be from 0.01 to 2 inches in height, but also may be above 2 inches in height. As can be understood by those skilled in the art, the height and size of the bubble-reducing filter element 68 will be dependent upon its ability and efficiency in reducing bubbles.

Referring back to the bubble-reducing, filter element 68, this can be a stainless steel mesh, it can be a stone, it can be plastic fibers, a plastic mesh, a filtering element (replaceable), paper elements or the like. The bubble-reducing, aeration element 68 may include fine mesh stainless steels, such as SS304 grade woven wire mesh. One example is from the Mesh Company, wherein multiple layers of woven wire mesh varying in sizes from Number 40 mesh all the way to Number 55 mesh could be used. Meshes of stainless steel grade 430 are also applicable. Much finer meshes that would allow air to pass, which would break up bubbles, include Number 60 mesh through Number 500 mesh. In general, one can use mesh size or pour size of microns. Through experimentation, the inventors have found that a pour size of microns would vary anywhere from 1-500 microns. In another embodiment, the pour size would be 0.1-200 microns. Any food grade material that would be stable in the presence of wine (in particular, alcohol) and cleanable can be used, such as Porex. The critical point is that the bubble-reducing, filter element 68 readily pass air, but break up wine bubbles. The gas source 36, which in most embodiments is a battery operated air pump, can be designed to provide various air flow rates. It is a careful design balance between the flow rate of the air pump 36 and the pore or mesh size of the bubble-reducing, filter element 68.

Referring once again to the construction of the bubble reducing filter element 68, one could also use polyester filtration fabric, such as the manufactured by a company called SAATIFIL™. SAATIFIL™ makes polyester fabrics in a variety of pore sizes and mesh counts. In addition, they make folded structures, which can be individually folded fabric or higher porosity sheets of fabric that bind a much more dense sheet of fabric in between, again folded up in accordion style. Accordion-style structure could be advantageous for bubble breaking filter element 68 in that, the bubbles would transition through a filtration breaking zone and then into air thereby allowing the bubbles to return to a liquid and then through the next bowl and the like. The SAATIFIL™ specification sheet indicates that mesh openings are available from 7 to 1950 micrometers with varying mesh counts. In this case, the materials can be polyamide or polyimide (PA) or polyester (PEF or PET). All of these materials are biocompatible. Samples of these materials were obtained by the inventors from the Medical Device and Manufacturing show in Anaheim, in February 2016 and evaluated. Any other biocompatible or food grade plastics could, of course, be used in place of these materials.

Referring now to aeration element 42, it is necessary that aeration element 42 be food grade or FDA compatible and also highly resistant to solvents. By highly resistant to solvents, we in particular mean the alcohol contained in wine. The inventors first experienced with the stones made for aquarium pumps that they rapidly deteriorated as they were made of plastic composites and sand or stone containing a binder material. First of all, these materials are not food grade and second, they were not chemically resistant and rapidly degraded and wore away during long term experience aerating wine. So it became a necessity for the inventors to locate a suitable aeration element material 42 that would be long term biocompatible, biostable, non-toxic and resistant to chemicals. After studying this situation, the following list of materials prove to be ideal for the application:

1) high purity porous ceramics, such as porous alumina ceramic. These are general manufactured by mixing the ceramic paste with a solvent and a binder, which both completely burn out during sintering, thereby leaving behind a porous ceramic structure.

2) high density polyethylene is another ideal material (HPPE or HDPE);

3) a close cousin is ultra-high molecular weight polyethylene (UHMWPE);

4) polyvinylidene fluoride (PVDF);

5) and polytetrafluoroethylene (PTFE). This material also goes by brand names of Gore Tex, Teflon and the like.

A major advantage of these materials is that companies, such as Porex Technologies Corporation located in Georgia, can formulate EPHDPE, UHMWPE, PVDF and PTFE into solid, but porous shapes. These materials are ideal to form the shape of the novel aeration element 42 of the present invention. Through experimentation, we have found that ideal pore sizes vary from 0.1 to 100 microns. Two particular aerators 42 that we have extensively tested, have a mean pore size of 45 to 75 microns and a second one had a mean pore size of 20 to 30 microns. Both of these formed a high density of small to medium to large bubbles and provided ideal long aeration. It will be understood that one can use pore sizes of less than 100 microns or less than 200 microns or even less than 500 microns depending upon the corresponding pump flow rate to achieve the desired goals. The desired goals being the proper aeration and taste improvement of wine within a reasonable time period. In other words, in the present invention, one is trying to achieve proper aeration of wine and taste control within seconds, or at most minutes, as opposed to typical decanting methods which can embody as much as several hours. The inventors experimented with distal aeration elements 42 obtained from Porex Technologies. We evaluated three different porosities. The first porosity was 20 to 30 microns. The second porosity was approximately 25 to 35 microns. The third porosity was between 45 to 75 microns. It was found that all three of these micron ranges work well as long as one varies the flow rate of the pump 36 accordingly. We used the maximum flow rate on this experiment of 4 liters per minute and a minimum flow rate of 0.5 liters per minute and we found that we could get each one of the stones to adequately aerate the wine in a reasonable amount of time. Through these experiments, we think an upper flow rate on the order of 10 liters per minute we think a lower pump flow rate would be on the order of 0.1 liters per minute. It also became apparent that the ability to adjust the flow rate while visualizing the wine, the bubbles and the height of the bubbles becomes a critical factor. Accordingly, there is a need for an adjustable flow rate embodiment of the present invention. Reasons for the needed variable flow rate adjustability include the vast differences and viscosities of the types of wine (red wines in particular) and also the fact that the flow rate that generate bubbles will vary with altitude (height above sea level). Because of people's enjoyment of wine in ski chalets and perhaps even in an underwater diving habitat, the patent will cover flow rates from 0.1 to 20 liters per minutes, realizing the "sweet spot" is between 1 and 10 liters per minute.

A complicating factor is that not all red wines have the same viscosity. For example, there are some relatively light bodied red wines, such as the Zinfandels and Pinots, which are in contrast to heavier bodied red wines, such as Cabernet Sauvignons and Bordeauxs. Through actual experimentation with steel wools and meshes, the inventors have discovered that, in general, the air flow rates of the air pump 36 will vary from 0.10 to 20 liters per minute (or 1 to 10 liters per minute). The inventors have found that approximately 0.5 to 3.0 liters per minute may be ideal for the aerator apparatus 10, as illustrated in FIG. 14, which embodies both an aeration element 42 and a bubble-reducing, filter element 68. By experimenting with various sizes of steel wool mesh, the inventors have also been able to determine that it may be desirable to have a pump 36 that has adjustable or variable flow rates. The reason for this is because of the varying viscosities depending on the type of grape and the type of wine or blend. Referring once again to FIG. 14, one can see that there is a rubber or equivalent sealing element 44, which is press-fitted into the inside diameter of the neck of wine bottle thereby preventing wine bubbles from escaping and creating a mess.

Figure 14A:
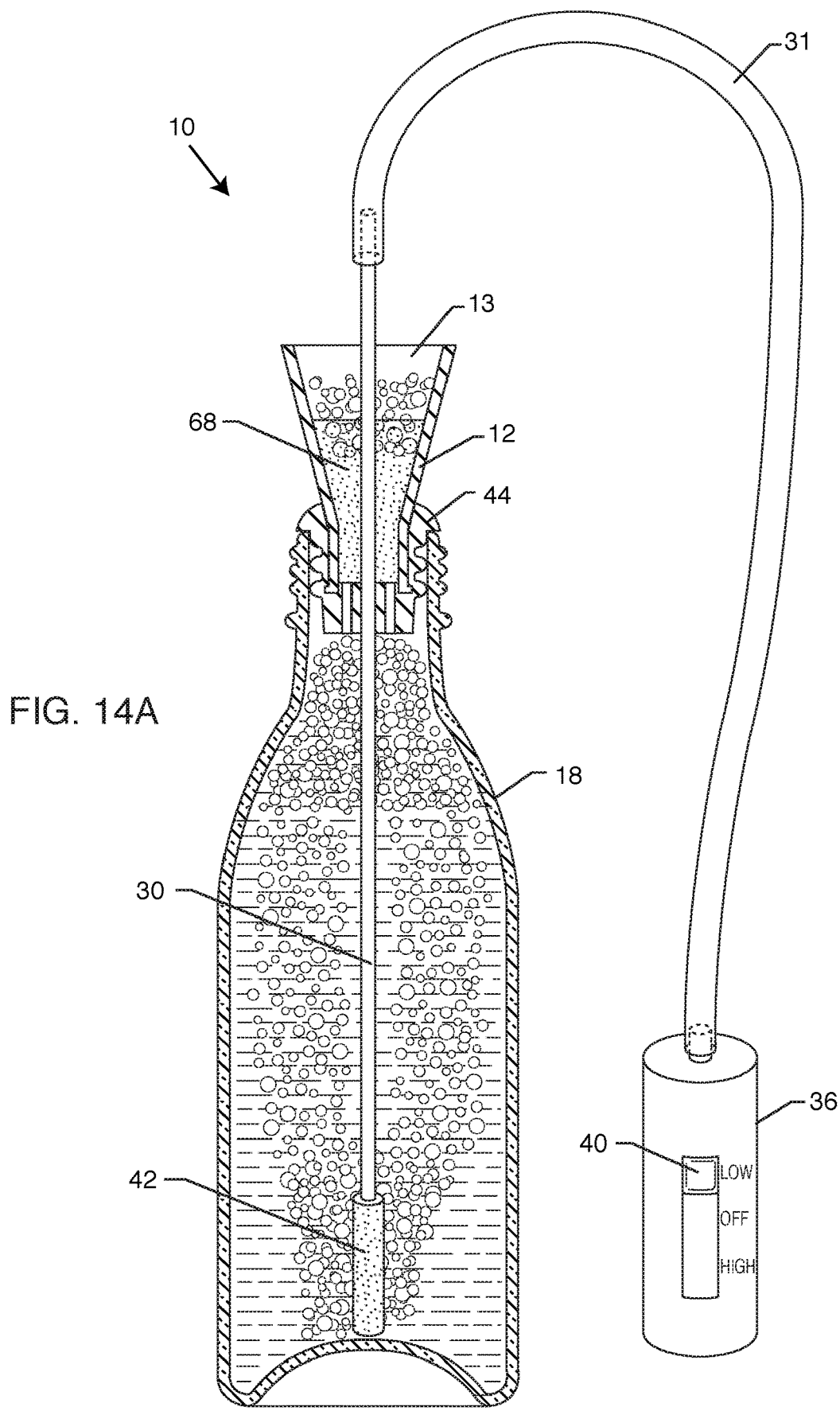
FIG. 14A is a view similar to FIG. 14, now showing an air pump with a high and low setting.

FIG. 14A illustrates that the air pump 36 has a switch 40 with an off position and a low and a high flow rate. For example, the low flow rate may be 0.5 liters per minute and the high flow rate may be 3 liters per minute. As previously described, the low flow rate may go as low as 0.01 liters per minute and the high flow rate may go as high as 10 liters per minute.

Figure 14B:
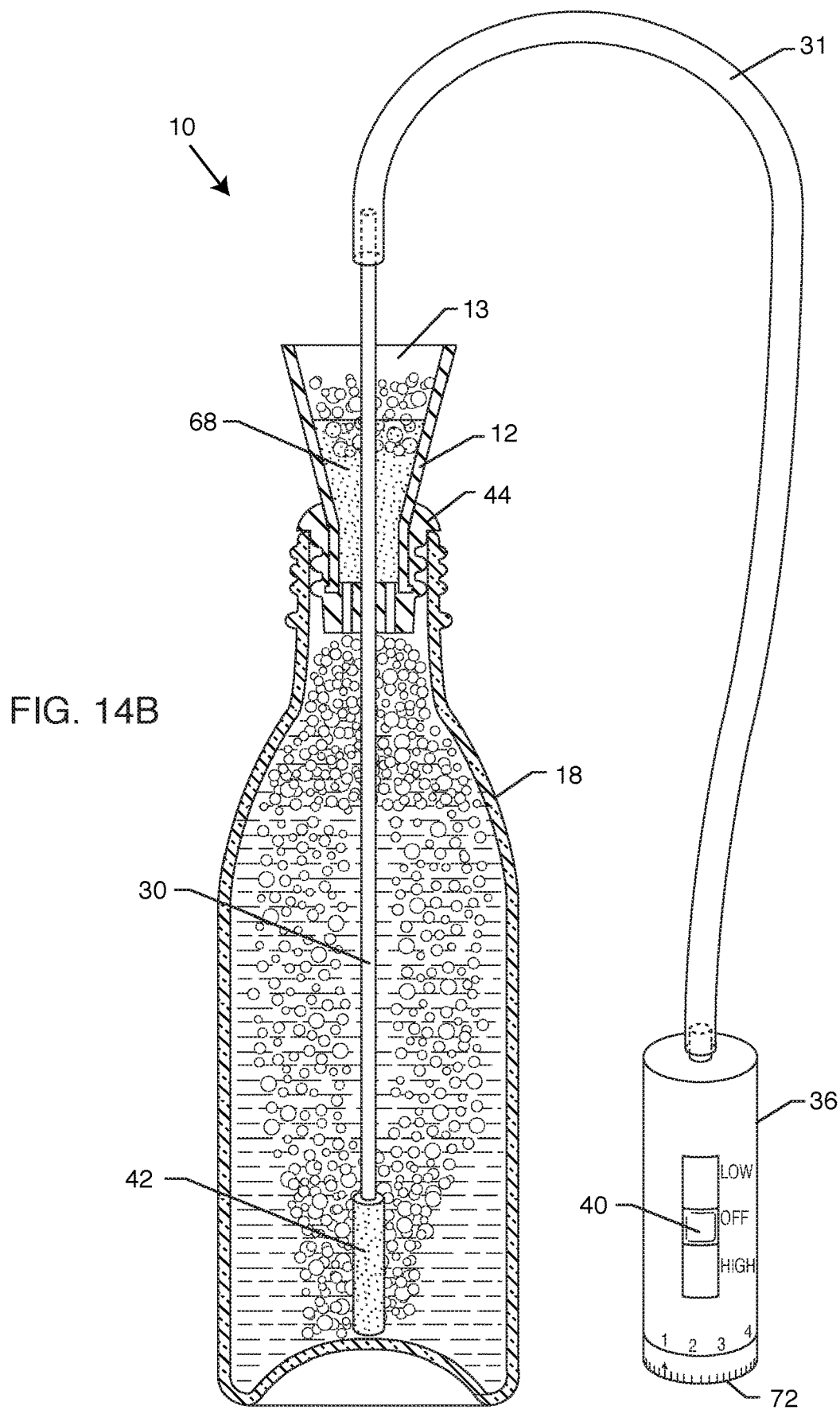
FIG. 14B is a view similar to FIG. 14A, now showing the air pump with a timer.

FIG. 14B illustrates a timer 72. This is a twist knob (but could take any shape), wherein the operator can adjust the air pump 36 to automatically shut off after a preset time has elapsed. For example, if one was using a very slow flow rate, such as 0.01 liters per minute, it may take 5 to 10 minutes to properly aerate the wine and have it ready for consumption. One could then adjust the timer knob 72 to the desired time setting. Obviously, this may take some experimentation on the part of the consumer. This would allow the consumer or restaurant server to start up the air pump 36 and then walk away, as it will automatically shut off. Excess aeration can damage certain delicate wines, such as Merlots. For example, one would not want to aerate the wine for half an hour. Accordingly, the adjustable timer 72 is very important so that one does not damage a delicate wine.

Figure 14C:
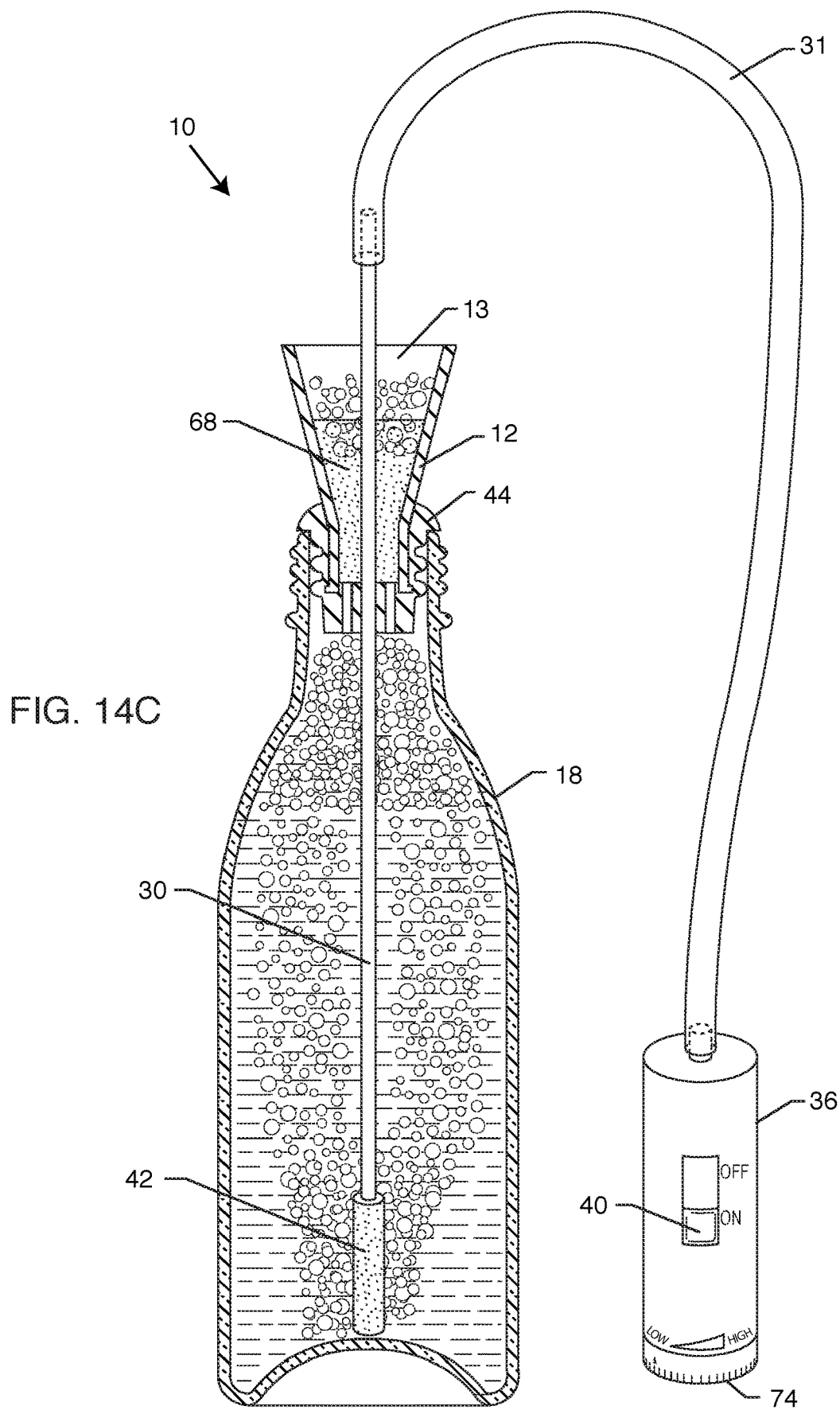
FIG. 14C is a view similar to FIG. 14, now showing a variable flow rate air pump.

FIG. 14C illustrates an air pump 36 with a simple on/off switch 40. In this case, there is a flow rate adjustment knob 74 located at the bottom of the assembly. This is in the same position as in the previously described timer 72 of FIG. 14B. In this case, the consumer may adjust the flow rate from a very low setting (as low as 0.1 liters per minute) to a very high setting (such as 20 liters per minute). In this way, one can experiment with the viscosity of the wine and make sure that it is being bubbled, but that the bubbles are not overflowing the bubble-reducing filter element 68 and expansion chamber 12 and 13. As is understood by those skilled in the art, any of the embodiments shown in one figure can be applied to another embodiment shown in a different figure, as these examples are not intended to be mutually exclusive.

In general, the pumps of the present invention are powered by DC Motors. One of the important features of a DC Motor is that its speed can be controlled with relative ease. There are generally three basic types of DC Motors: Series, Shunt and Compound. In general, speed can be controlled by the terminal voltage of the armature, the external resistance and the armature circuit and the flux per pole. Speed control of a DC Series Motor can be done either by armature control or by field control.

A brushless DC Motor is controlled by an electronic circuit. Fortunately, these can now be bought at very low cost as chips. For example, see Motor Driver Part No. DRV8301 built by Texas Instruments. The brushless DC Motor (BLDC) has become very popular in many applications. An advantage of the BLDC Motor is it can be made much smaller and lighter than a brush-type motor with the same power output. This makes it ideal for the present invention. In addition, there are no brushes to wear and no metal particles to worry about getting into wine. BLDC Motors also lend themselves to either resistive or digital speed controls.

Figure 14D:
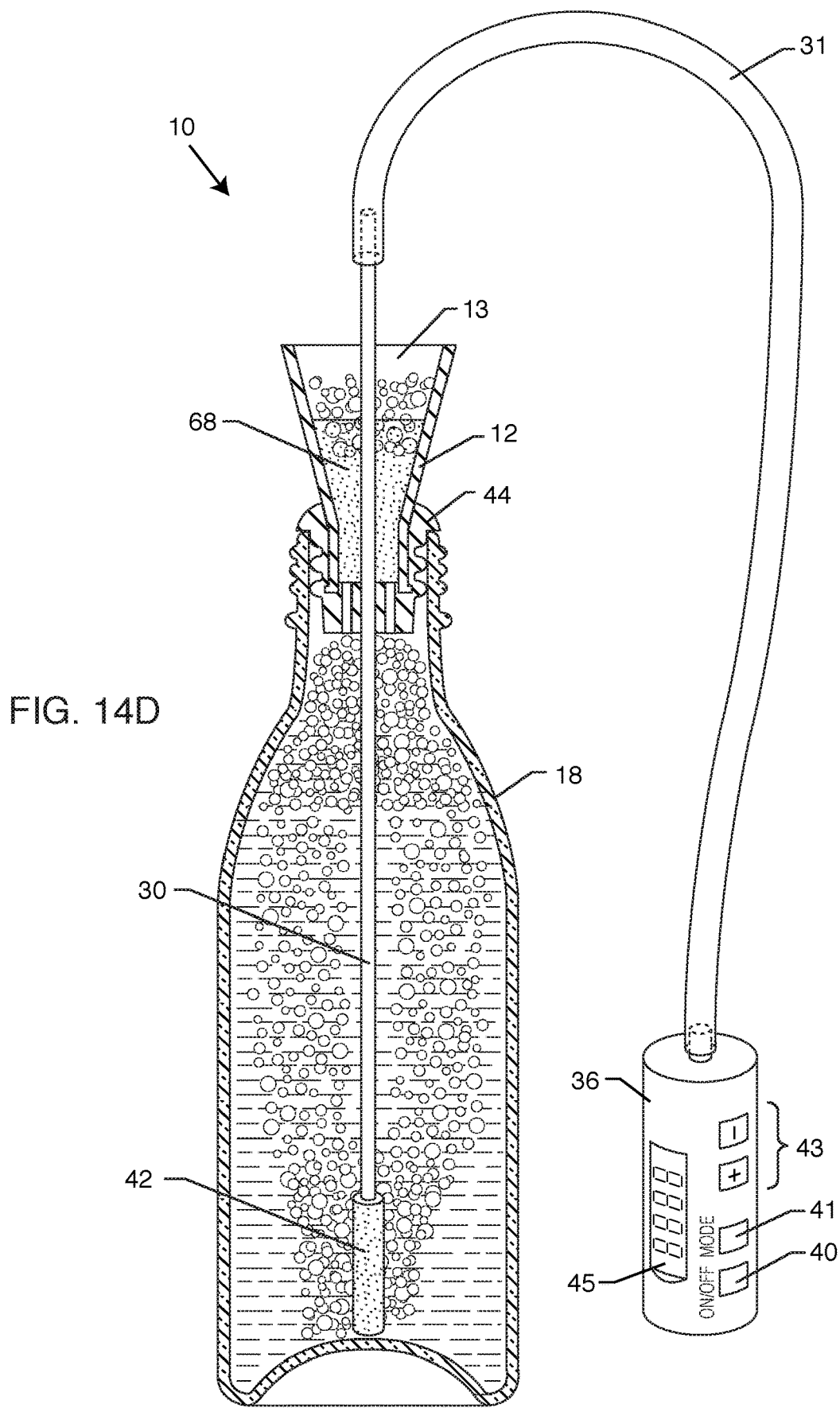
FIG. 14D is a view similar to FIG. 14, now showing a digital display integrated into the air pump.

FIG. 14D illustrates another embodiment where the pump body 36 has a push button mode switch 41, an on/off switch 40 and then +/− switches 43. It also has a digital display 45. In one embodiment, this would be a 4-segment display 45. By pushing the mode switch, one can cycle through what the display is showing digitally. For example, one push of the mode switch 41 would display flow rate and then one could use the + and − buttons 43 to raise or lower the flow rate across a range. By pushing the mode switch 41 again, after having already selected a flow rate, one then goes to a timer mode. Again, by pressing the + and − buttons 43, one can increase the amount of time or decrease the amount of time. For example, it has been previously stated that an ideal flow rate for many wines is about 2.8 liters per minute. So when one pushes the mode button once and it goes to flow rate, it could default to 3 liters per minute. Then one could use the + and − buttons to lower it or raise it. Using a proper motor controller chip, this would be almost infinitely variable up and down from very slow to very fast. The same could be done when you press the mode switch a second time when it goes to the time display. The default time, for example, might be 20 seconds and one could lower that down to just a few seconds or to as much as several minutes.

Figure 14E:
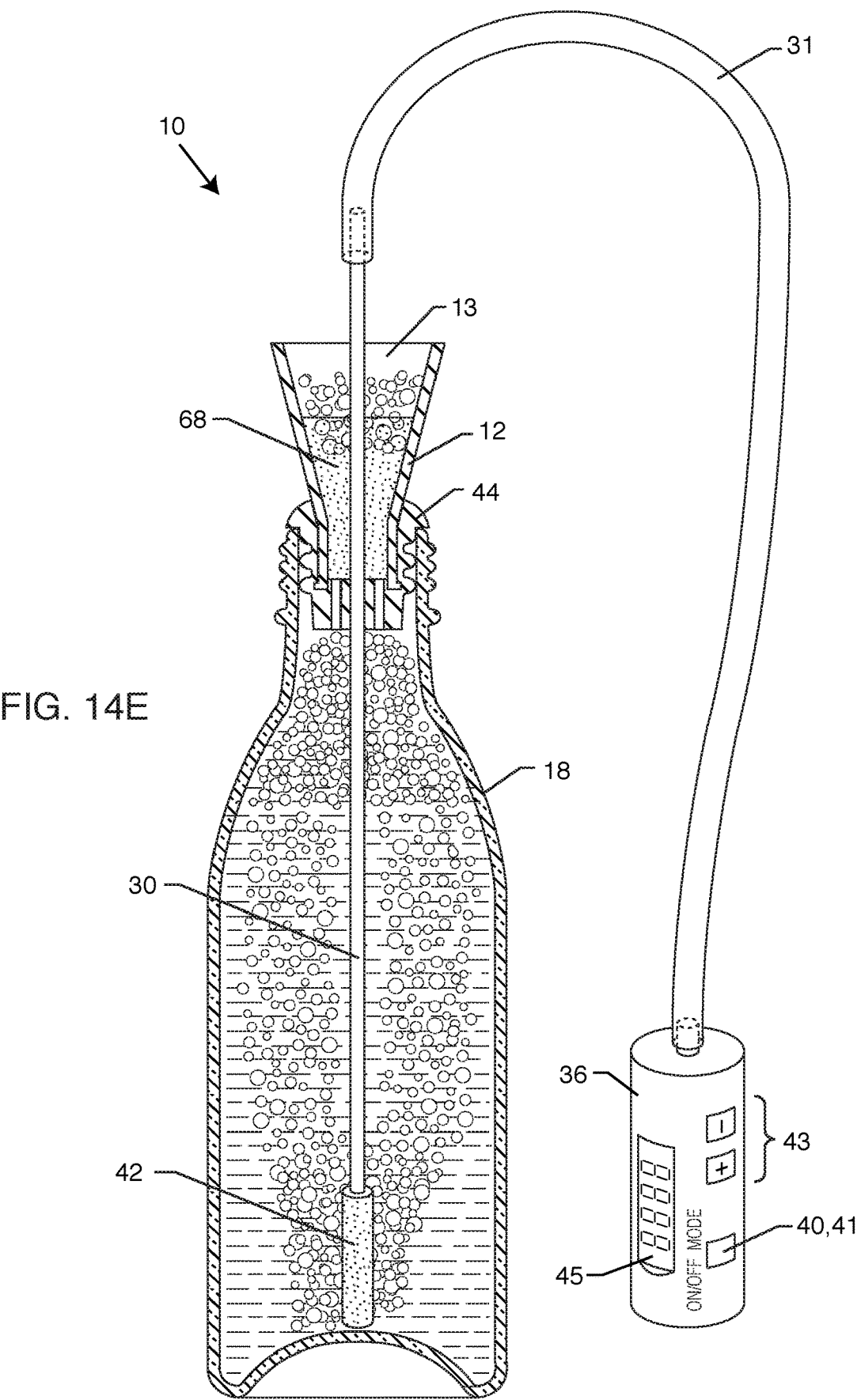
FIG. 14E is a view similar to FIG. 14D, now showing a simplified button layout with the digital display integrated into the air pump.

FIG. 14E is another embodiment where the separate off/on push button could be eliminated and everything could be done off of one switch 40, 41 which is both the on/off switch and the mode switch. In other words, with one push of the switch 40, 41 the digital display would display ON and then a second push of the switch 40, 41 would display FLOW RATE and then a third push of the switch 40, 41 would display TIME. Pushing a fourth time would then display OFF. Speed control can also be achieved through resistive voltage dividers whereby, multiple position switches that are switching in various values of resistors then control the voltage and the armature circuit. This was previously described in FIG. 14-14A of the slide switch. One could also use a variable resistor configured as a potentiometer.

Figure 14F:
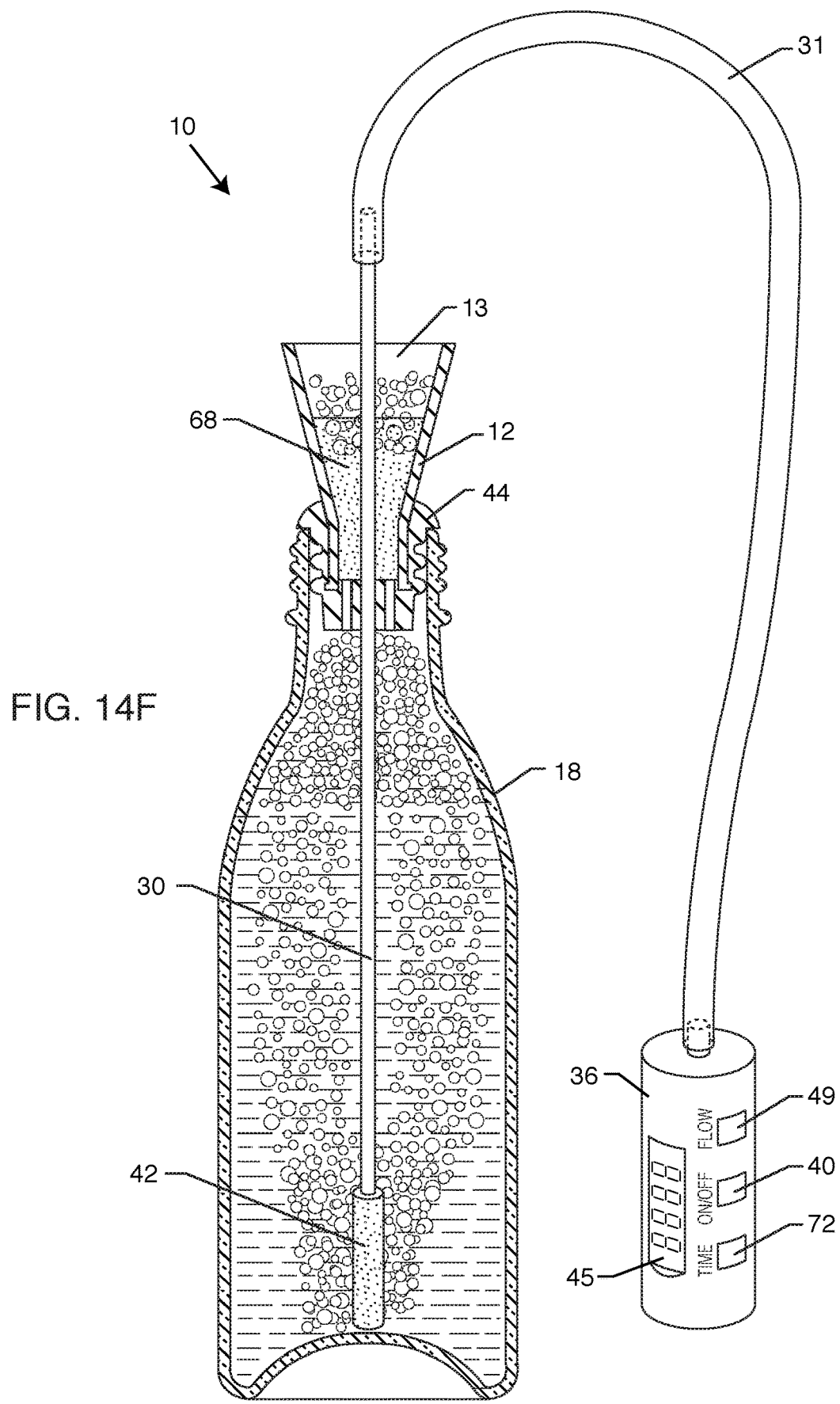
FIG. 14F is a view similar to FIG. 14D, now with a new embodiment of a button layout with the digital display integrated into the air pump.

FIG. 14F illustrates yet another embodiment where there is an on/off switch 40, but now there is a separate timer switch 72 and a separate flow rate switch 49. Now the timer and flow rate can easily be selected and changed. For instance, one could combine the teachings of FIG. 14C and FIG. 14D. To do this, one would remove the on/off switch 40 from FIG. 14C and replace it with the digital display 45 and the on/off switch 40 and the mode switch 41 from FIG. 14D. However, referring back to FIG. 14C, one would keep the rheostatically controlled flow rate switch 74. In the inventors' experience, when one is observing bubble flow, one has to very quickly make both coarse and fine flow rate adjustments in order to hold the bubbles at an equilibrium height. A rotary style pump flow controller is best for this purpose, This would take the form of a rheostat or potentiometer with a knob 74, as illustrated in FIG. 14C.

Figure 14G:
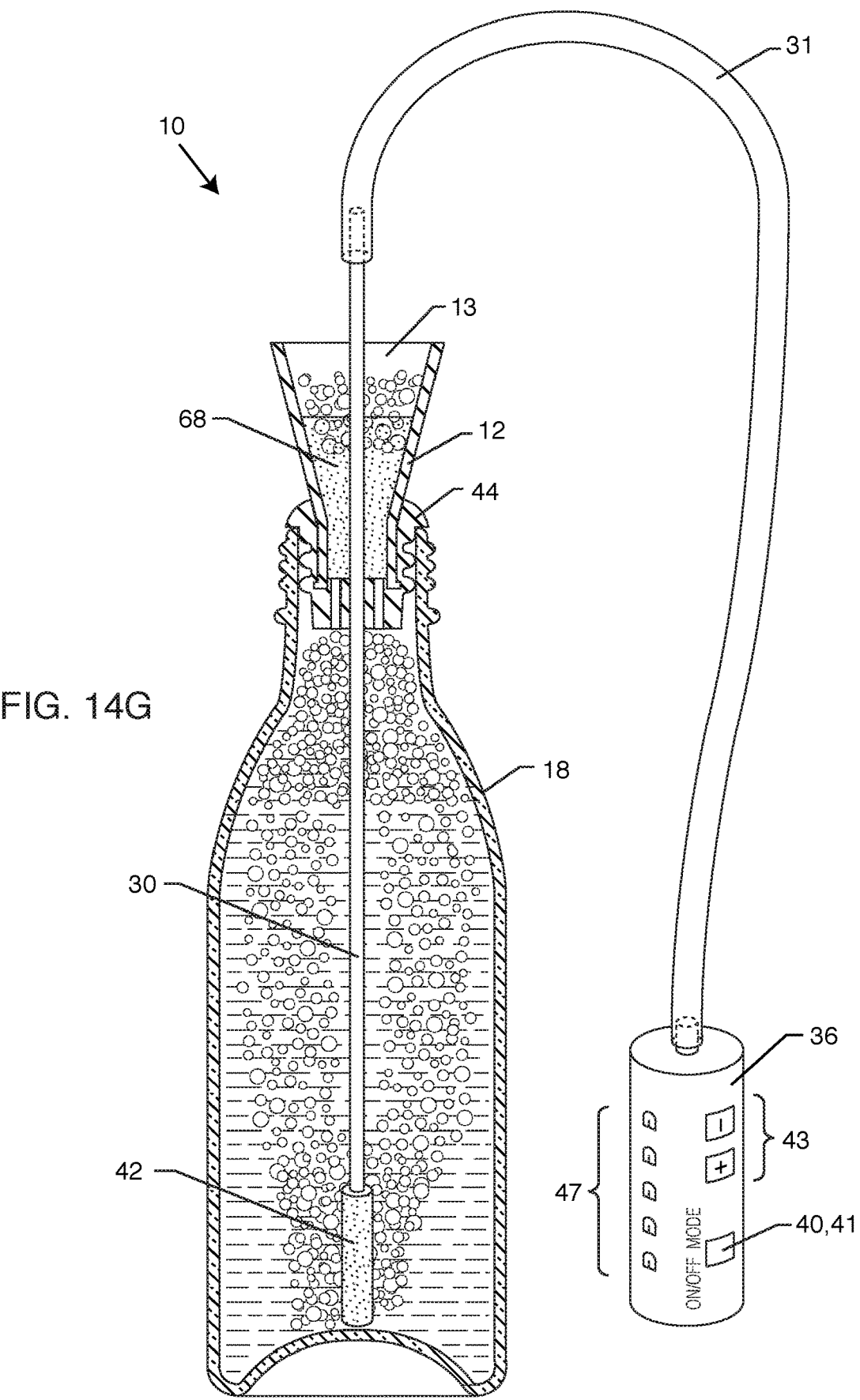
FIG. 14G is a view similar to FIG. 14, now showing an air pump with LEDs for displaying information.

Another type of digital control indicator is illustrated in FIG. 14G. In this case, there are a number of LED lights 47. This replaces the digital display 45 in the previously described controller. A low flow rate setting would be when one LED light was on and when all the LED lights came on, it would be the highest flow rate. When one pressed the mode switch again, one would go to the time function and a short period of time would be one LED light and a longer period of time would be when all the lights are lit. As can be understand by those skilled in the art when reviewing FIGS. 14-14F, any of the structures and teachings taught herein can be cross applied to any of the embodiments disclosed throughout this specification.

Figure 15A:
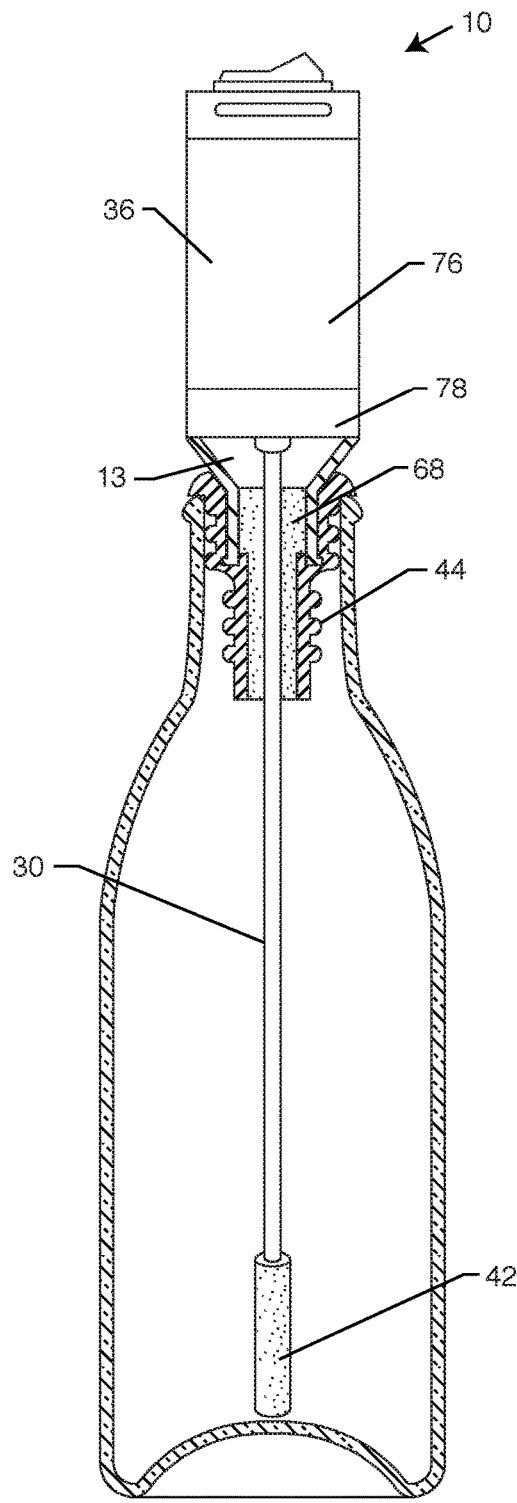
FIG. 15A is a sectional view of another exemplary embodiment of an aerator now integrated as a single assembly.
Figure 15B:
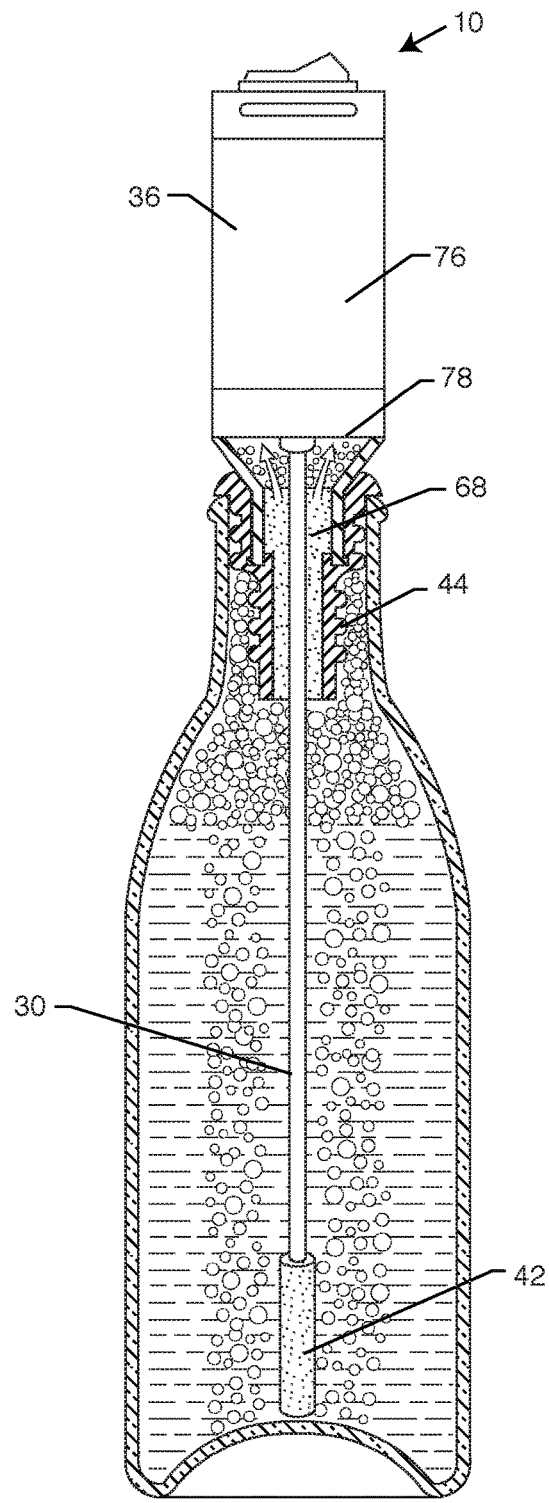
FIG. 15B is a view similar to FIG. 15A now showing the aerator in action.

FIGS. 15A and 15B illustrate that the aerator 10, previously illustrated in FIGS. 14 through 14G, can be integrated by removal of the extension, gas conduit 31. In the previous embodiments, the extension, gas conduit 31 is typically a small clear flexible hose. In FIGS. 15A and 15B, gas conduit 30 extends directly below the air pump 36. Air pump 36 is configured to be sealed directly into the top of the wine bottle and also provide a housing for bubble-reducing, aeration element 68 along with an extension, expansion chamber 13.

FIG. 15B shows the pump in operation with bubble formation, wherein the bubbles break up in the bubble-reducing filter element 68 and only a few bubbles appear on the top surface of filter element 68. In this embodiment, there is an upper housing 76 of air pump 36 that is removable from the lower housing 78, which includes the gas conduit 30 and the aeration element 42. This can be a quick disconnect, including a snap, a screw or a friction fit assembly. First, the upper element 76, which includes electrical components including a switch, a battery and an air pump is removed from the lower unit 78, which includes the gas conduit 30 and the aeration element 42. The lower unit 42, 30, 78 can then be washed in a sink or put in the dishwasher. This protects sensitive electrical components from being exposed to water and allows all the important parts that have come in contact with wine to be cleaned properly and safely.

Figure 16:
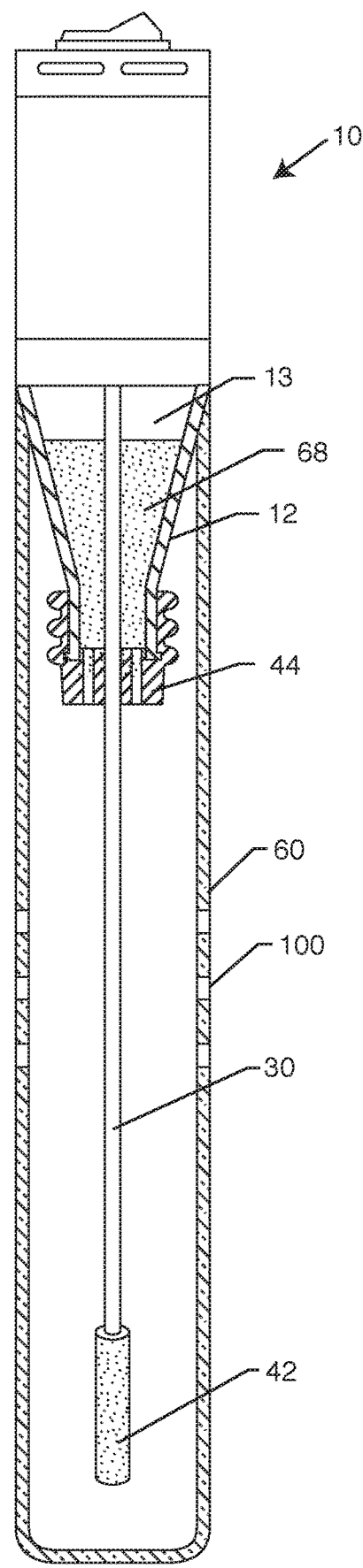
FIG. 16 is a sectional view of another exemplary embodiment of the aerator of FIGS. 15A and 15B now with a case.

FIG. 16 illustrates a storage case 60, which allows the aerator assembly 10 (previously described in FIGS. 15A and 15B) to be safely stored in a drawer, a cabinet, purse, briefcase, pocket or the like. In some embodiments of the invention, the gas conduit 30 could be of a flexible plastic or polyurethane tubing. In other embodiments, it may be rigid stainless steel or even glass. Accordingly, it is important to protect it from damage, particularly during storage or transport. Also, the aeration element 42 can be damaged by coming into contact with other hard objects. Accordingly, the storage case 60 is important to protect the sensitive elements of aerator 10. The storage case 60 may be perforated with many fine holes 100 to facilitate an air exchange. These holes 100 are optional and the case 60 can be designed to include or not include these holes 100. The holes 100 are important if the wine aerator is put away wet so that it can properly dry while it's in a drawer or a cabinet.

Figure 17A:
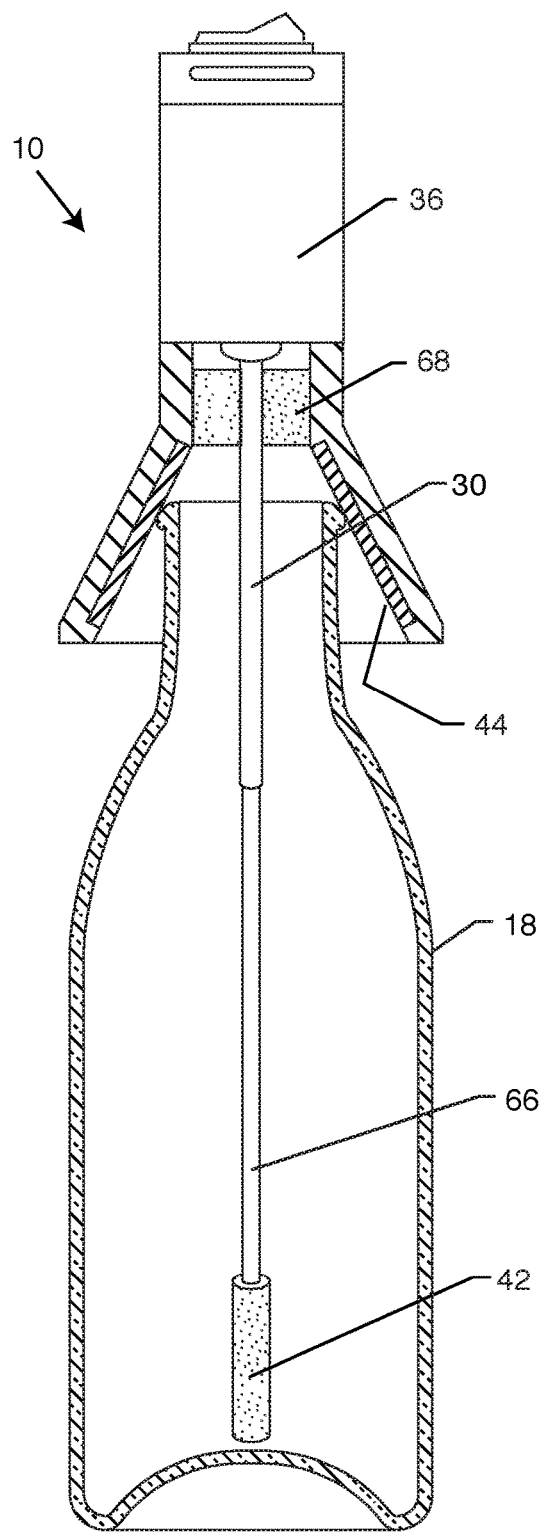
FIG. 17A is a view similar in structure to FIG. 15A where now the sealing element seals to the outside of the wine bottle.
Figure 17B:
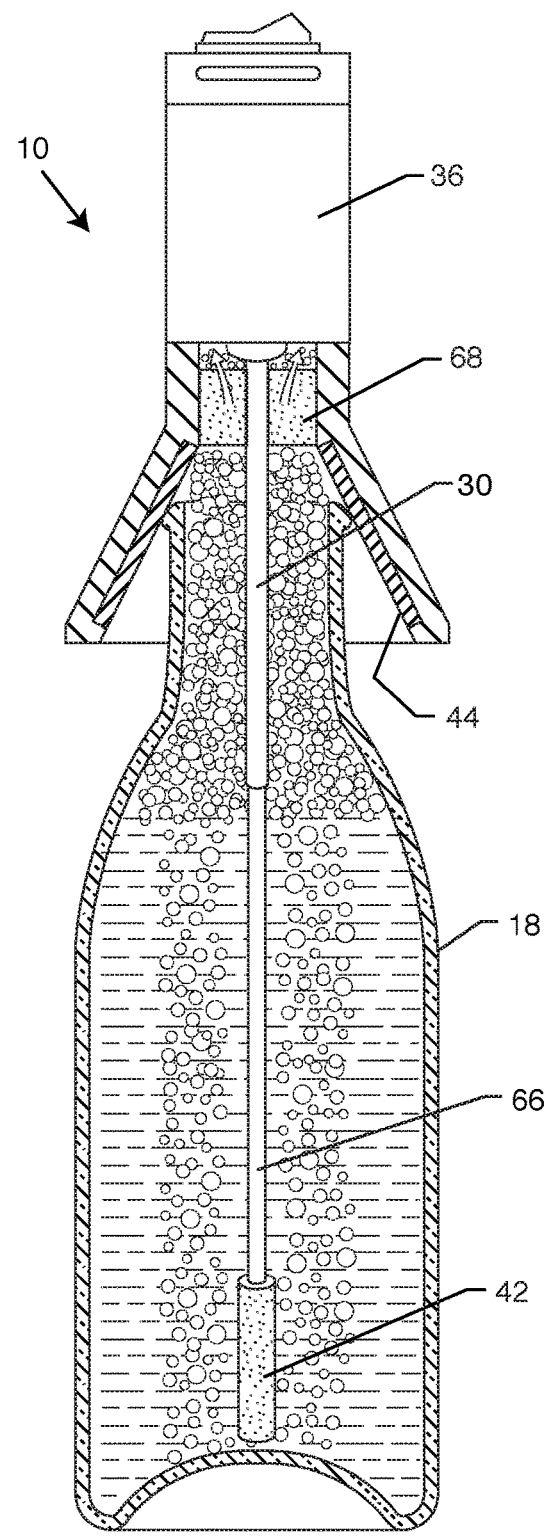
FIG. 17B is a view similar to FIG. 17A now showing the aerator in action.

FIGS. 17A and 17B illustrate a different sealing arrangement where seal 44 (flexible rubber, silicone or the like) presses down against the top of the wine bottle. Sealing is accomplished by the weight or the gravitational attraction of the air pump 36. Additional sealing may be easily accomplished by the operator simply grasping the pump body 36 with his or her hand and simply pushing down against the wine bottle. It would be very easy to grasp this structure to create additional sealing force. As shown in FIGS. 17A and 17B, it is optional to have the telescoping gas conduit 66 that can be reduced in length to fit inside the gas conduit 30. As it understood by those skilled in the art, the telescoping feature of the gas conduit 30 and 66 can be applied to any of the embodiments shown or taught herein.

Figure 18:
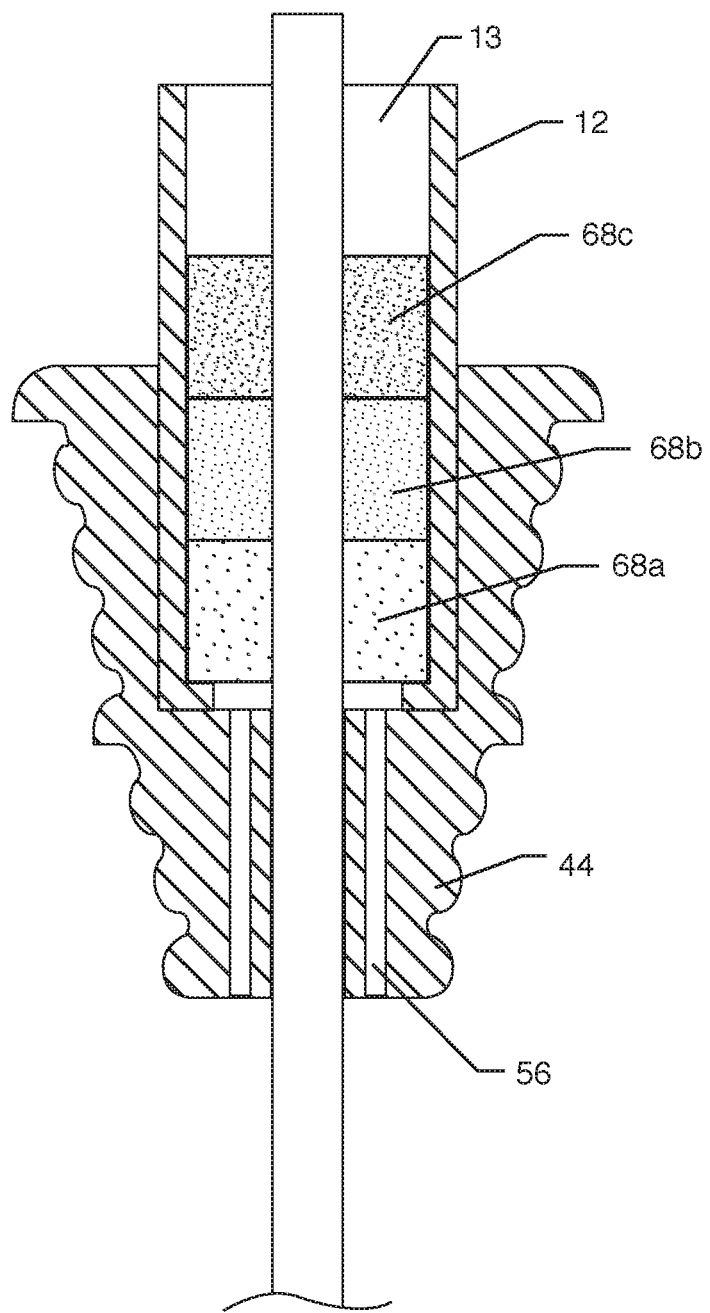
FIG. 18 is a sectional view of another exemplary embodiment of the bubble-reducing, aeration element.

FIG. 18 illustrates a graduated diameter sealing element 44 so that the present invention will fit in various sizes of wine bottles or containers. Referring once again to FIG. 18, one can see that the bubble-reducing, filter element 68 has been broken up into an element 68a, 68b and 68c. This shows that the bubble-reducing, filter element 68 may be graduated such that it starts with coarse filtering, then medium filtering and then fine filtering; thereby breaking up wine air bubbles such that they will turn to a liquid and flow back down through passageways 56. It will also be understood by those skilled in the art, that one could flip the arrangement, as illustrated in FIG. 18. In other words, element 68a could appear on top and 68c could appear on the bottom. One will also understand that 1, 2, 3 . . . or even "n" different filter elements 68 can be stacked up in the present invention, all with varying mesh densities.

Figure 19:
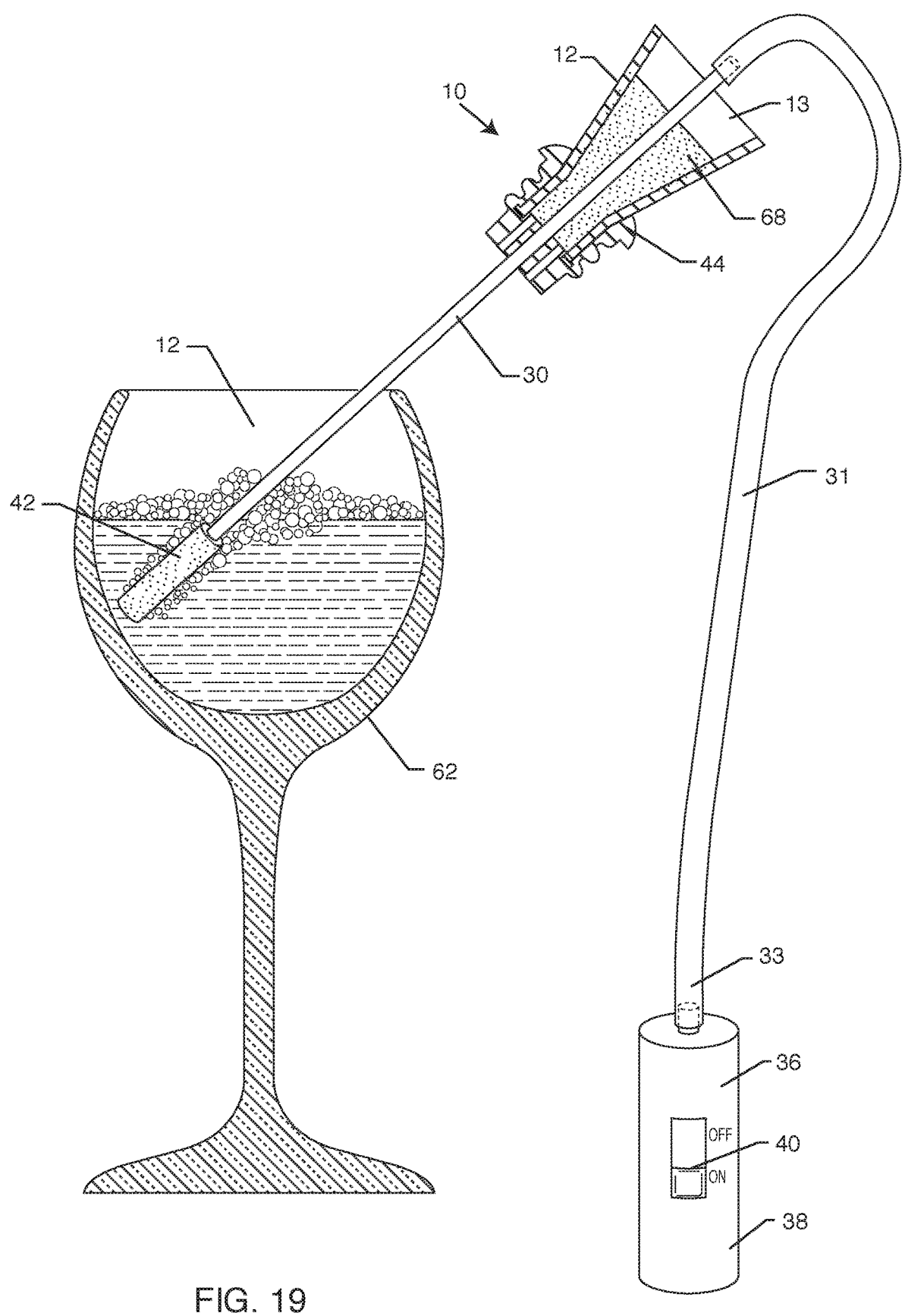
FIG. 19 shows the structure of FIG. 14 aerator a wine glass instead of a wine bottle.

FIG. 19 illustrates that the novel aerator 10, as previously illustrated in FIGS. 14 through 18, which embodies both a distal aeration element 42 and a bubble-reducing, filter element 68, can also be used directly to aerate wine in a wine glass (or other container) 62. The wine glass 62 is, in general, not filled all the way to the top with wine. This provides a natural retention element 12 for the wine bubbles, as shown. Referring to FIG. 19 and all of the other figures of the present invention, it will be appreciated that in any embodiment, variable speed and variable time aspects, as described in FIGS. 14A through 14C, may be incorporated.

Figure 20:
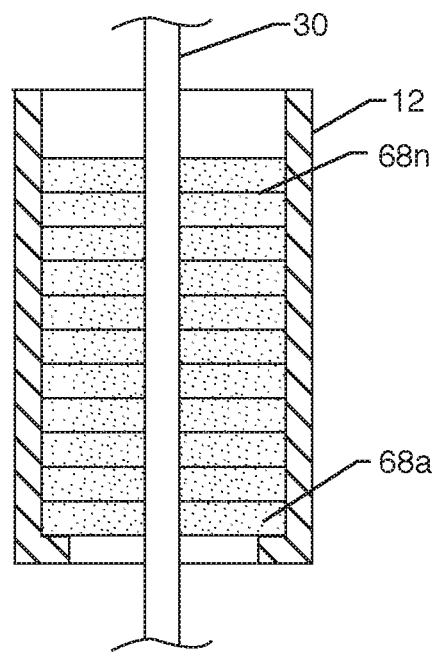
FIG. 20 is a sectional view of another exemplary embodiment of the bubble-reducing, aeration element.
Figure 21:
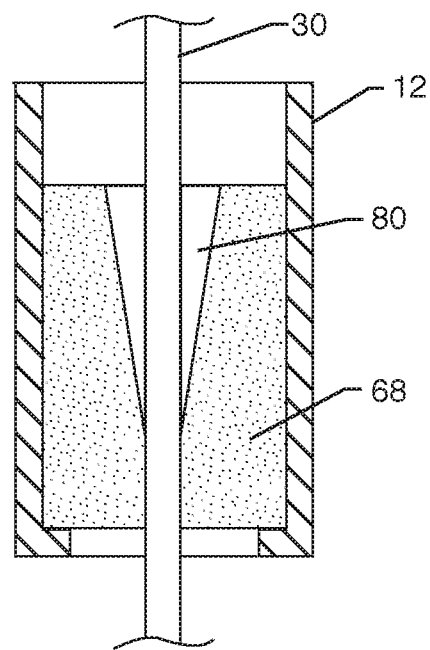
FIG. 21 is a sectional view of another exemplary embodiment of the bubble-reducing, aeration element.

FIGS. 20 and 21 illustrate alternative embodiments for the bubble-reducing, filter element 68, as previously described in FIG. 14 and on. FIG. 20 illustrates that element 68 can have any number of individual layers that are physically laid together, co-bonded, press-fit or the like.

FIG. 21 illustrates that the bubble-reducing, filter element 68 has been modified to include a retention area 80 where the air bubbles can collapse back into a liquid and filter back down through element 68 and thereby return to the bottle (not shown). It will be appreciated that the cross-section of the retention area 80 appears triangular in FIG. 21 but in reality is a frustoconical shape, which means it takes the shape of a cone or frustum. It will also be appreciated that this retention area 80 can take many shapes including rectangular shapes, semi-circular shapes or the like.

Figure 22:
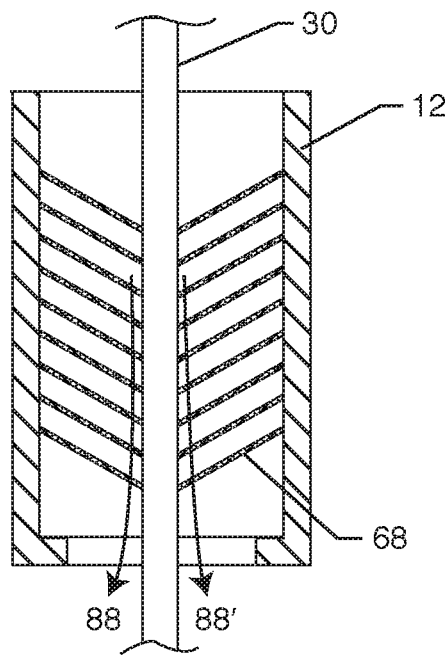
FIG. 22 is a sectional view of another exemplary embodiment of the bubble-reducing, aeration element.

FIG. 22 illustrates that bubble-reducing, filter element 68 may be disposed as plates separated by an air space. In FIG. 22, they are shown angled downward to facilitate the breaking up of bubbles creating liquid flow paths 88 and 88' thereby returning a liquid back into the wine bottle.

Figure 23:
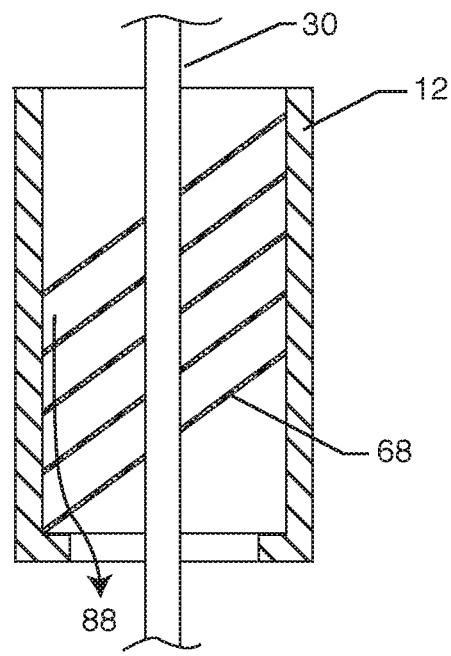
FIG. 23 is a sectional view of another exemplary embodiment of the bubble-reducing, aeration element.

An alternative embodiment of FIG. 22 is shown in FIG. 23, wherein the plate 68 are angled to one side for the same purpose to collect the dissipating wine bubbles and form a liquid return flow path 88.

Figure 24:
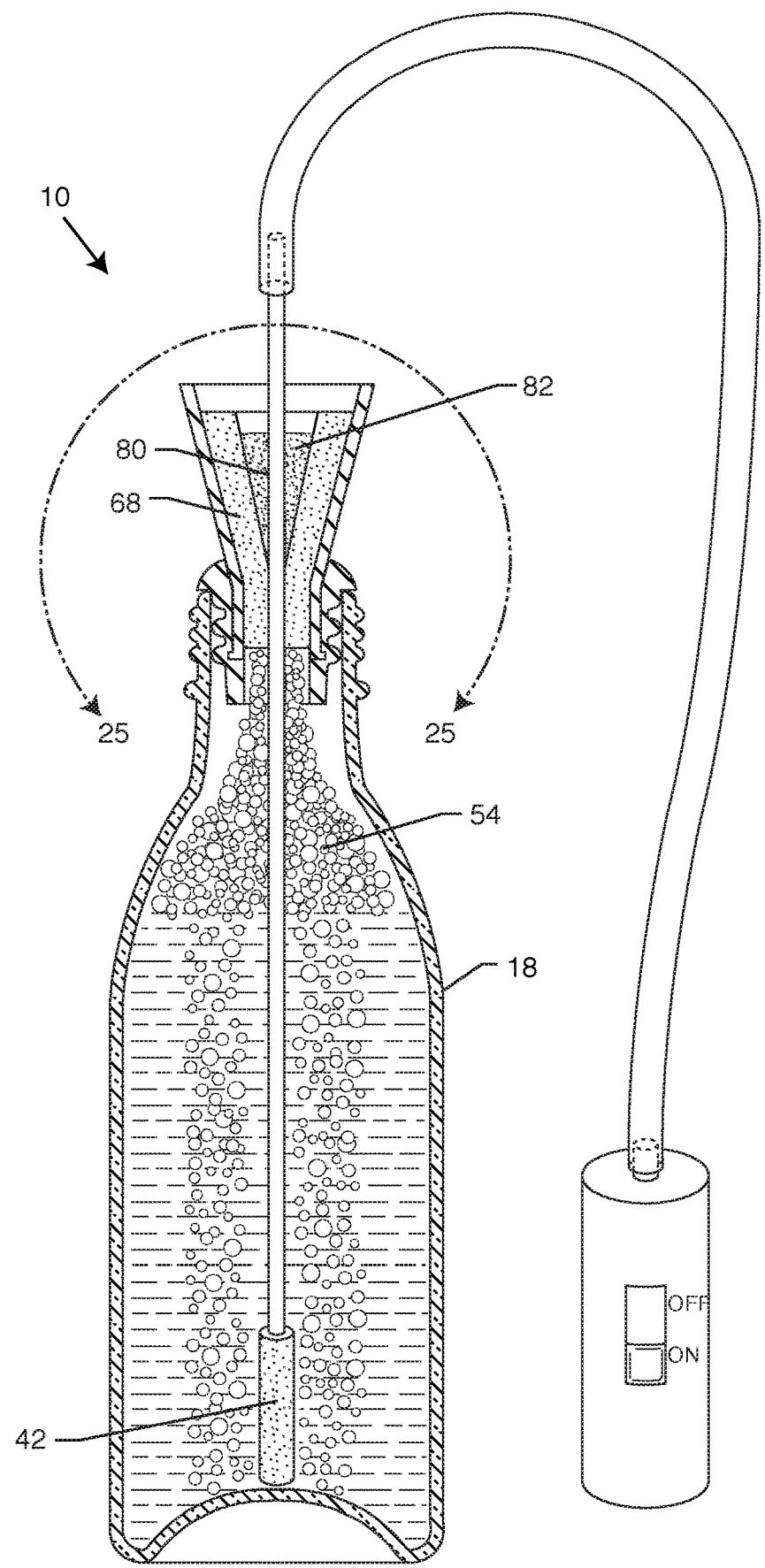
FIG. 24 is a sectional view of another exemplary embodiment of the bubble-reducing, aeration element with a retention area in action.

FIG. 24 illustrates the bubble-reducing, filter element 68 of FIG. 21 in operation. One can see that the aeration element 42 is producing many bubbles 54 of varying sizes. After passing through the bubble-reducing filter element 68, one can see that the retention area 80 of FIG. 21 fills up with some very fine bubbles 82. These fine bubbles 82 are in the process of breaking back down into a liquid where they can flow back through element 68 and return to the wine bottle.

Figure 25:
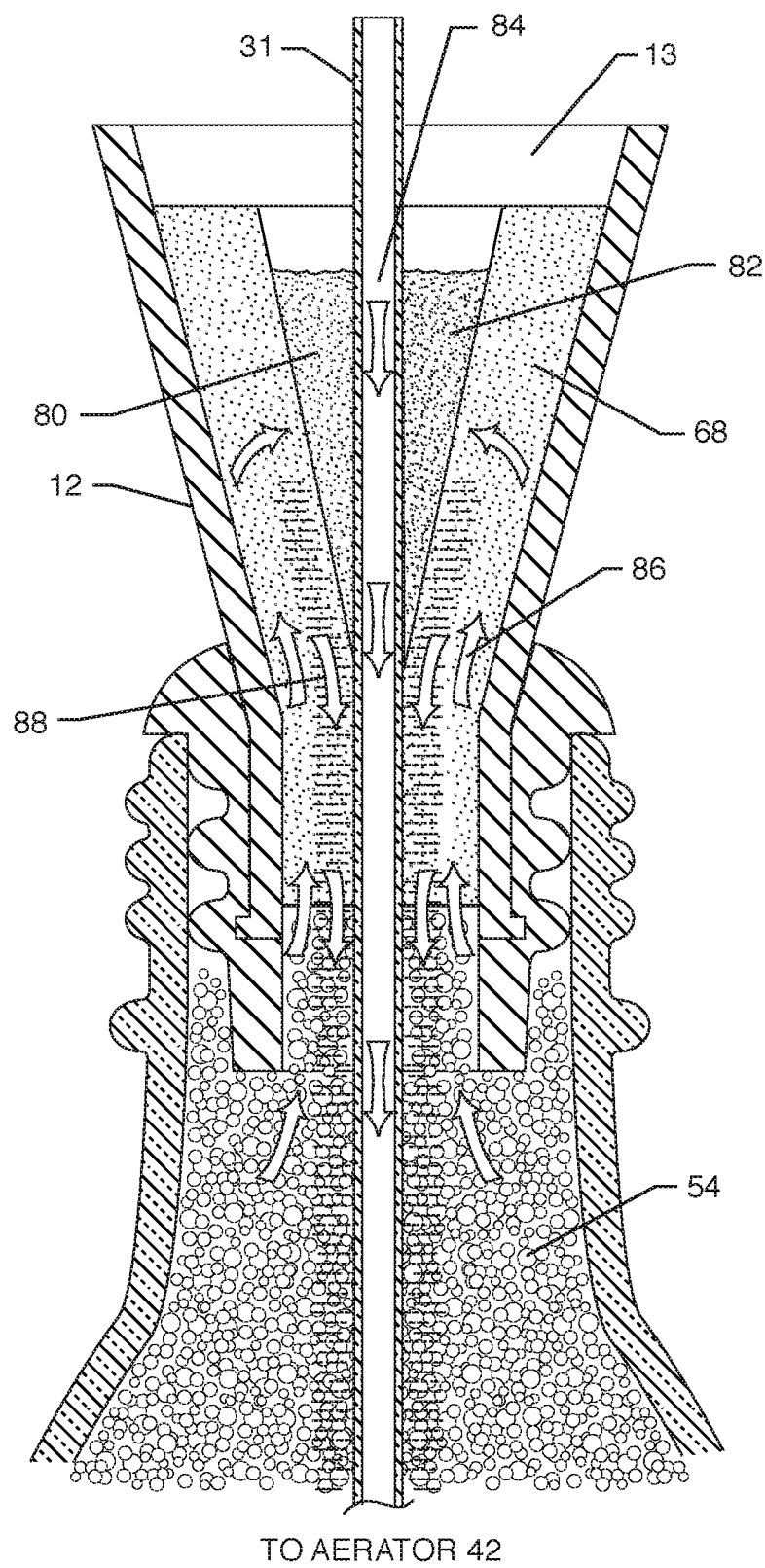
FIG. 25 is an enlarged view of the structure of FIG. 24 taken along lines 25-25.

FIG. 25 is a blown-up section taken from 25-25 from FIG. 24 and illustrates the process of the bubbles 54 passing through filter element 68. Referring once again to FIG. 25, one can see there is an upward flow 86 of wine bubbles that are broken up and dissipated in the bubble-reducing, filter element 68. These bubbles emerge as either a liquid or very fine bubbles 82 within the retention space 80. The upward flow of bubbles 86 is generated by the downward flow of air 84 within the gas conduit 31 (to aeration element 42 not shown). As the tiny wine bubbles 82 break up into a liquid, there is a gravitational flow 88, which allows the liquid to return back to the wine bottle thus creating a steady state process. A steady state process is easy to accomplish by the variable flow rate device, as previously described as FIGS. 14-14G. The retention chamber 13 is important as a safety device because if wine bubbles start to appear there, then one turns down the flow rate. The open end shape of the retention chamber 13 is also particularly important because it allows for easy visualization of the process. In other words, depending on the viscosity of the wine, one simply adjusts the flow rate until they start to see a few bubbles in the retention chamber 13 and then turn it down slightly. All one has to do then is wait for a time until the wine reaches the proper taste. It is noted herein that the gas conduit 31 is now shown with a wall thickness. It is understood that for the other views in this application the gas conduit 31 does not show its wall thickness for the sake of simplicity as adding the wall thickness for all views would overly crowd the figures.

Figure 26:
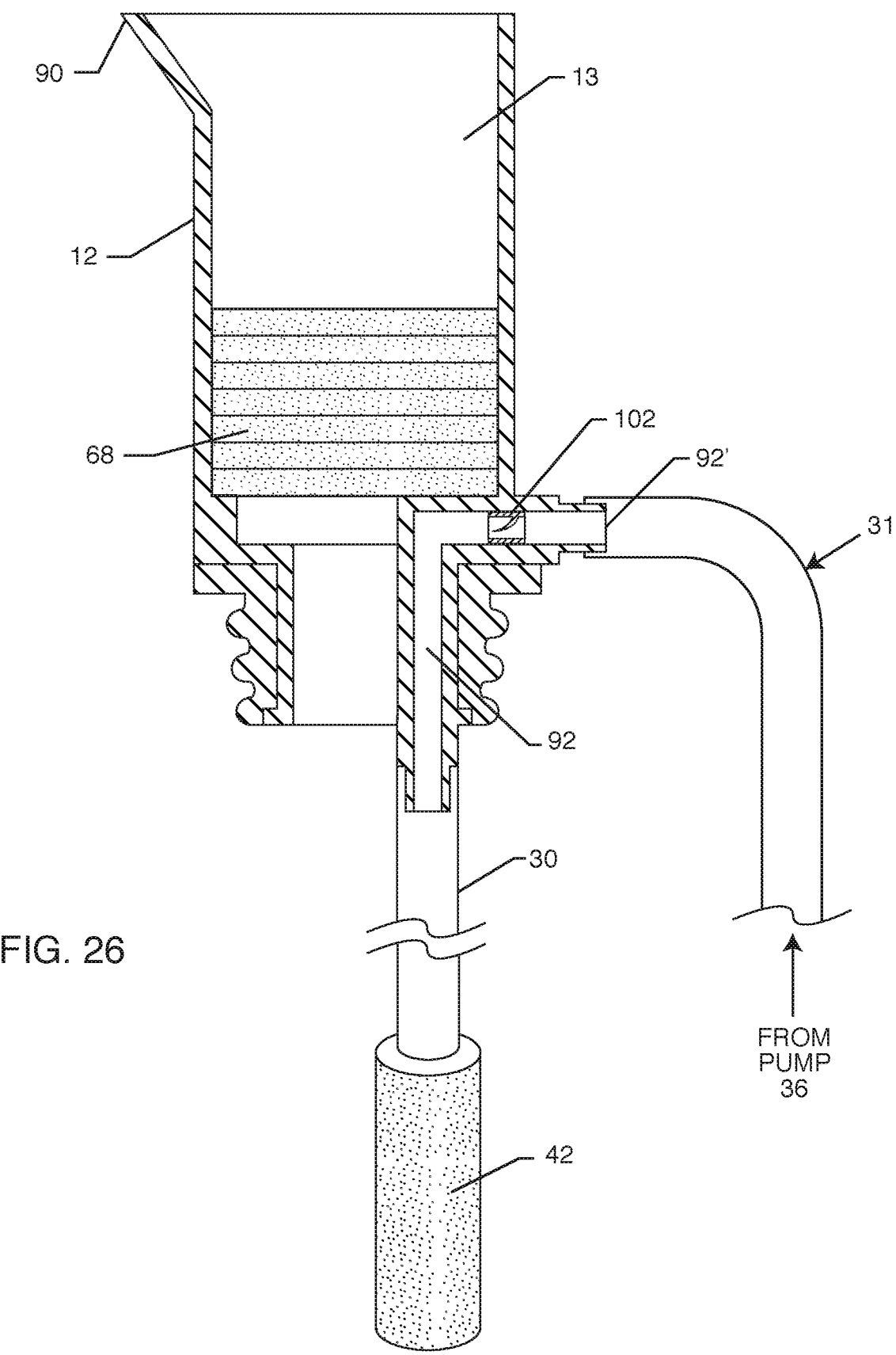
FIG. 26 is a sectional view of an exemplary housing for the bubble-reducing, aeration element.

FIG. 26 illustrates an L-shaped air/gas conduit 92 which is connectable to extension tube or tubing 31 and also to the gas conduit 30. As illustrated, the air/gas conduit 30 is directed to the distal end aeration element 42, which produces the multiplicity of bubbles. The extension, gas conduit 31 is connectable to pump 36 (not shown). An advantage to this is that the L-shaped conduit 92 and the retention chamber 12 along with the housing for the bubble-reducing, aeration element 68 could all be formed in a single injection-molding process. This has the advantage of greatly reducing the cost of the assembly. Additionally, the assembly of FIG. 26 can be left in place in the wine bottle simply by pulling off the extension, gas conduit 31. Element 90 then becomes a convenient pour spout. A one-way air valve 102 can be installed in the L-shaped conduit 92 so that when pouring wine the wine does not flow back out. Alternatively, upon removal of extension, gas conduit 31, a cap could be placed over the area 92' of the L-shaped conduit 92. This little silicone, rubber or other material cap would prevent wine from inadvertently flowing out port 92' during the pouring process.

Figure 27:
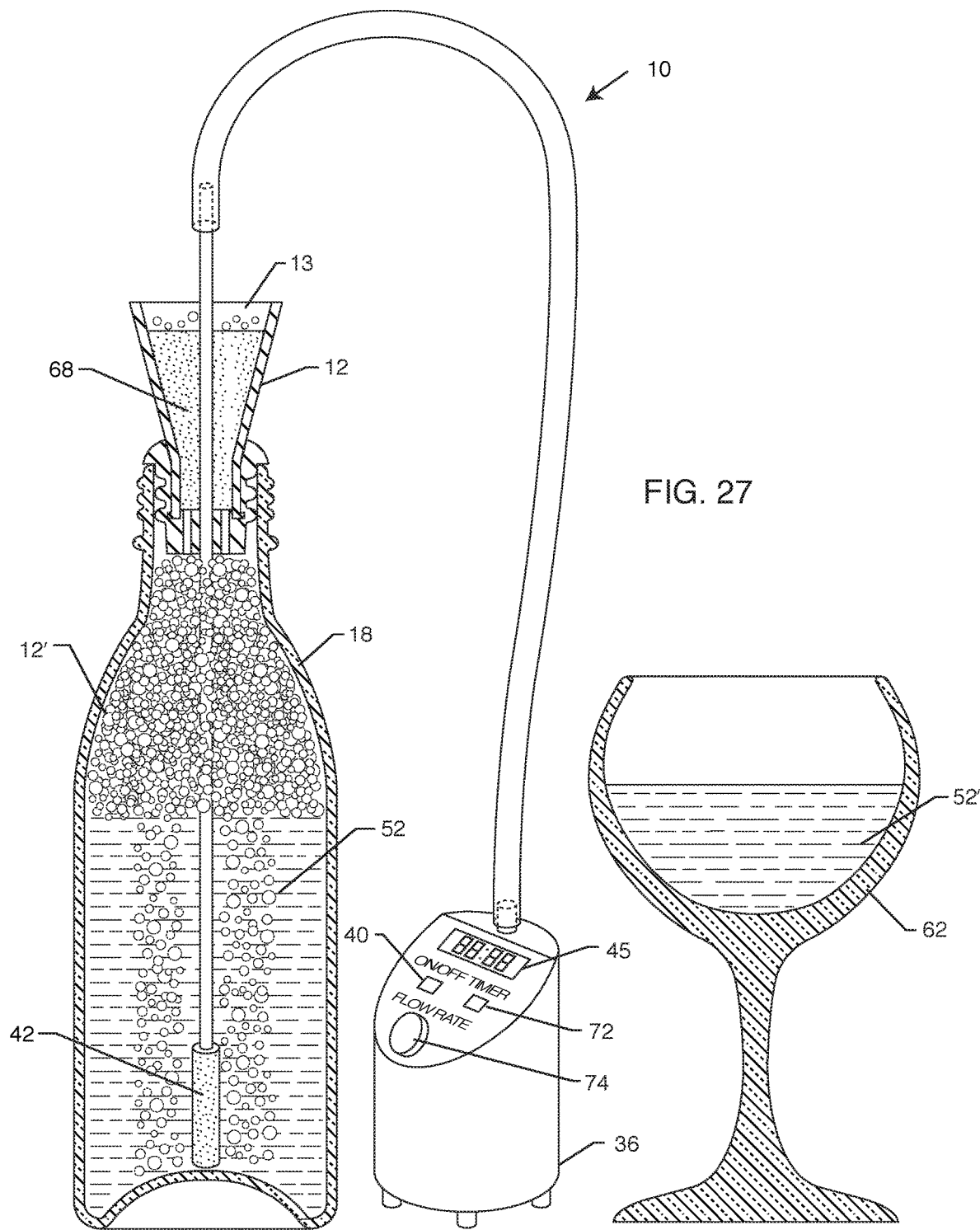
FIG. 27 shows a sectional view of a bottle, glass and novel aerator of the present invention being used in practice.

FIG. 27 illustrates a likely real-world embodiment of the present invention incorporating a distal aeration element 42, an optional proximal bubble-reducing, aeration filter 68 and a proximal air pump (gas pump) 36. In this case, the wine bottle has had its cork removed (or unscrewed) and a volume of wine 52' has been poured into a wine glass 62. The level of the wine 52' approximately fills half of the wine glass. By removing this quantity of wine from the wine bottle, this creates an additional bubble retention space 12'. This allows the operator or user to operate the pump at a higher speed (for example, the high setting, as previously illustrated). After the operator is done aerating the wine in the wine bottle, then a second step is necessary. That is where the operator would place the aerator element 42 in the wine glass and also aerate that quantity of wine. This was previously described in FIG. 19.

Referring once again to FIG. 27, one can understand that the bubble-reducing filter 68 and its housing 12 are not necessarily needed. This is because with the flow rate adjustment knob 74, one can adjust the flow of air bubbles out of aeration element 42 until an equilibrium status is reached with the bubbles just below the neck of the wine bottle so that they will not flow out and make a mess. Then, after the wine bottle itself is aerated, one can simply move the aeration element 42 into the bottom of the wine glass 62 and also aerate that volume of wine 52'.

As can be seen in FIG. 27, the air pump 36 has taken a more consumer friendly shape. The flow rate adjustment knob 74 allows the user to quickly make large and small adjustments that can account for a variety of factors that would affect the rate of bubble generation. It is understood that the air pump 36 can take many shapes and configurations shown in this application and even others not shown, without departing from the scope of this teaching.

Figure 28:
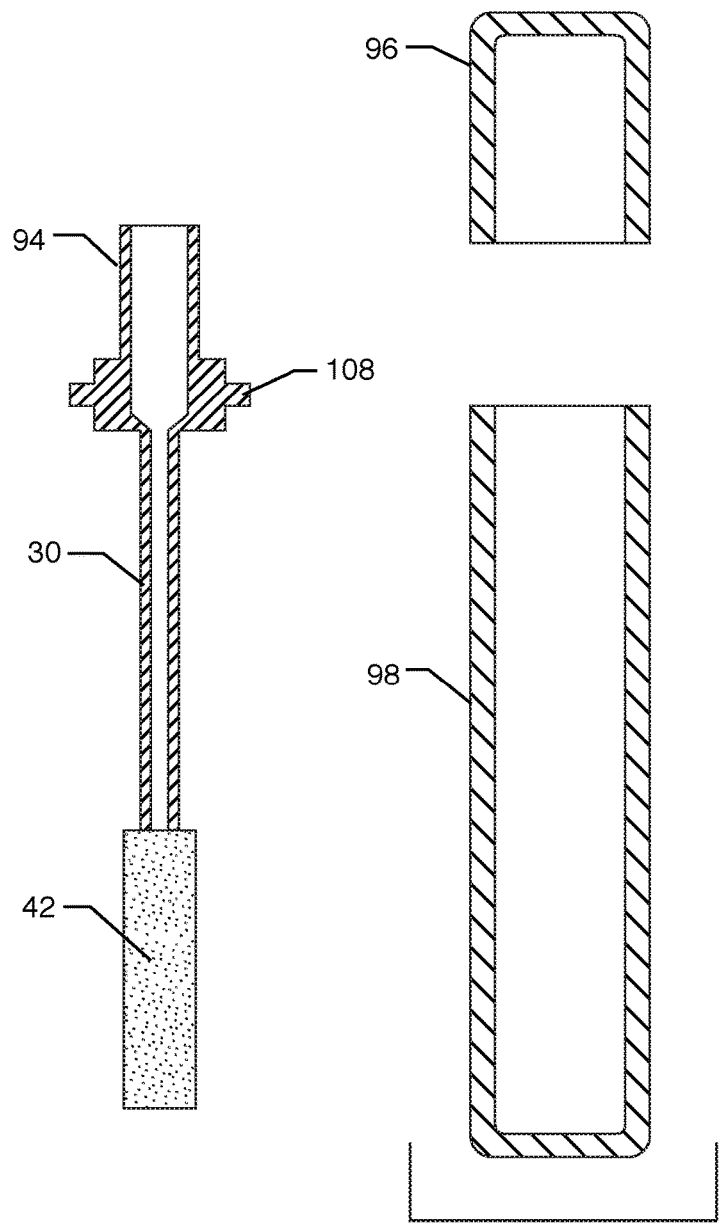
FIG. 28 is a sectional view of a simplified aerator of the present invention.

FIG. 28 illustrates a highly simplified version of the aeration invention. As before, there is a distal aeration element 42 and there is also a gas conduit 30. Element 94 is a blow port, which conveniently fits the human mouth. One simply drops the distal aeration element 42 into a bottle or glass of wine and blows in a few breaths thereby aerating the wine.

Figure 28A:
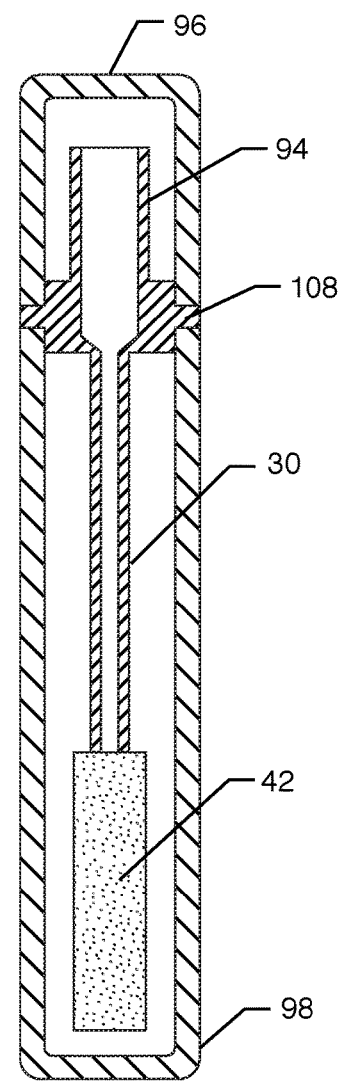
FIG. 28A is a sectional view similar to FIG. 28 now showing an upper and lower case.

FIG. 28A illustrates and upper 96 and lower casing 98 so that the manually blow port version of FIG. 28 can be stored and carried, for example, in luggage, in a pants pocket, shirt pocket, purse or the like.

Figure 28B:
FIG. 28B is a sectional view of an assembled version of the simplified aerator of FIGS. 28 and 28A.

FIG. 28B illustrates the blow port version of FIG. 28 stored within the upper 96 or lower 98 storage container portions of FIG. 28A. The top portion of the storage element 96 can be affixed to the bottom portion of the storage element 98 either by press-fitting, a screw together mechanism (not shown) or a snap together mechanism (not shown). In the press-fit version, the top portion 96 is pressed down against the seating area 108 of the mouthpiece. The bottom portion 98 is then inserted or press-fitted against the lower portion of flange 108. In an alternative embodiment, the flange portion 108 could be eliminated and the top portion 96 could be directly affixed to the bottom portion 98 either through a press-fit, screw or snap configuration.

FIG. 29 is similar to FIG. 28 but now the aeration element 42 is a circular disc. In many of the embodiments shown and described herein, the aeration element 42 was very narrow as it was depicted being taller than it was wider. This could have the problem of only aerating the wine which was close to the aeration element 42. Therefore, the embodiment shown in FIG. 29 has an increased diameter such that it would aerate a wider portion of the wine whether it was in a glass or in the bottle. The inventor's believe that it may be beneficial to create a turbulent flow as compared to a laminar flow for aerating the wine with bubbles. Therefore, it is desired that the Reynold's number is increased to help the exchange of oxygen with the wine.

Laminar flow is the orderly flow of tiny particles (or, in the case of this invention, bubbles) along a thin line, whereas turbulent flow is more chaotic and results in the particles (bubbles) being dispersed throughout a larger area. Turbulent flow will reduce the thickness of the boundary layer, which is material against the wall of the container in which there is limited movement and therefore would have reduced interaction with the bubbles. Increasing the diameter in which the bubbles are added to the container (whether it be the wine glass or the wine bottle) will inherently reduce the thickness of the boundary layer as it will ensure a greater diameter of the column of fluid is seeded with the gas bubbles. Adding bubbles in a wider array and at various positions will also increase the turbulence in the system as the bubbles interact with the wine fluid and each other and aerate the wine in a more expedient manner.

Therefore, changing the aeration element 42 from a vertical orientation to a horizontal orientation will increase the diameter of the column of bubbles, thereby increasing the exchange of oxygen with the wine. This is best shown in FIG. 29. It will be understood to those skilled in the art that this concept can be applied to any of the wine glass embodiments shown and/or described in this specification.

Figure 31:
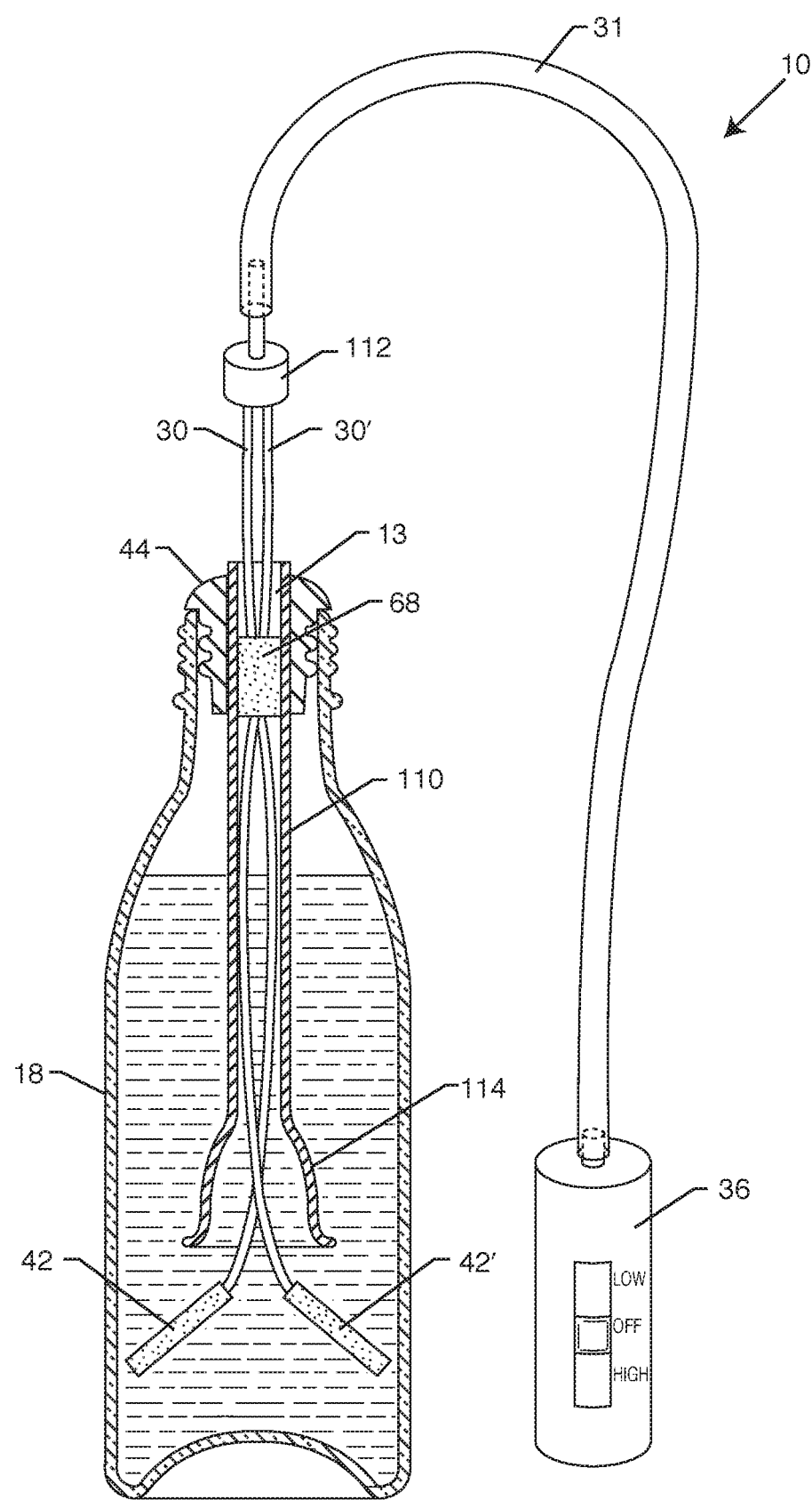
FIG. 31 is a view similar to FIG. 30, now showing the bubble-generating aeration elements extended and turned.
Figure 32:
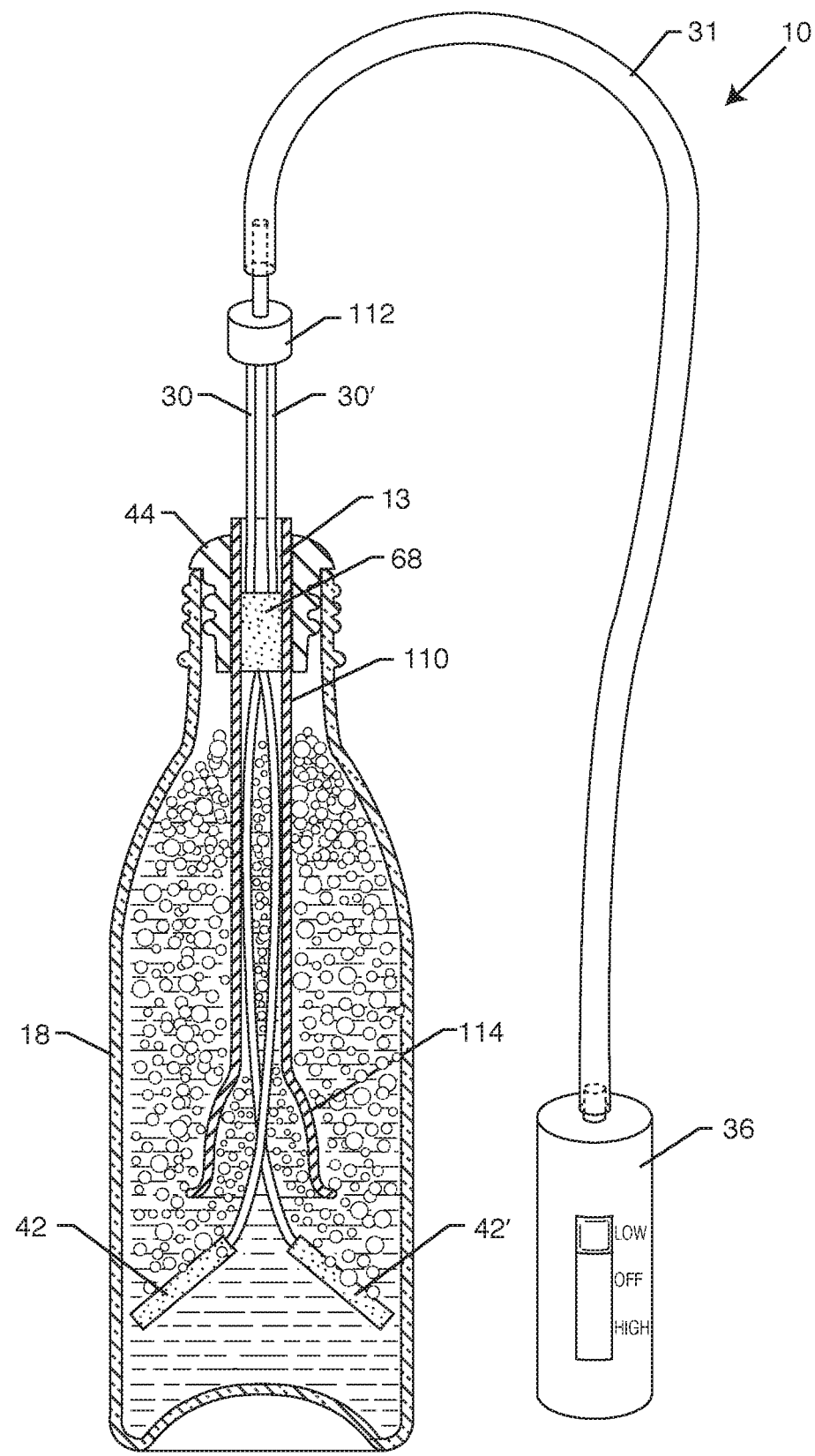
FIG. 32 is a view similar to FIG. 31, now showing the bubble-generating aeration elements aerating a larger portion of the wine inside the bottle.

FIGS. 30, 31 and 32 illustrate yet another embodiment where a multitude of aeration elements 42 may be used, whether two aeration elements are used as depicted herein or any number "n" of aeration elements. In these embodiments the gas conduit extension may have a branch fitting 112 that has one inlet but may have 2, 3 . . . or n outlets. This facilitates a multitude of gas conduits 30 and 30' that are then connected to their respective aeration elements 42 and 42'. As shown herein, the gas conduits 30 and 30' are flexible, or are made from a resilient material that has an inherent bend or change of direction. A housing 110 keeps the gas conduits 30 and 30' aligned when the aeration elements 42 and 42' are retracted within the housing 110 as shown in FIG. 30.

As shown in FIG. 31, when the aeration elements 42 and 42' are extended beyond the housing 110, they will naturally bend outwards due to the inherent bend or bias manufactured into the gas conduits 30 and 30'.

FIG. 32 shows that when the air pump 36 is activated, the column of bubbles within the bottle cover a larger amount of area as compared to previous designs. The distal end of the housing 110 can also be advantageously contoured and/or bent at location 114 to help the aeration elements 42 and 42' extend and retract in a smooth and efficient manner.

FIGS. 30, 31 and 32 also show the bubble-reducing filter element 68 disposed within the housing 110. The area above the bubble-reducing filter element 68 can act like the small expansion chamber 13. Furthermore, it is understood by those skilled in the art that the bubble-reducing filter element 68 could optionally be removed.

Figure 33:
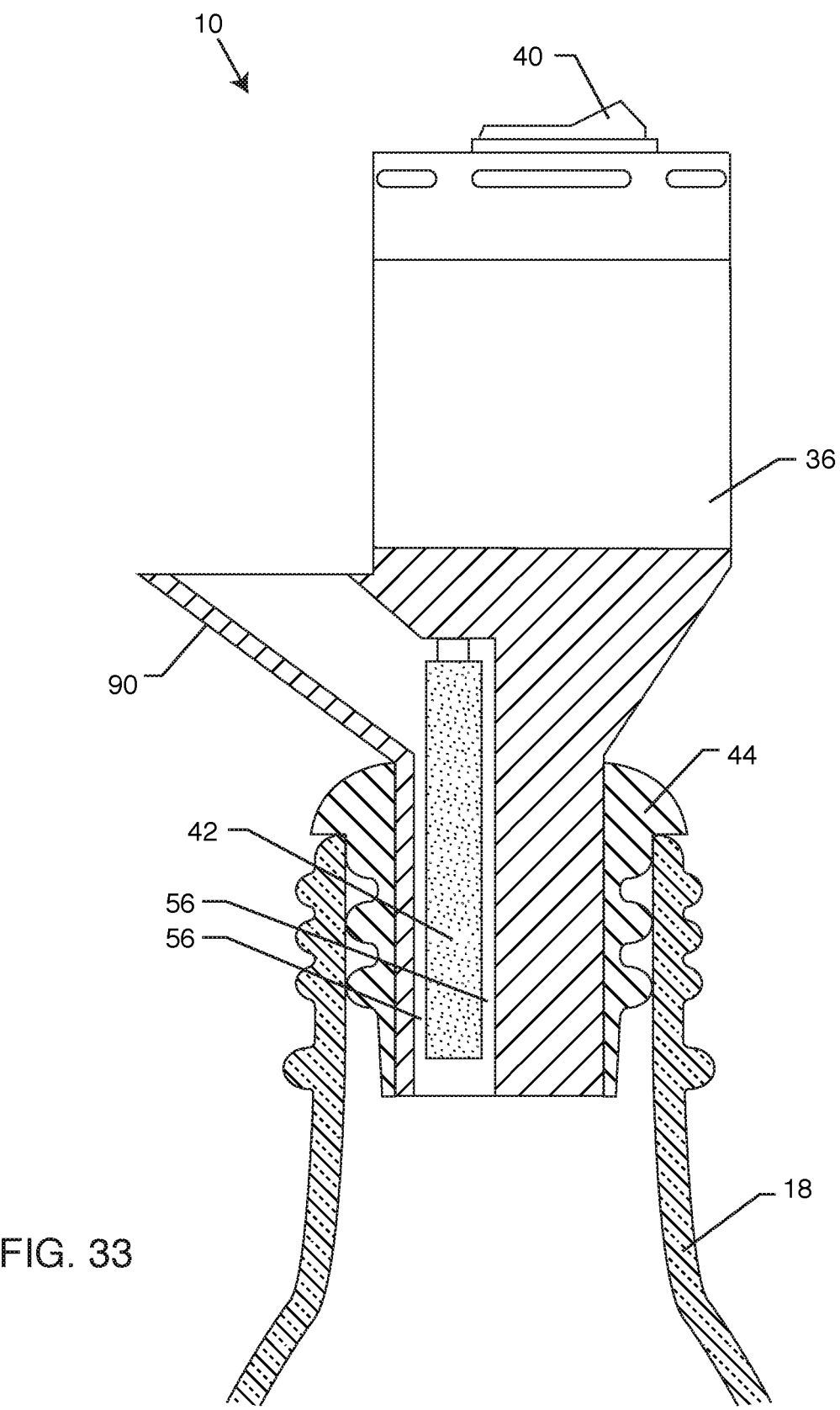
FIG. 33 is another embodiment of a wine aerator where the bubble-generating aeration element is integrated into a pouring spout.

FIG. 33 is another embodiment of the aerator assembly 10. Here, the filter element 42 has been integrated into the upper portion of the aerator 10. In this embodiment the aeration element 42 doesn't extend into the wine in the bottle 18. Rather, the pump 36 is turned on when one is about to pour from the bottle 18. As wine is poured out through the pour lip 90, the wine passes through narrow passageways 56 that are in close proximity to the aeration element 42. In this way, wine is forced to interact with bubbles that are being generated while the pouring is taking place. Therefore, a multitude of bubbles can be captured by the empty space of the glass it is being poured into.

Figure 34:
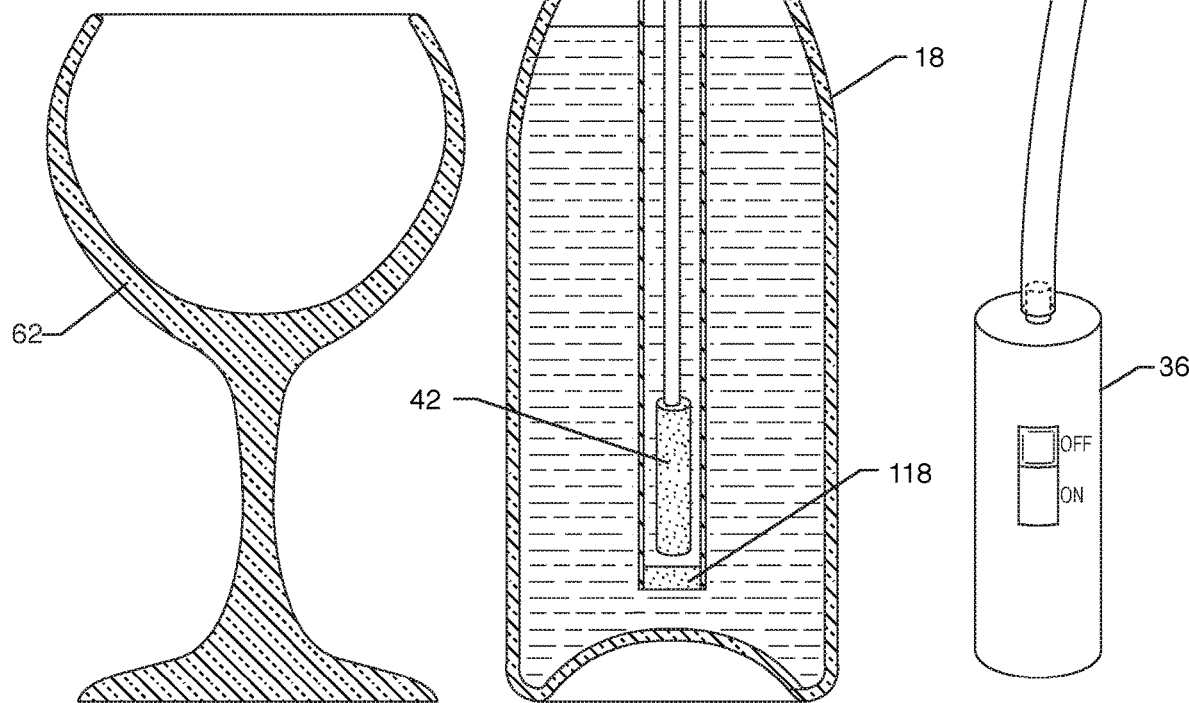
FIG. 34 is another embodiment of a wine aerator where now the bubble-generating aeration element is enclosed within a liquid-permeable housing configured to channel bubbles upward when in use.

FIG. 34 is another embodiment of a wine aerator where now the bubble-generating aeration element 42 is enclosed within a housing 116. The housing 116 has an optional sediment filter 118 that allows the wine to pass through, making it liquid-permeable, but which prevents any sediments from also passing through. Optionally, the sediment filter 118 could be removed and/or the bottom of the housing 116 could include a plurality of fine holes sized to allow wine to pass through but small enough to stop large sediment particles. When the housing 116 is fitted into the bottle, the housing is configured to channel bubbles upward when in use.

Figure 35:
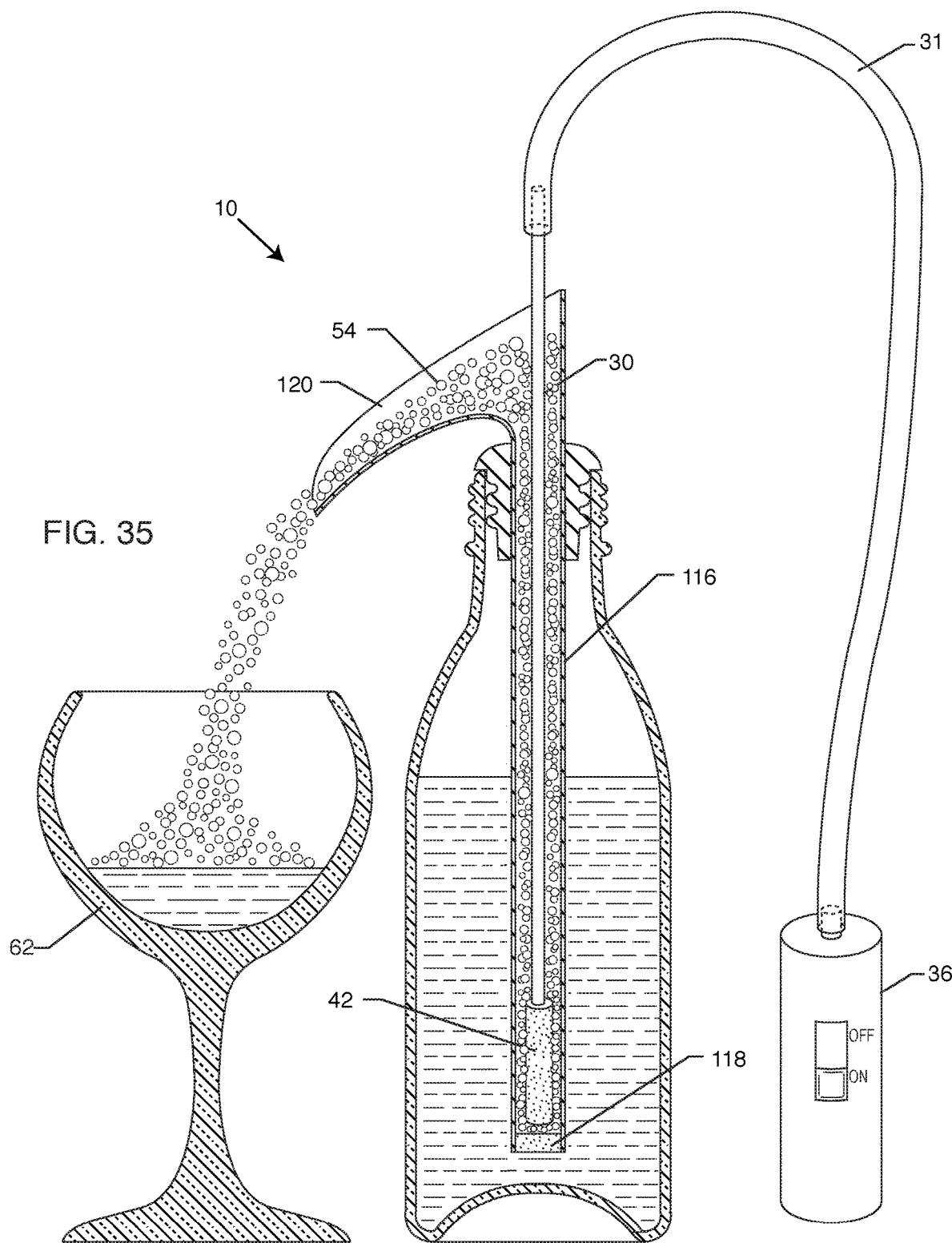
FIG. 35 is a view similar to FIG. 34 now showing how the bubbles will move upwardly through the housing and pour out of the spout into a wine glass.

FIG. 35 is a view similar to FIG. 34 now showing how the bubbles 54 and/or wine will move upwardly through the housing 116 and pour out of the pour spout 120 into the wine glass 62. As can be understood, one would activate the air pump 36 and the bubbles 54 and/or wine would naturally rise through the housing 116 and be channeled into the wine glass 62. This process could occur without the user having to tip the bottle and instead the bottle could remain upright and the wine glass 62 strategically placed below. The wine that would reside in the wine glass 62 could be fully aerated as it was fully comprised of aeration bubbles 54 and/or aerated wine.

Figure 36:
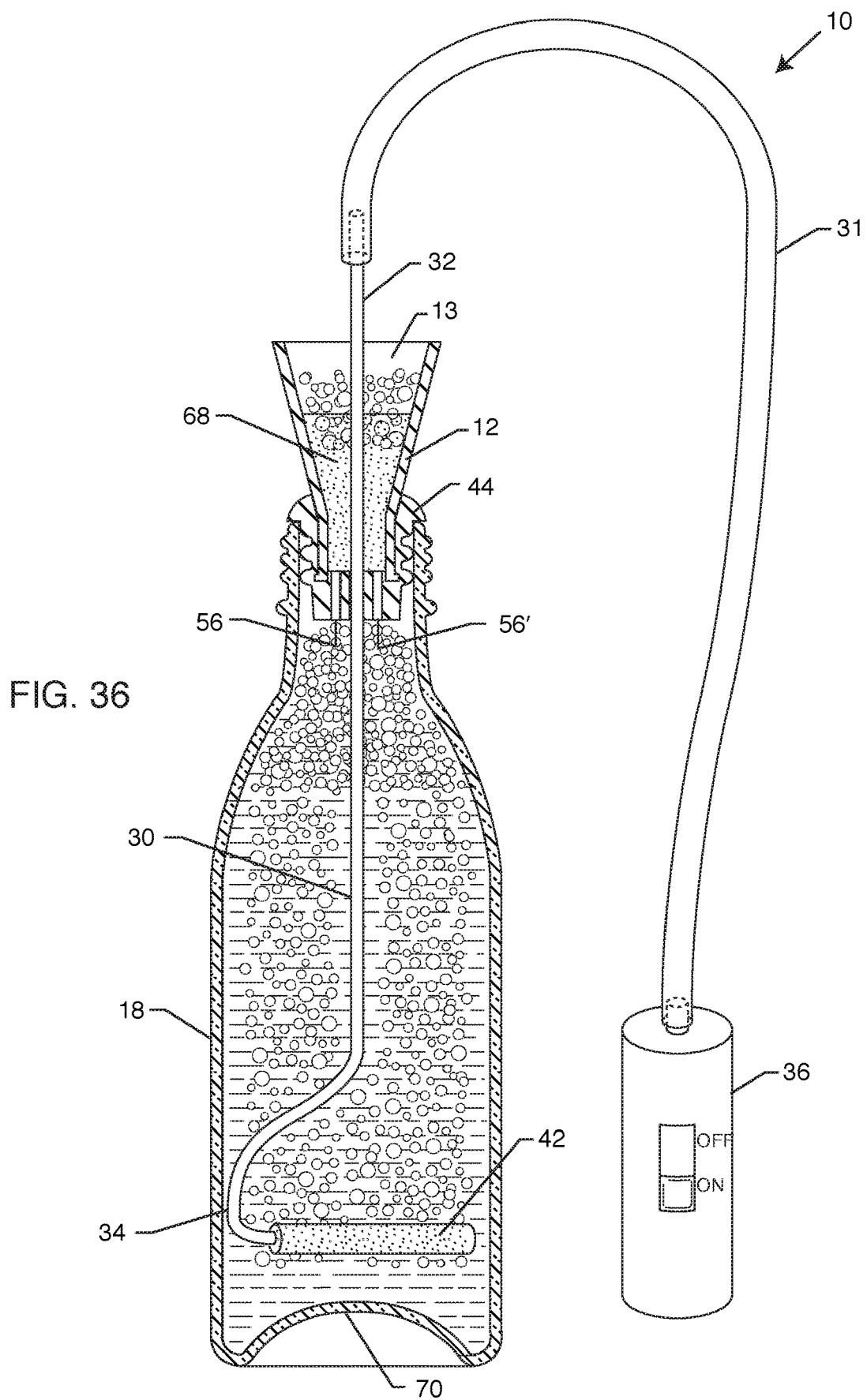
FIG. 36 is another embodiment of a wine aerator similar to FIG. 14, where now the distal end of the gas conduit is flexible and resilient such that it is shaped to dispose the bubble-generating element in a horizontal position for increased aeration.

FIG. 36 is another embodiment of a wine aerator similar to FIG. 14. Now, the distal end 34 of the gas conduit 30 is flexible and resilient but is also shaped to dispose the bubble-generating aeration element 42 in a horizontal position for increased aeration. The gas conduit 30 could be made of a memory-retention polymer, metal or the like, that could sufficiently flex when inserted into the narrowed opening of the wine bottle, but return to its preset shape such that it disposed the bubble-generating aeration element 42 in the horizontal position. Due to the flexibility of the gas conduit 30, it would take almost no more time to install and remove it from the bottle, but would provide a more efficient method of wine aeration. It is also understood by those skilled in the art that the bent distal end 34 could be used when the bubble-reducing filter element 68 is removed. In other words, the bent distal end 34 is not dependent upon the bubble-reducing filter element 68, but instead could be utilized in any of the embodiments disclosed throughout this specification.

Figure 37:
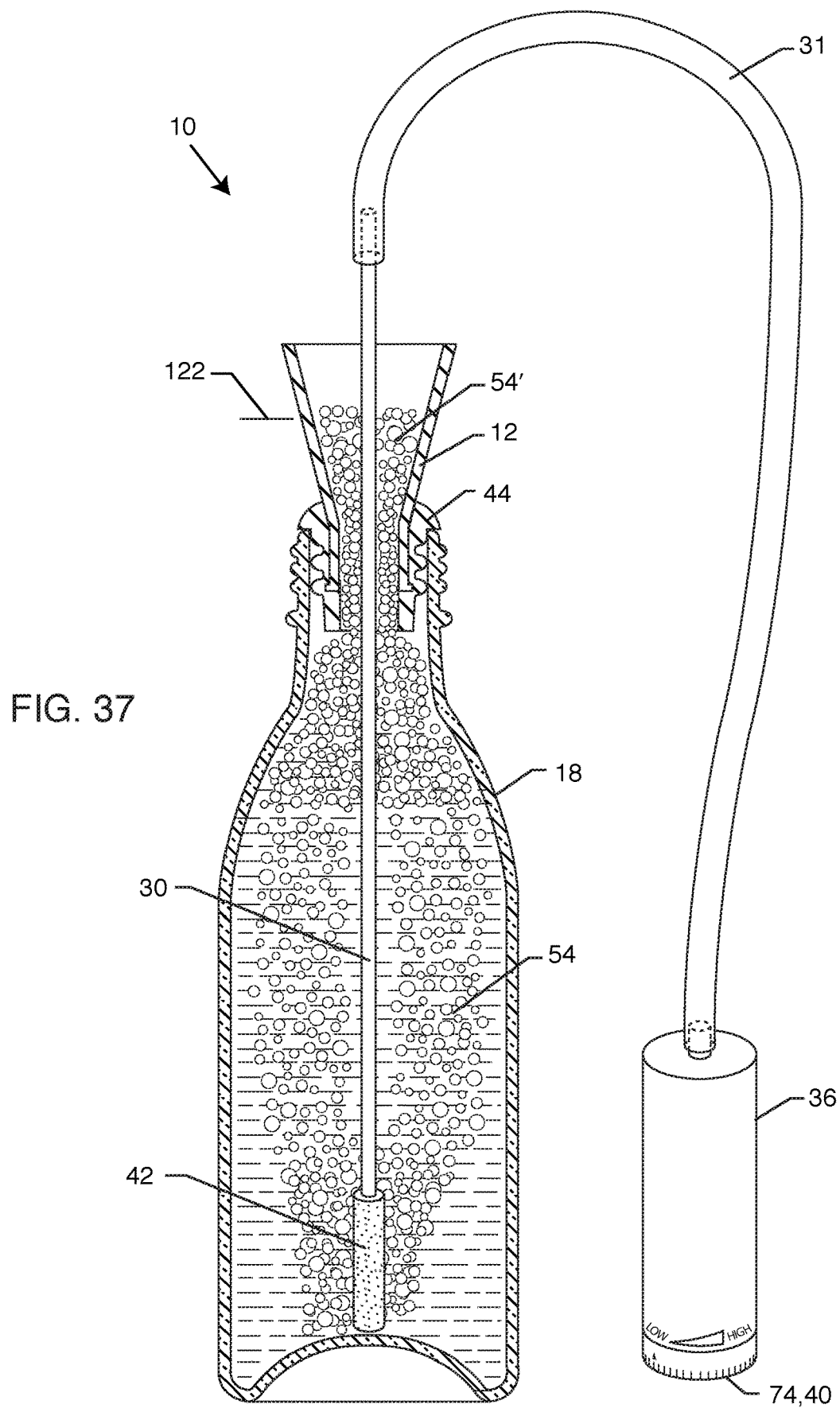
FIG. 37 is another embodiment of a wine aerator where now the expansion chamber and gas conduit can be separately manufactured and separately used depending on whether a glass or bottle is to be aerated.

FIG. 37 is very similar to the combination of FIG. 14 and FIG. 14C. Referring to FIG. 14, one can see that there is a filter element 68 that acts to break up bubbles; therefore, allowing the wine to be aerated at a relatively high flow rate. In FIG. 37, this filter element 68 has been removed. In addition, referring back to FIG. 14 in comparison with FIG. 37, one can see that the through holes 56 and 56' have been enlarged such that the gas conduit 30 is no longer affixed to the fluid expansion chamber 12. Referring once again to FIG. 37, the diameter of aeration element 42 has been carefully selected such that it will pass through the inside diameter of seal 44 and expansion chamber 12 such that the two elements may be separated and/or manufactured separately. This allows great flexibility in the present invention. For example, if one was going to aerate only a glass of wine, one could slide the aeration element 42 out of the retention chamber 12 thereby using only aeration element 42 to aerate the wine glass. On the other hand, if one was to aerate a full bottle of wine, one would first place the fluid retention chamber 12 and then slide the aeration element 42 down through the inside diameter of the fluid retention chamber, placing it on top of the wine bottle (or even midway down the wine bottle).

One can also see that the pump element 36 has been modified. In this case, it has a flow rate control knob 74 that incorporates the on/off switch 40. The control knob 74 could be either a rheostat or potentiometer, which then controls the motor speed. This switch 40 also, when you click it all the way to the lowest position, has an off position. You will feel this off position by a click that the user will feel and/or sense.

In actual experiments using a variable speed knob 74,40, the inventors have determined that it is relatively easy to start from a very low flow rate setting and gradually increase it until you see bubbles start to form and come up the retention chamber 12. One has to observe this carefully and then turn the flow rate down until one reaches a state of equilibrium. For example, an ideal state of equilibrium would be shown at line 122 across the expansion chamber 12, where one would see the last bubbles breaking and turning back into a liquid. Through simple experimentation, one could then determine how long one needs to hold this in an equilibrium state until the wine reaches the desired taste. The inventors have found that in general, this takes about 20 seconds for common Merlots. It will be appreciated that the variable flow rate switch, which incorporates an integral on/off switch, can be adapted to any of the previous figures or descriptions in the present invention. It is also understood by those skilled in the art, that any of the embodiments taught herein can be cross-applied to any other embodiment or figure taught herein.

A further refinement of the apparatus of FIG. 37 (not shown) is that the gas conduit 30 could be eliminated and rather the gas conduit extension 31 would be routed all the way from the pump 36 all the way directly to the proximal end of the bubble aeration element 42. This way when the tubing 31 becomes stained, discolored or even worn out, it can easily be replaced without the need to replace the more expensive pump or distal aeration element 42. This also leads to easy change outs of the distal aeration element 42. For example, in a restaurant application where a very high use is anticipated, it may be desirable to change out just the distal aeration element 42 on a daily or weekly basis. In fact, in high end restaurants, the distal aeration element 42 would be changed after aerating each different type of wine. For example, if at one table, they bubble a Merlot, they would then go through the ritual of removing the aeration element 42 and then placing a new one to go on and bubble a Burgundy.

During initial prototype development, the inventors found that some of the aeration elements disintegrated in the presence of the wine over time. It was found that those aeration elements (polymer based stones) broke down due to the alcohol in the wine. It was also found out that certain grades of tubing became heavily stained by the wine. The inventors are hereby teaching that all of the elements that are in contact with wine, including any tubing, gas conduits and in particular, the aeration elements must be of FDA food grade materials, including materials that are resistant to solvents (such as alcohol), non-toxic and generally biocompatible. Furthermore, these materials will not break down over time while releasing binders or solvents or other chemicals into the wine. This not only preserves the taste of the wine, but also ensures consumer safety. As used herein, the term "food grade" includes all of the aforementioned elements.

Referring once again to FIG. 37, one can see that bubbles 54 are formed by aeration element 42 inside of the wine bottle 18 and that due to the rising air pressure, bubbles 54' are formed within the retention chamber 12. A disadvantage of the retention chamber 12, shown in FIG. 37, is that it is relatively small in size. This necessitates a very slow pump rate, by using the pump adjustment knob 74, 40. Experiments with the retention chamber of the approximate size shown in FIG. 12 indicate that it can take up to several minutes to bubble certain types of wine. This does not seem like a long period of time, but if one looks at their watch and times a minute, it becomes a very long time while you are waiting to be able to drink your wine. The inventors have determined that it is best to stay within an optimal time range of 5 seconds to as long as 20 seconds. Accordingly, a larger retention chamber 12 needed to be developed.

FIG. 38 is very similar to FIG. 37 except that the retention chamber 12 has a rounded, enlarged or bulbous shape. As it turns out, through numerous experiments by the inventors, that this creates a maximum diameter 124 wherein, the bubble field 54' will tend to stabilize and rise no higher. As can be seen in the figure the retention chamber 12 of FIG. 48 also incorporates a pour spout 90.

In FIG. 39, it is shown, a pump element 36 with a control knob 74, 40 which not only turns the pump on and off, but also adjusts its flow rate. This is a two-piece assembly, in that the aeration element 42 is designed to slip down through the middle of the retention chamber 12 of FIG. 38. Having the retention chamber 12 be a separate piece from the pump structure 36 and its associated aeration element 42 is a very important novel feature. For example, this allows easy cleaning in a dishwasher of the retention chamber 12. The air passage assembly 30, as will be shown, is easily removed from the pump assembly 36 so that it and its associated aeration element 42 can also be safely washed in a dishwasher. In an embodiment, the inventors have found out that the aeration element can be of a plastic, such as a polyethylene or be made from a sintered stainless steel type of material. A sintered stainless steel is considered an easily cleanable embodiment since it can stand very high temperatures, such as the commercial dishwashers of a restaurant.

Referring once again to FIG. 39, one can see that the tubing element 31 has been completely eliminated. Instead, a stainless steel tube 30 is plugged into the pump housing 36 and terminates at its distal end in aerator 42. In a preferred embodiment, both the distal aerator and the tube 30 would be of stainless steel. The aerator would be a porous sintered stainless steel.

Figure 39A:
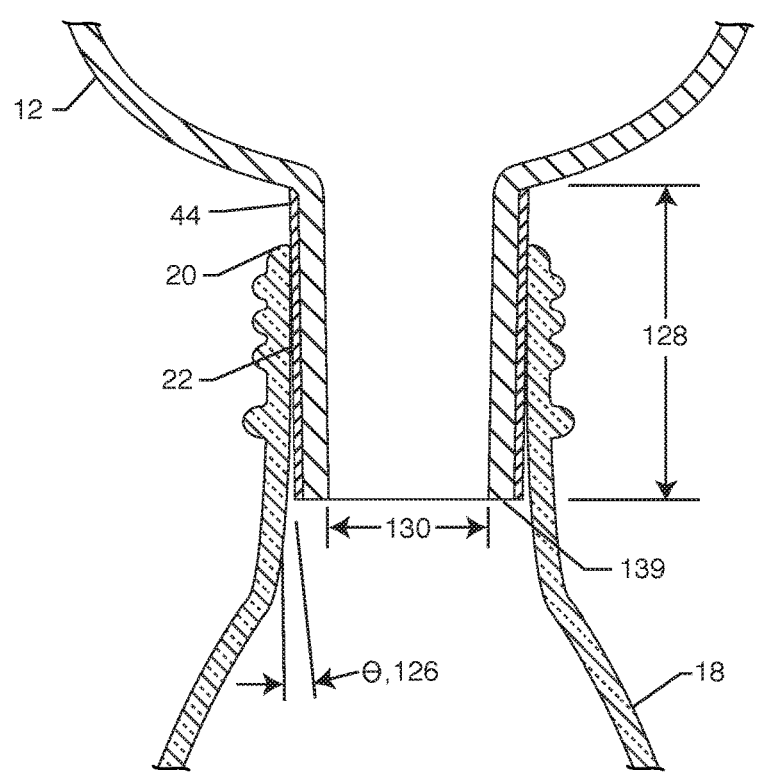
FIG. 39A is an enlarged sectional view of the structure of FIG. 38 taken along lines 39A-39A.

FIG. 39A is a sectional view taken from section 39A-39A of FIG. 38. FIG. 39A illustrates the draft angle theta ($\Theta$) 126 has been reduced thereby providing a tighter fit between seal 44 and the inside diameter 22 of the wine bottle neck 20. Angle theta ($\Theta$) 126 has to be greater than zero degrees so that not too tight a fit between the seal element 44 and the inside diameter 22 of the bottle neck 20 is formed or else that would make it very difficult to remove the retention chamber 12 after the wine (or other liquor) was bubbled and ready for consumption. Accordingly, the draft angle theta 126 can be from 1° to as much as 20°. The overall height 128 of the seal area 44 is also very important. This height 128 can vary from anywhere from a ¼ of an inch to 3 inches. It is important that the retention chamber 12 properly engage the inside diameter and surface 22 of the wine bottle neck 20, such that it will not tilt or tip over. Attention is now drawn to the inside diameter 130 of the retention chamber 12 as it is inserted into the bottle 18. Referring once again to FIG. 39, one can see that the aeration element 42 is at the distal end of air passage 30.

Referring once again to FIG. 39A, one notes that there is an inside diameter 130 of the combined pour spout 90 and retention assembly 12. The inventors have performed a number of experiments pouring out various types of red wine. It has been determined that the diameter 130 is extremely critical so that one achieves a steady flow of wine out of the bottle. If the diameter 130 is less than 0.45 inches, it has been found that the flow is intermittent, interrupted and is at an undesirably low flow rate. It turns out that this dimension 130 is quite critical. By raising the diameter to 0.50 inches, one achieves a much smoother and higher flow rate, which is much more pleasing as one is pouring the wine. It has been determined through a variety of tests, that the overall length of the neck 128 is not nearly as important as its inside diameter 130. The inventors created a 3D model wherein, the inside diameter was exactly 0.45 inches. Pour experiments indicated a very low, interrupted and generally unacceptable flow rate. Cutting the length 128 in half had very little effect on this pouring flow rate. However, increasing the diameter 130 to 0.50 inches, produced a much smoother and more laminar flow rate, which was much more pleasing. In summary, the diameter 130 may be greater than 0.45 inches.

Figure 39B:
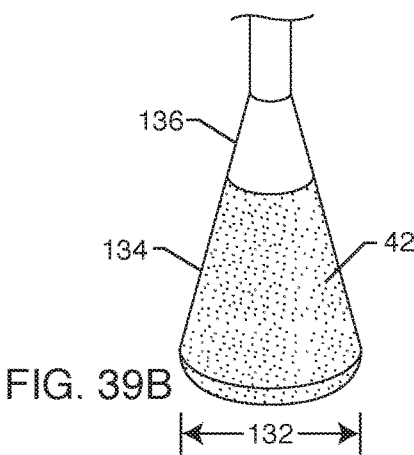
FIG. 39B is an enlarged view of another embodiment of an aeration element similar to the structure of FIG. 39 taken along lines 39B-39B.

FIG. 39B is taken from section 39B-39B from FIG. 39 and shows that the retention element can have a trapezoidal-like or frustoconical shape instead of cylindrical, as previously illustrated in FIG. 39. In either case, the diameter of the aeration element 132 must be less than the opening diameter 130 of the retention element 12 such that the entire assembly shown in FIG. 39 can be slipped down inside of the wine bottle and also easily removed. Importantly, referring back to FIG. 39B, one can see that the frustoconical shape 134, which has an added frustoconical plastic piece 136, facilitates removal of the aeration element 42 through the inside diameter hole 130 of the aeration element 12 without it becoming hung up on a ledge 138 or abrupt diameter change.

Referring back to FIG. 39, one can see that there is a ledge 138 that's formed between the differing diameters of the aeration element 42 and the air tube 30. Through experimentation by the inventors, this ledge 138 is undesirable because when one goes to remove the complete assembly of FIG. 39 from the assembly of FIG. 38, this will get hung up on the edges 139 adjacent the opening 130 of the retention element 12.

Figure 39C:
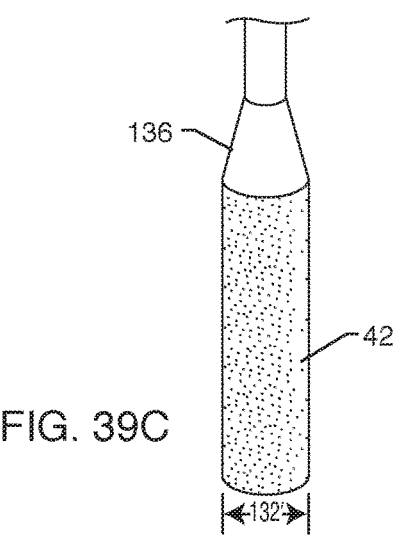
FIG. 39C is an enlarged view of another embodiment of an aeration element similar to the structure of FIG. 39 taken along lines 39C-39C.

FIG. 39C is taken generally from section 39C-39C from FIG. 39 and shows that indeed the aeration element 42 may be cylindrical. However, in this case, a frustoconical plastic piece 136 has been added to facilitate easy removal through the aperture 130 of the retention chamber 12. Similarly, the diameter of the aeration element 132' must be less than the opening diameter 130 of the retention element 12 such that the entire assembly shown in FIG. 39 can be slipped down inside of the wine bottle and also easily removed.

Figure 39D:
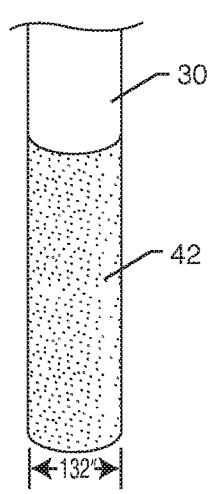
FIG. 39D is an enlarged view of another embodiment of an aeration element similar to the structure of FIG. 39 taken along lines 39D-39D.

FIG. 39D is a sectional view taken from section 39D-39D from FIG. 39, showing that in this embodiment, the diameter of aeration element 42 is exactly the same as the diameter of the air tube assembly 30. This eliminates any ledge 138, which also facilitates easy removal through the aperture 130 of the retention chamber 12 as previously described in FIG. 38. Again, the diameter of the aeration element 132" must be less than the opening diameter 130 of the retention element 12 such that the entire assembly shown in FIG. 39 can be slipped down inside of the wine bottle and also easily removed. It will be appreciated and understood that the aeration elements shown in FIGS. 39B, 39C and 39D are enlarged in comparison to FIG. 39A.

Figure 39E:
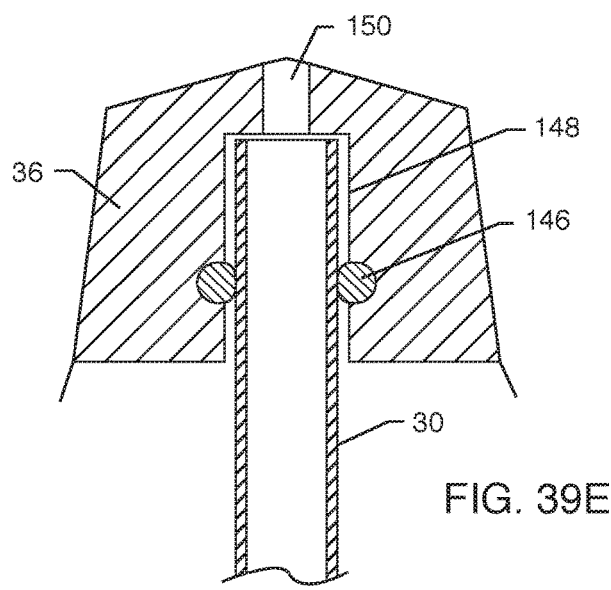
FIG. 39E is an enlarged sectional view of the structure of FIG. 39 taken along lines 39E-39E.

FIG. 39E is taken generally from section 39E-39E from FIG. 39. This illustrates how the air passage tube 30 can be quickly inserted into the bottom of the pump housing 36 and sealed by O-ring 146 into hole 148. There are a number of advantages of this. First of all, this means with a simple pull, one can remove the tube assembly 30 along with its aeration element 42 from the pump assembly 36. In an embodiment, this tube 30 would be of a stainless steel and the aeration element would be of a porous, sintered, stainless steel. As previously mentioned, this allows one to place the aeration element 42 along with the stainless steel tube 30 in a residential or commercial dishwasher or even into boiling water or the like. It will be understood by those skilled in the art that O-ring 146 could take on many other shapes as sizes as it is not to be limited to only an O-ring configuration.

Figure 40:
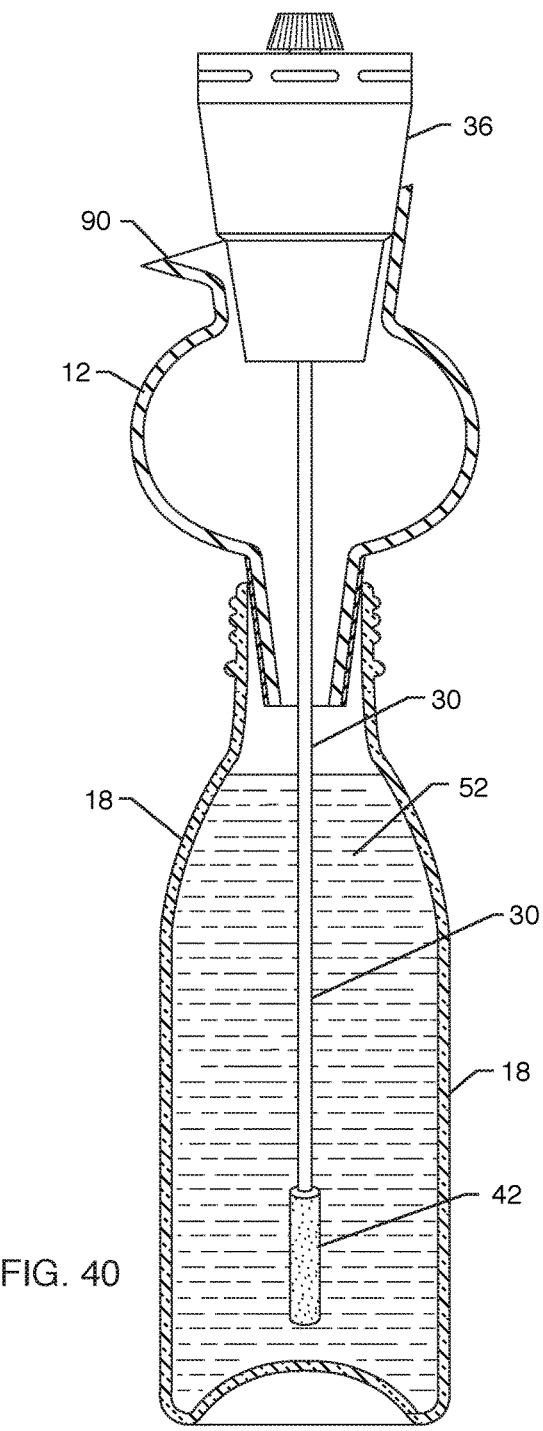
FIG. 40 is a sectional view of the structures of FIGS. 38 and 39 combined.

FIG. 40 illustrates a bottle of wine 18 containing wine 52. FIG. 40 illustrates the mating of retention chamber 12 and pour spout 90 to then the pump assembly 36, gas conduit 30 and aeration element 42.

Figure 40A:
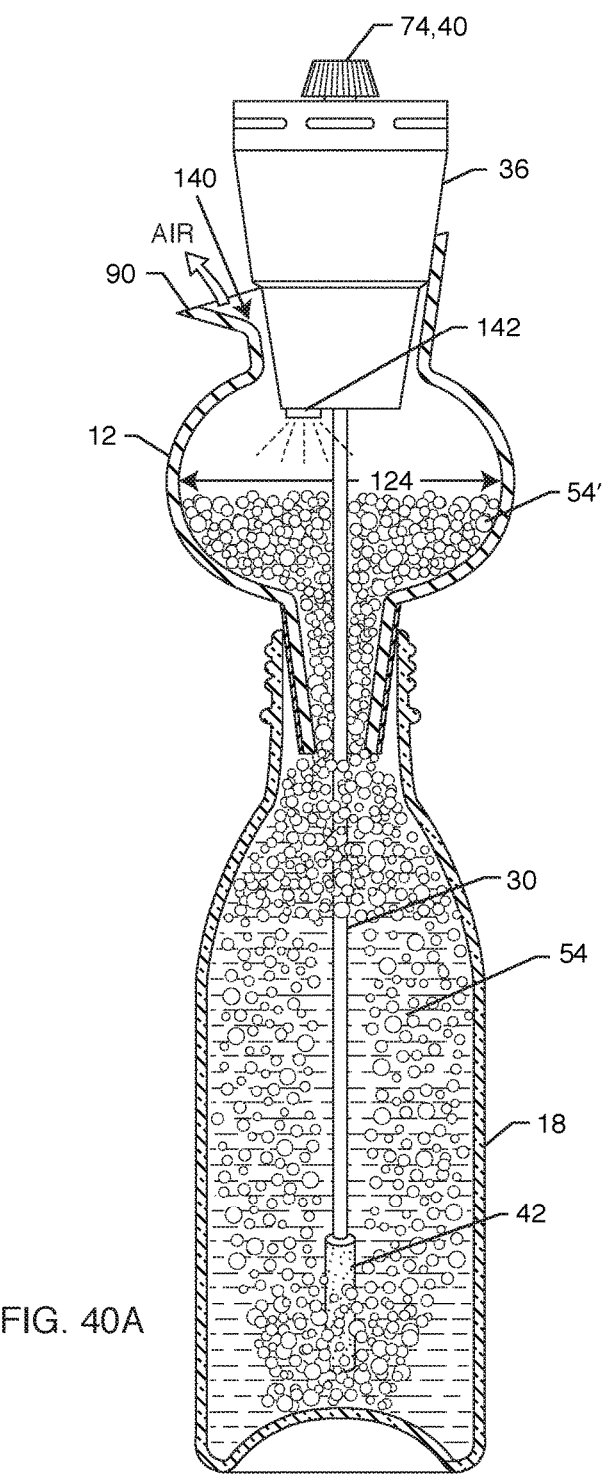
FIG. 40A is a sectional view similar to the structure of FIG. 40 now showing bubble formation in the wine and bubbling into the retention chamber.

FIG. 40A illustrates the assembly of FIG. 40 with the pump 36 turned on wherein, the aeration element 42 is generating a column of air bubbles 54, which enter into the retention chamber 12 as bubble field 54'. As previously described, the bubble field 54' and the retention chamber 12 will reach stability at the widest diameter point of the retention chamber 12. Through numerous experiments by the inventors, by controlling the maximum diameter of the expansion chamber along with the pump flow rate, one can achieve a steady state condition wherein, the bubbles are (as shown) about half way up the maximum diameter of the retention chamber 12. Importantly, the pump housing 36 fits snugly into the top opening of the retention chamber 12 and pour spout 90 and the air pump housing shape is designed such that a convenient air passage 140 allows the air that is being generated out of aeration element 42 to escape up through the top.

It would be very undesirable to have too small of a diameter retention chamber 12 or too high of a pump flow rate such that the bubble field 54' did not reach a steady state and instead bubbled out undesirably through the air passage 140. Accordingly, there is a design balance that's been accomplished by the inventors such that the bubble field 54' reaches a static (i.e. steady-state) condition as shown. Through various experiments and 3D model prints, the inventors have determined that the minimum diameter 124 of the retention chamber 12 is 0.75 inches. At the minimum diameter of 0.75 inches, the retention chamber maximum diameter 12 is quite small, meaning that the pump flow rate would have to be undesirably lowered to a very low rate. This requires a relatively long bubbling time to properly aerate the wine or spirits. A practical upper limit to the diameter 124 of the retention chamber 12 is 5 inches. At 5 inches, a very high pump flow rate can be used. However, at 5 inches, the mass of the retention chamber 12 becomes sufficiently large to create a potential toppling or overturning problem concerning with the bottle 18. It also creates aesthetic concerns. Obviously, one could go to a retention chamber diameter 124 of even 10 inches, but this would be ridiculously large to have sit on top of a wine bottle 18. It will be understood that the diameter of the retention chamber, can vary in 0.25 inch increments all the way starting from 0.75 inches all the way to 5 inches.

The inventors have performed numerous experiments based on what they thought were the physics of bubble formation only to find out that their initial notions were false. For example, the inventors theorized that if the height of the bubbles were sufficiently large, even in a small column, that the weight of the bubbles would cause them to collapse upon themselves. In fact, through actual experiments, the opposite turned out to be true. In one experiment, the inventors had a retention chamber 12 that was approximately the same diameter as the wine bottle neck and was several inches high. Through actual experimentation, the bubble field went all the way up through the several inches (up to a foot) and still bubbled out the top. This lead to a number of other tests where the inventors started to increase the diameter of the retention chamber and it is through those tests, that it was determined that the diameter of the retention chamber was extremely important so that the bubble field would reach a static (i.e. steady state) situation and stop climbing. In summary, contrary to the inventors initial thoughts and concepts, testing proved that the bubbles readily collapsed down upon themselves when they are in a sufficiently large enough diameter retention chamber 12. When the diameter of the retention chamber 12, 124 gets too small, the bubbles just keep climbing. Another advantage of increasing the diameter 124 in expansion chamber 12 is that the need for a bubble reducing element 68, as described in previous drawings, may no longer be needed and can be eliminated.

Referring back to FIGS. 38 through 40A, it is desirable that the material of the expansion chamber 12 be clear, such as a glass, an acrylic or other clear plastic or glass material. Having this material clear, allows one to readily observe the bubble expansion field 54' and if needed, adjust the pump flow rate accordingly. In addition, there is an aesthetically pleasing element by watching the bubbles form in the retention chamber 12. In one embodiment, a red or other color LED light 142 would shine down when the pump 36 was activated thereby, highlighting the bubble field 54'.

Figure 40B:
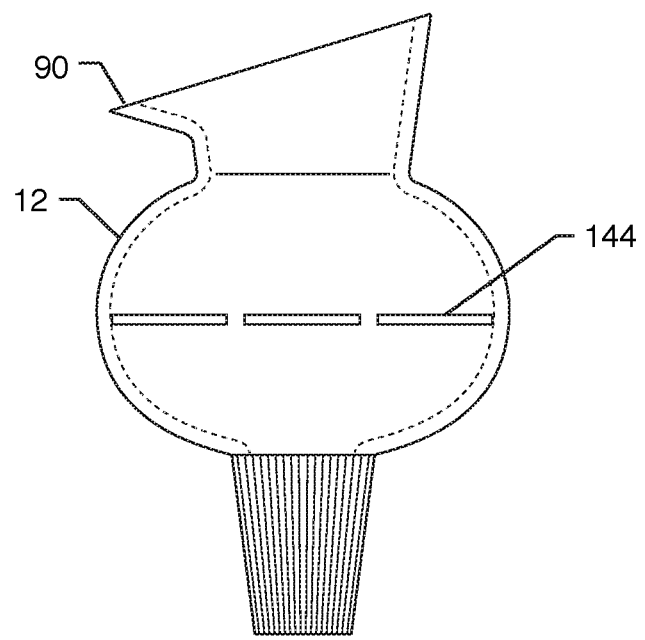
FIG. 40B is a side view of the structure of the retention chamber of FIGS. 38, 40 and 40A now showing an indicator line.

FIG. 40B shows the retention chambers previously illustrated in FIGS. 38 through 40A except that an indicator line 144 has been added. This indicator line 144 could be etched on the surface, applied with paint, applied with a sticker, or formed in the molding process, wherein, the top half of the retention chamber is joined at the bottom half of the retention chamber 12. In any event, during the actual aeration of wine or spirit, as illustrated in FIG. 40A, one adjusts the flow rate of the pump until it reaches this ideal maximum diameter where the height of the bubble field 54' reaches a static (steady-state) position. (This means that the height of the bubble field 54' is no longer rising or collapsing.) Through actual experiments, the inventors have determined that when one turns on the pump 36, as illustrated in FIG. 40A, that the bubble field 54' at first, rises rapidly through the narrow neck of the bottle and then as it enters the increasing diameter of the retention chamber 12, it starts to slow down its rise and when it reaches the maximum diameter at 124 (score line 144), then the bubble field 54' is very easy to stabilize at a static height. (It will be appreciated that the use of the term "score line" is a shorthand way of saying all the different ways this line can be indicated.) However, if one has too high of a pump speed, the bubble field rises beyond the maximum diameter 124 and starts to encounter the narrow upper part of the retention chamber, then the height of the bubble formation will start to increase again. In use, it's very easy to either use a predetermined pump speed or an adjustable pump speed such that the bubbles 54' will reach a static condition at the point of maximum diameter, shown as score line 144 in FIG. 40B.

FIG. 41 utilizes the same type of pump 36 as previously illustrated in FIG. 39 except in this case, the straight tube 30 and aerator 42, previously described in FIG. 39, has been removed (simply pulled out of recess 148 in FIG. 39E) and replaced with the new fill tube 30', including the two bend radii 152, which allows the aeration element 42 to be placed parallel in the bottom of a wine glass 62. As previously described, this takes advantage of the Reynolds number, in that, the bubbles 52' that are formed are being formed over a much wider dispersal area, thereby, more efficiently causing oxygenation of more of the wine or spirits. So one can refer to FIG. 41A to see the bubble formation 52'. One will notice that the physics have not changed. The wine glass 62 forms its own retention chamber 12 similar to that previously described in FIGS. 38 through 40B. As one can see, when the bubble field 54' reaches the point of maximum diameter of the wine glass 62, it will reach a point where it inherently wants to become stable (steady-state) or reach a static height.

Referring once again to FIG. 41, one can see that the level of the wine 52 should be poured well below the maximum diameter of the wine glass 62. This allows a custom that has been refined over the millennia, allowing one to swirl the wine and also look at the wine as it coats the inside of a wine glass to get an idea of whether it is full or light bodied, and also, through agitation, perform some very basic aeration (which is generally not very effective). In any event, pouring a wine glass to the half full or greater level is generally considered to be bad etiquette. As one can see in FIG. 41A, when one aerates the wine through aeration element 42, the bubbles rise up to the maximum diameter 124 of the wine glass reaching the static condition, as previously described. Again, the pump 36 flow rate can be adjusted such that the static level of the wine bubbles 52 can be easily achieved and maintained.

Referring back to FIGS. 41 and 41A, the bend radius 152 has to be tight enough, such that the aeration element 42 will fit into a wide variety of wine glasses, including ones that have a relatively narrow neck. For wine glasses that are relatively small in diameter and have a narrow neck, it is possible that bubble field 54' would tend to rise very rapidly. However, during a human factor study, this was found to be a very easy thing to overcome. The person that is aerating their glass of wine 62 is holding the pump assembly 36 in their hand and they're watching in real time as the bubble field 54' is being formed. Accordingly, if the bubble field 54' is rising too rapidly, the solution is very simple. One only needs to raise up the entire pump assembly 36 and remove the aeration element 42 temporarily from wine 52, such that the bubble formation 54' stops.

In an embodiment, the centerline 154, of air tube 30', will bisect the distance 156, which is the distance between the end of the gas tube radius 152 and the distal tip aeration element 42.

Figure 42:
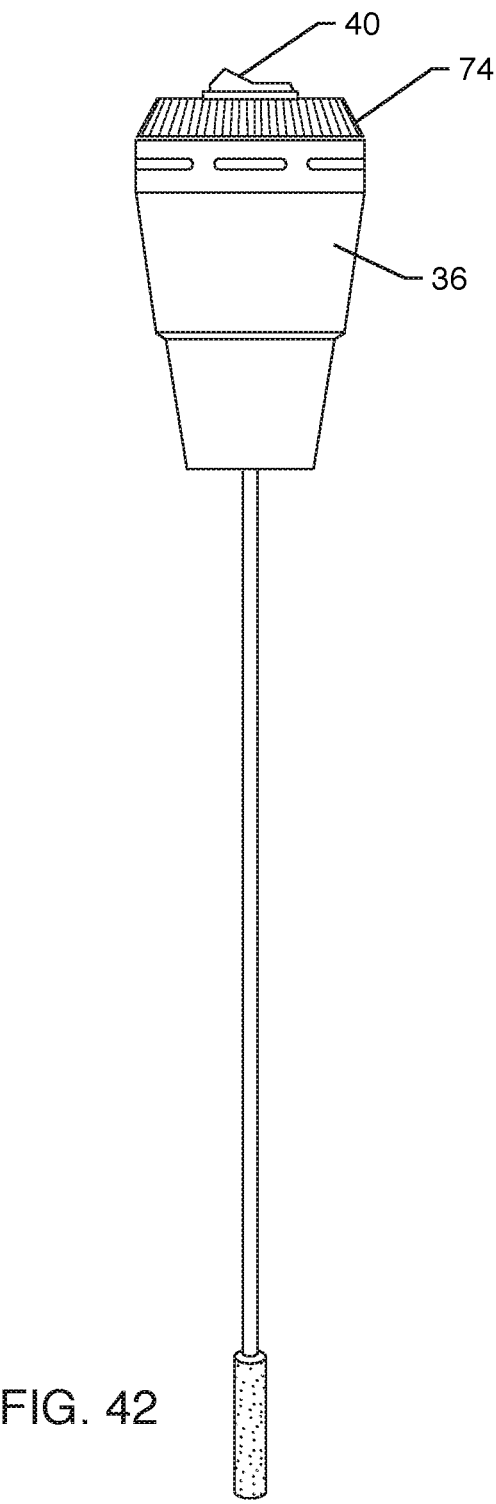
FIG. 42 is a side view of another embodiment of an aerator.

FIG. 42 illustrates that the switch 40 can be disposed on top of the pump housing 36 and that the air flow rate adjustment knob 74 can be disposed circumferentially around the top.

Figure 43:
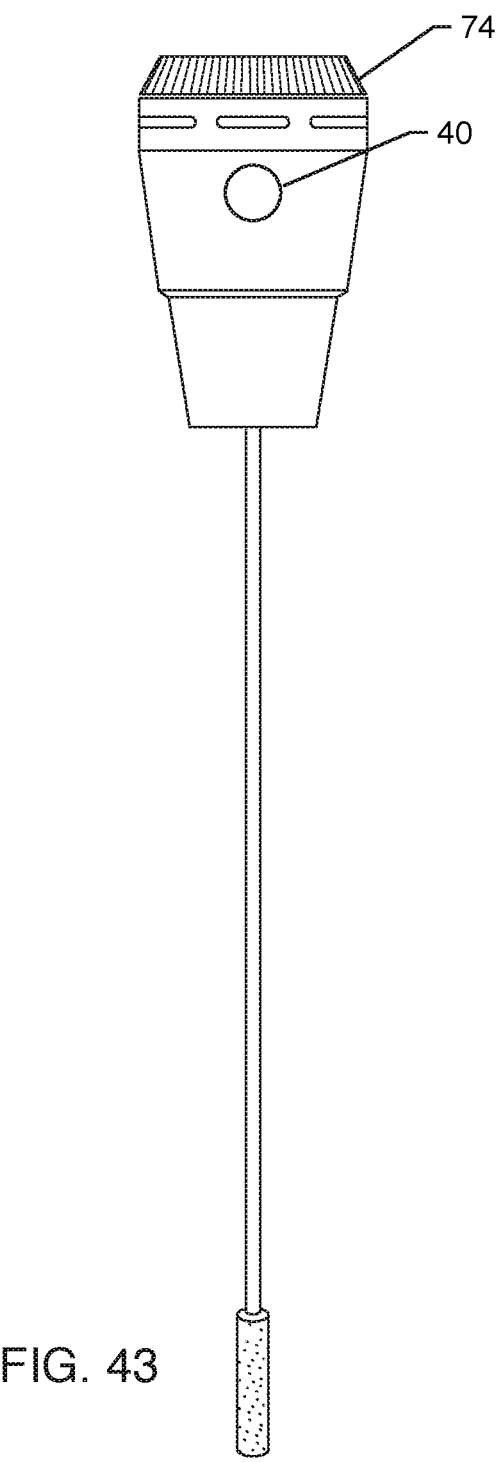
FIG. 43 is a side view of another embodiment of an aerator.

FIG. 43 is very similar to FIG. 42, except that in this case, the switch 40 is a push button switch disposed on the side. It will be appreciated that these can be any types of switches or adjustment knobs, including digital controls as previously described. It will also be appreciated that it is not necessary in the present invention, that the pump flow rate be infinitely adjustable through an adjustment rheostat 74. Instead, the pump can come with predetermined flow rates, such as a first and a second flow rate, one being at low speed and the other being at high speed. It will also be appreciated that the pump flow rate could be adjusted through a detent-type switch having, for example, five even pin preset flow rates.

FIG. 44 is very similar to FIG. 42, except that an aeration element 68 has a trapezoidal (frustoconical) shape and has been affixed to the shaft 30. The shape of the aeration element 68 is designed to be received by the shape of the bottom of retention element 12 shown in FIG. 45. In other words, when the assembly of FIG. 44 is slipped into the retention chamber 12, the aeration element 68 seats and holds upright pump assembly 36 in the proper location. In this case, the pump assembly 36 fits tightly into the top opening of retention chamber 12. There are one or more air slots 158 that are embedded into the side of the pump housing, which allows air to escape while bubbles are formed by aeration element 42.

FIG. 46 is very similar to FIG. 44 and FIG. 47 is very similar to FIG. 45. The difference is that the aeration element 68 is permanently attached into the bottom of the retention chamber 12 and the aeration element 42 is approximately the same diameter as the gas tube 30. This allows the gas tube 30 and aeration element 42 of FIG. 46, to be inserted down through the aeration element 68 and the pump assembly 36 will be seated into the opening of the retention chamber 12 holding it in a vertical, upright and stable position.

FIG. 48 describes a variation of the retention chamber 12 wherein there is an essential aperture 162 designed to receive aeration element and its associated gas tube 30, as shown in FIG. 49. Referring once again to FIG. 49, one can see that there is an adjustable stop 164, which controls the height of the aeration element 42 above the wine bottle punt 70. In an embodiment, when the assembly of FIG. 49 is inserted into the assembly of FIG. 48, the aeration element 42 would be disposed directly on top of or at a slight distance above the punt 70. When the assembly of FIG. 49 is inserted through the central passageway 162 and the pump 36 is turned on, air escapes through one or more air holes 160 and wine bubbles are formed in retention chamber 12, as has been previously described.

Figure 49A:
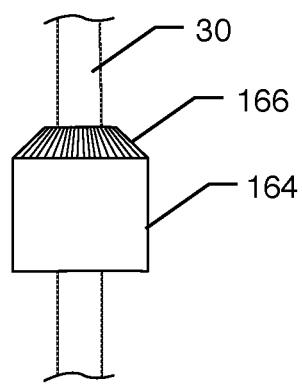
FIG. 49A is an enlarged side view of another embodiment of a stop similar to the structure of FIG. 49 taken along lines 49A-49A.

FIG. 49A is taken from section 49A-49A from FIG. 49 showing an alternative form of stop 164. In this case, the stop 164 has been welded or brazed 166 to the tube 30, as shown.

Figure 49B:
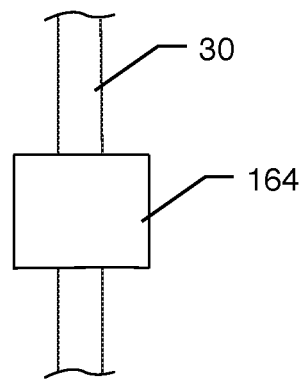
FIG. 49B is an enlarged side view of another embodiment of a stop similar to the structure of FIG. 49 taken along lines 49B-49B.

FIG. 49B is generally taken from section 49B-49B from FIG. 49. In this case, stop 164 has been press-fit to the tube 30.

Figure 50:
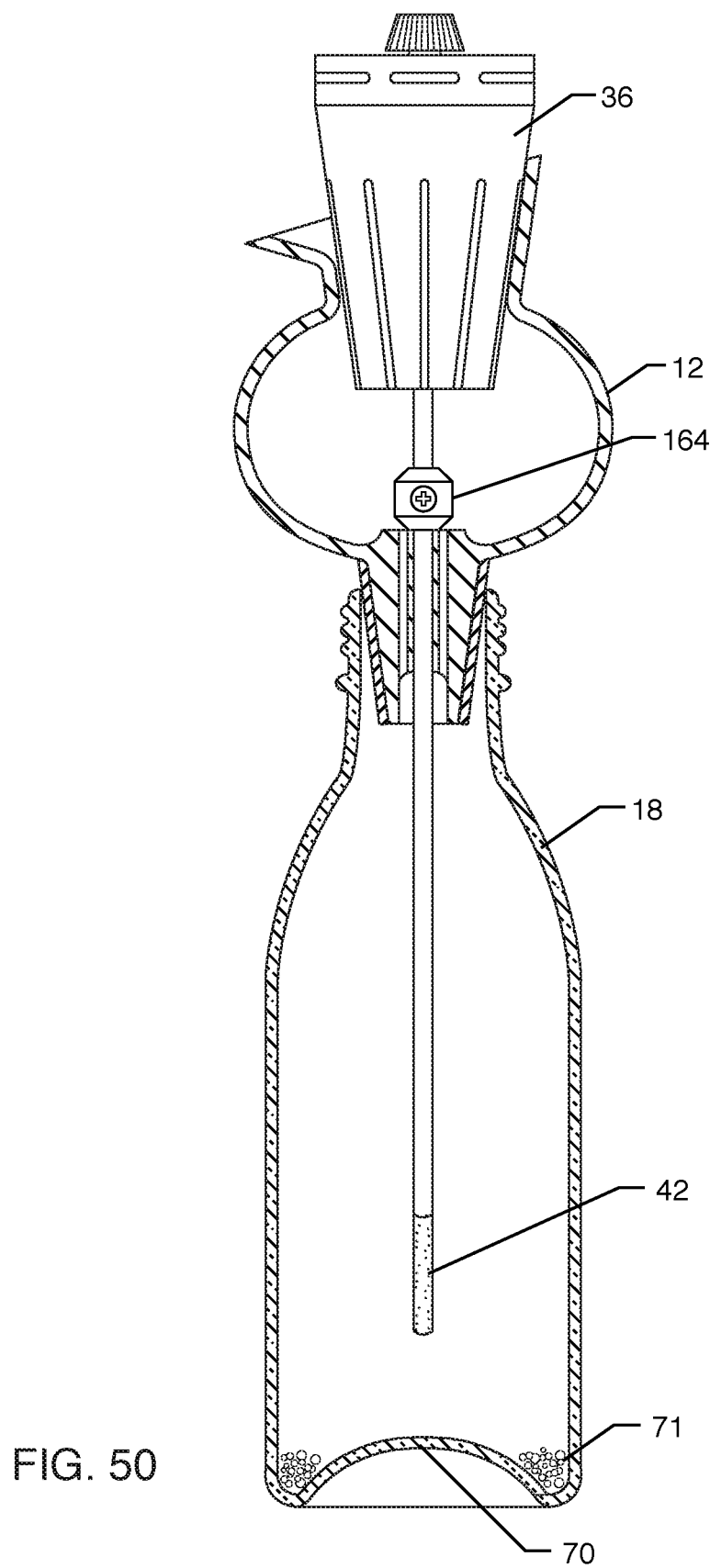
FIG. 50 is a side sectional view of the structures of FIGS. 48 and 49 combined.

FIG. 50 shows the wine bottle and retention chamber 12 of FIG. 48 with the air pump 36 assembly and the stop 164 and aeration element 42 inserted. As one can see, in this example, the aeration element 42 is disposed well above the punt 70. In some cases, having this additional spacing is highly desirable so that one does not undesirably have the aeration element 42 undesirably stir up sediments 71 in the wine bottle, which are generally located towards the bottom of the pump 70.

FIGS. 51 and 52 illustrate that the stop 164, in this case, having an adjustable cross-tip screw 165, can be adjusted such that the aeration elements 42 is disposed at an even greater distance above punt 70.

Figure 53:
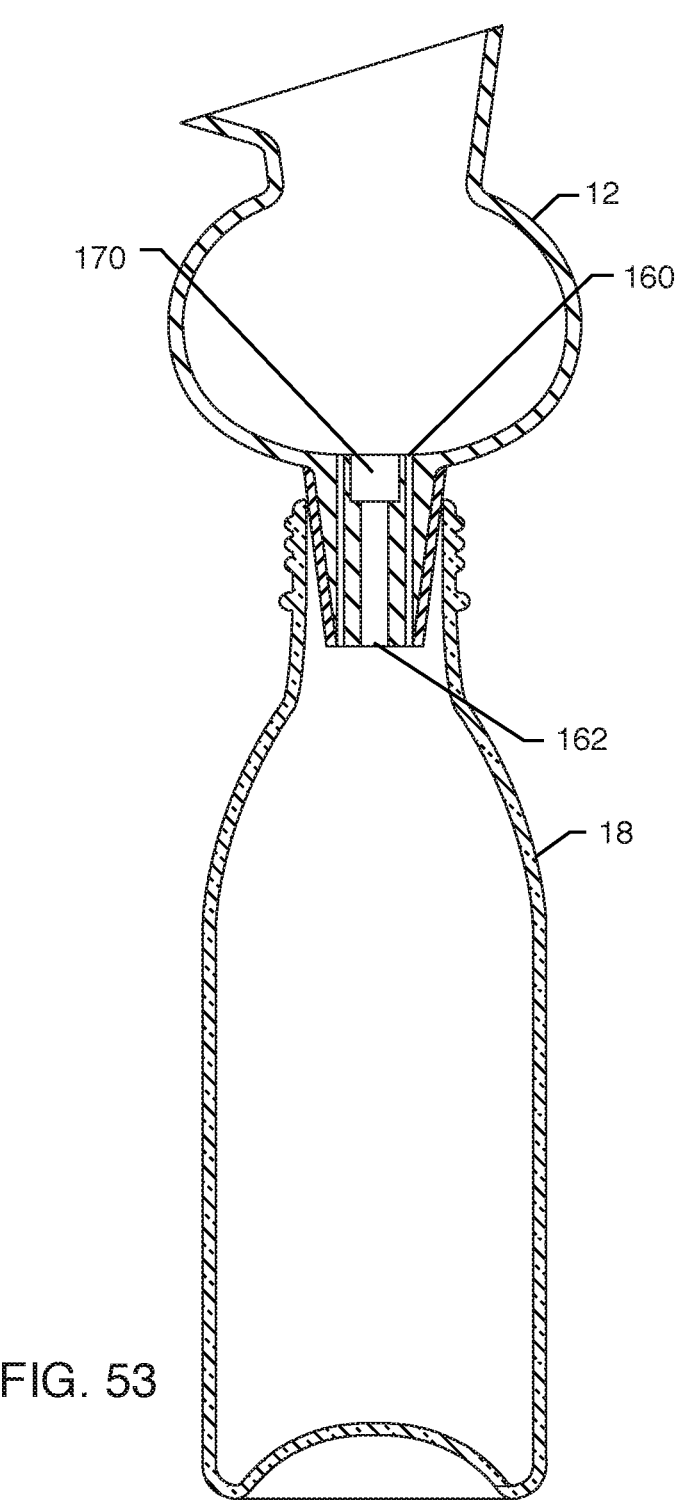
FIG. 53 is a side sectional view of another embodiment of a retention chamber now having a counter-bore for capturing an aeration device.
Figure 54:
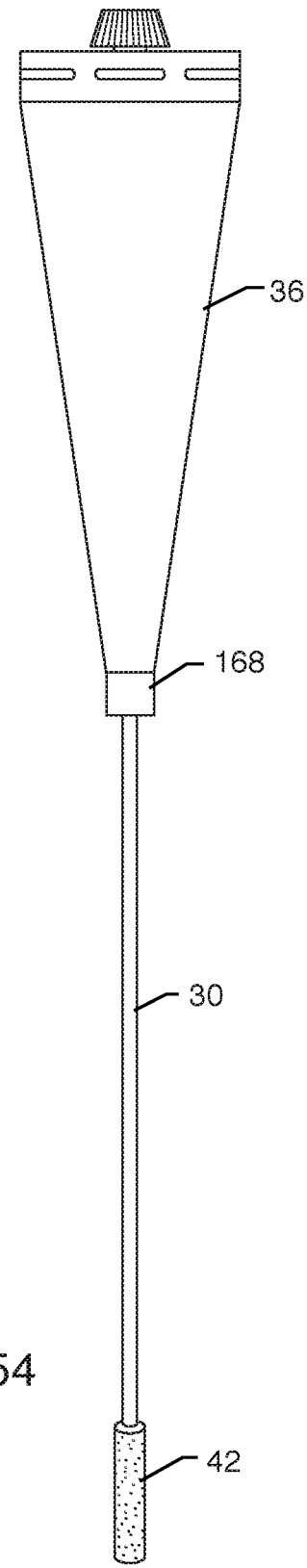
FIG. 54 is a side view of another embodiment of an aerator designed to fit within the counter-bore of FIG. 53.

FIG. 53 illustrates a retention chamber 12, but now has a counter-bore 170 and its through hole. The counter-bore 170 is designed to receive the similarly shaped aerator 168 of the pump assembly 36 as seen in FIG. 54. Element 168 is designed to snuggly fit into counter-bore 170 thereby, holding the pump assembly 36 in a stable and upright position during operation.

Figure 55:
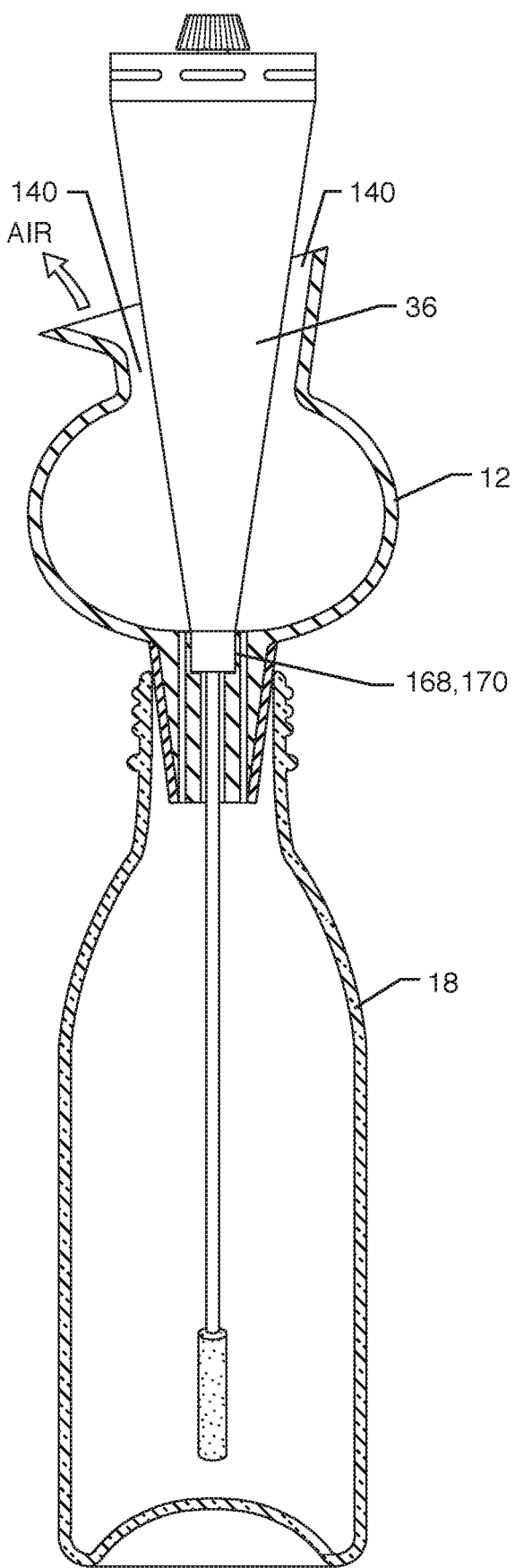
FIG. 55 is a side sectional view of the structures of FIGS. 53 and 54 combined.

FIG. 55 illustrates the wine bottle 18 and the retention chamber 12 of FIG. 53 mated with the pump assembly 36 of FIG. 54 showing the engagement of element 168 with the counter-bore 170'. Please note that there is an air gap 140 that is formed between the pump housing 36 and the inside diameter of the retention chamber 12 thereby, allowing air to freely escape during bubble formation.

FIG. 56 is very similar to FIG. 53, except that the counter-bore 170' has been raised up to the midline of the retention chamber maximum diameter 12 as shown. There are a number of air passage holes 160 that allow air to escape as bubbles are being formed. Importantly, this plurality of small air bubbles 160 also act as a bubble breaking filtration element. As previously described in FIGS. 54 and 55, Element 168 is snuggly fit and engages the counter-bore 170' thereby, holding the pump assembly 36 in a stable upright position during operation.

Figure 58:
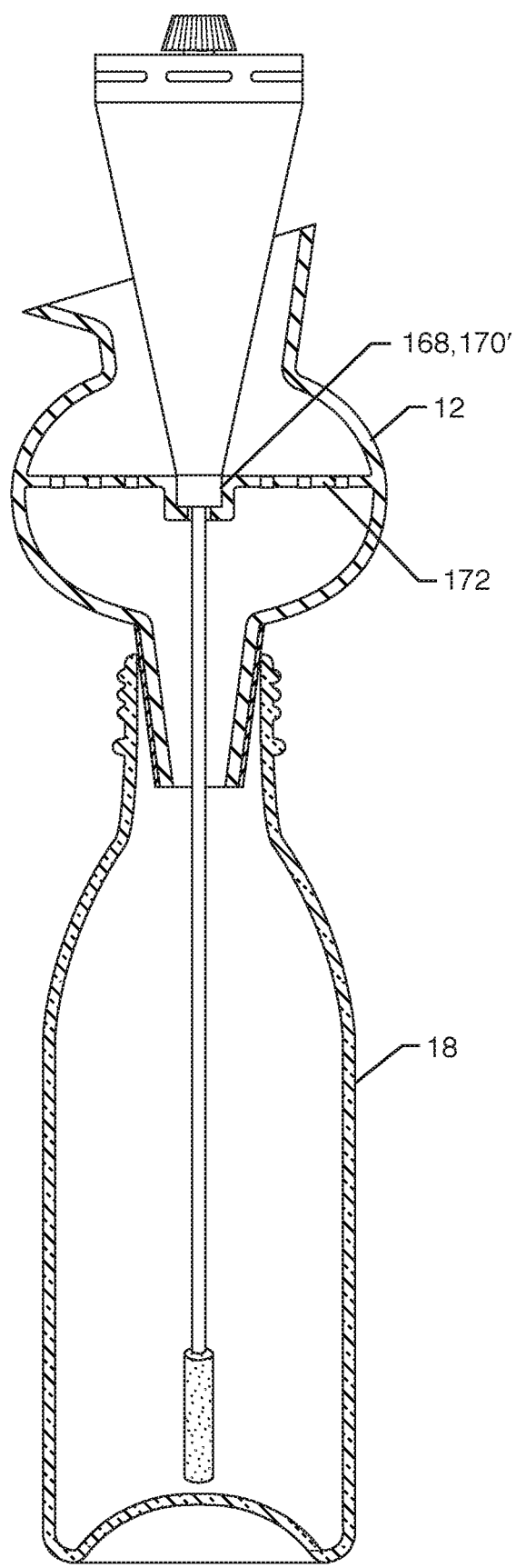
FIG. 58 is a side sectional view of the structures of FIGS. 56 and 57 combined.

FIG. 58 shows the joining of the wine bottle 18 and retention chamber 12 of FIG. 56 with the pump assembly of FIG. 57. The inventors noted that element 168 tightly fits into the counter-bore area 170' and now the counter-bore 170' is located within a web plate 172, as shown.

Figures 59, 60:
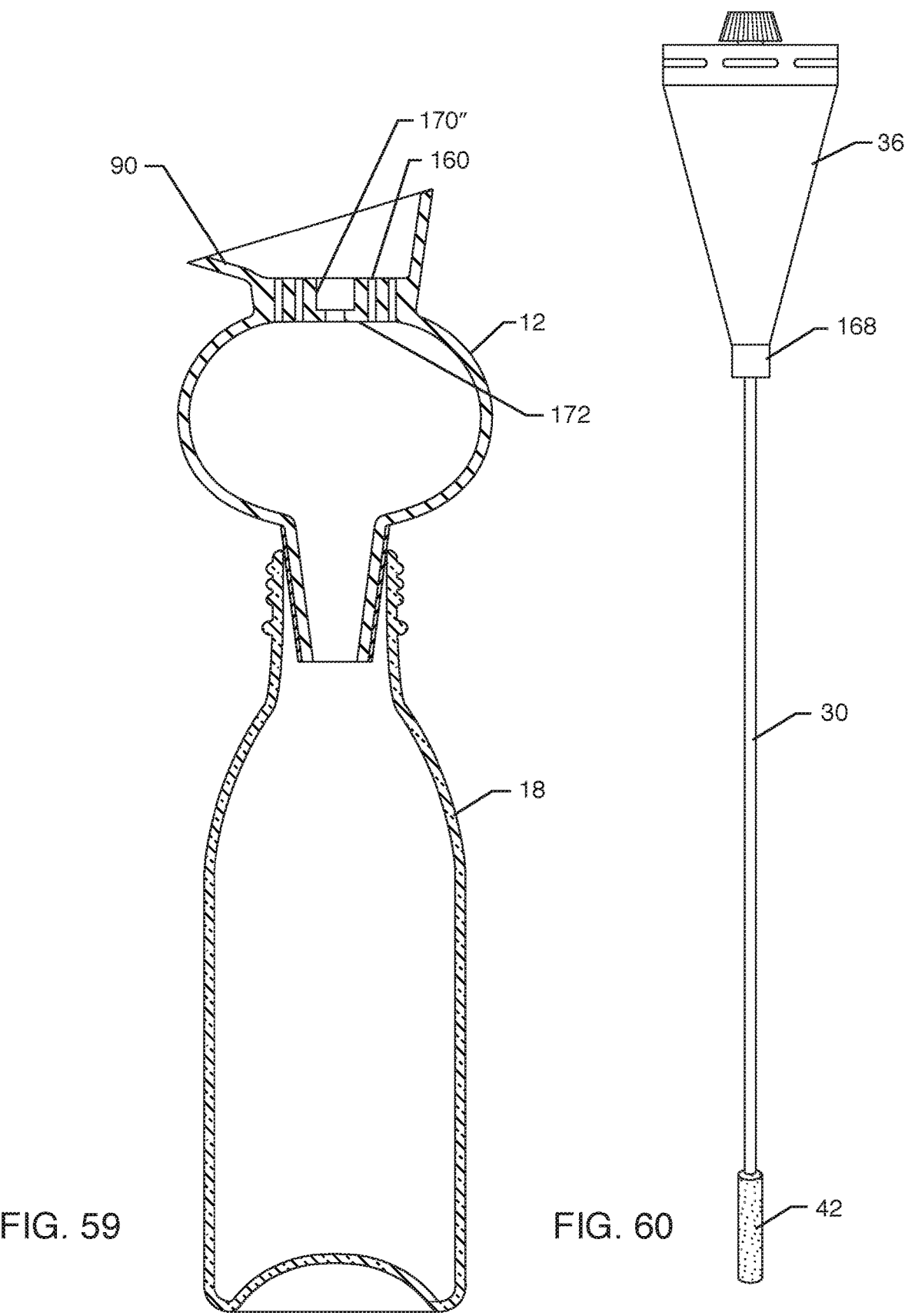
FIG. 59 is a side sectional view of another embodiment of a retention chamber now having a counter-bore for capturing an aeration device.
FIG. 60 is a side view of another embodiment of an aerator designed to fit within the counter-bore of FIG. 59.

FIG. 59 illustrates another variation showing that the counter-bore 170" is disposed near the top of the retention chamber 12 in close proximity to pour spout 90.

Figure 61:
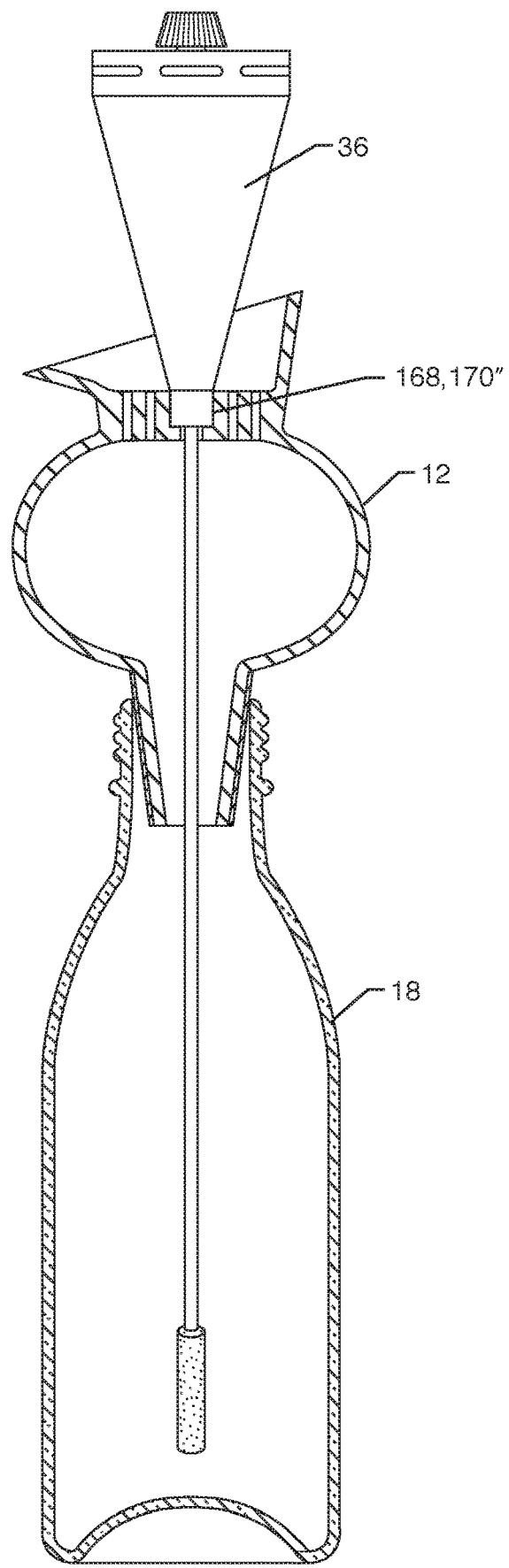
FIG. 61 is a side sectional view of the structures of FIGS. 59 and 60 combined.

FIG. 61 illustrates the mating of the pump assembly in FIG. 60 into the wine bottle 18 and retention chamber 12 of FIG. 59.

Figure 62:
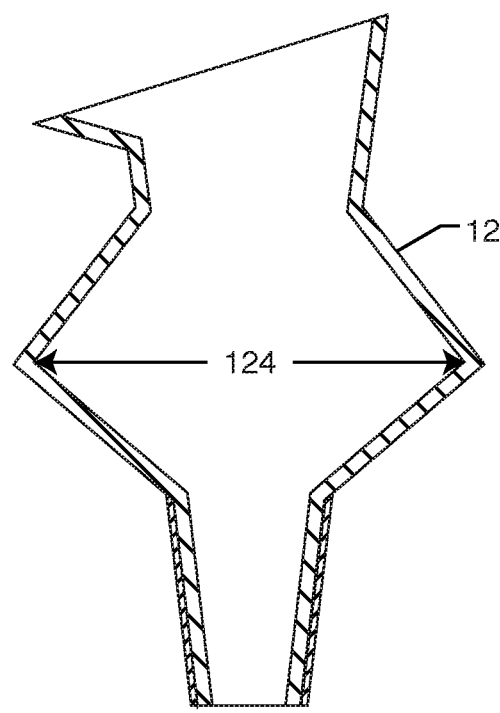
FIG. 62 is a side sectional view of another embodiment of a retention chamber.
Figure 63:
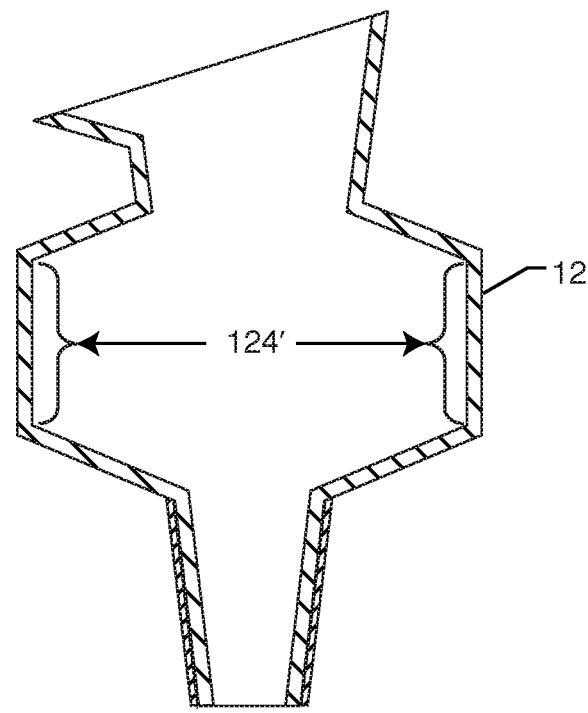
FIG. 63 is a side sectional view of another embodiment of a retention chamber.

FIGS. 62 and 63 indicate that the retention chamber 12 can take on angular shapes or other shape variations. It will be noted in FIG. 62 that a maximum diameter 124 is still created that acts as a bubble-stabilizing element. In FIG. 63, this maximum diameter area 124' is dispersed over a wider area, indicating that the static level of bubble height can be achieved anywhere within that region.

Figure 64:
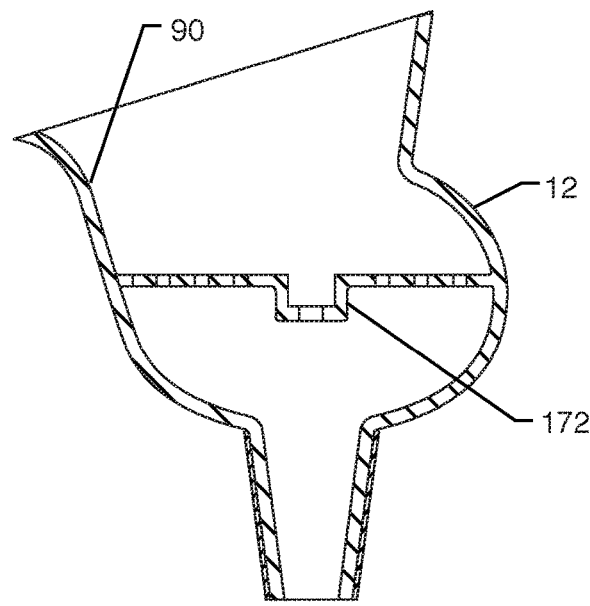
FIG. 64 is a side sectional view of another embodiment of a retention chamber.

FIG. 64 illustrates a retention chamber 12 with a greatly enlarged pour spout area 90 to facilitate the pouring of wine. The structure of FIG. 64 allows the wine to flow out through pour spout area in an easier fashion so it doesn't get hung up by the curvature of the retention chamber 12.

Figure 64A:
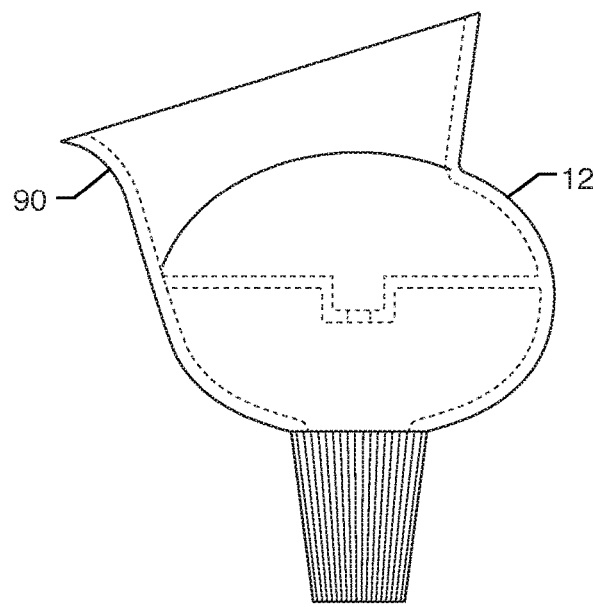
FIG. 64A is side view of the structure of FIG. 64.

FIG. 64A is an isometric side view of the cross-sectional structure of FIG. 64.

Figure 64B:
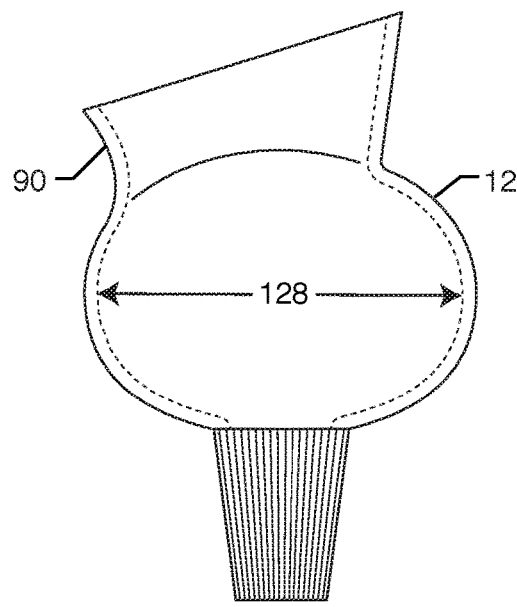
FIG. 64B is a side very similar to FIGS. 64 and 64A, except the web plate has been removed.

FIG. 64B is very similar to FIGS. 64 and 64A, except the web plate 172 has been removed. In addition, the pour spout 90 has been readjusted, such that a maximum diameter 128 occurs in the retention chamber 12. Note that the retention chamber is not a perfect sphere and has more of an oblong shape, which is very similar to existing wine decanters. The oblong shape preserves the maximum diameter 128 to create a static level for the bubble field 54' (not shown) while at the same time reducing the overall height and stability of the entire assembly on top of the wine bottle.

FIG. 65 indicates that the retention chamber 12 can mimic the shape of a wine glass, including a pour spout area 90. Referring once again to FIG. 65, one can see that the opening at the top is the largest opening. This facilitates making one piece from a simple two-part mold because all of the draft surfaces are such that the entire retention chamber 12 can easily be removed from the mold. The retention chamber 12 of FIG. 65 offers a number of other advantages as well. For one, it is very easy to quickly clean and dry with a hand towel and they can also be stacked upside down in trays, for example, in a restaurant.

FIG. 66 shows a pump assembly 36 with an air tube 30 and distal aeration element 42. In this case, there is a stop 164, which has been previously described to be attached by a set screw, welding, brazing, press-fit or the like.

Figure 67:
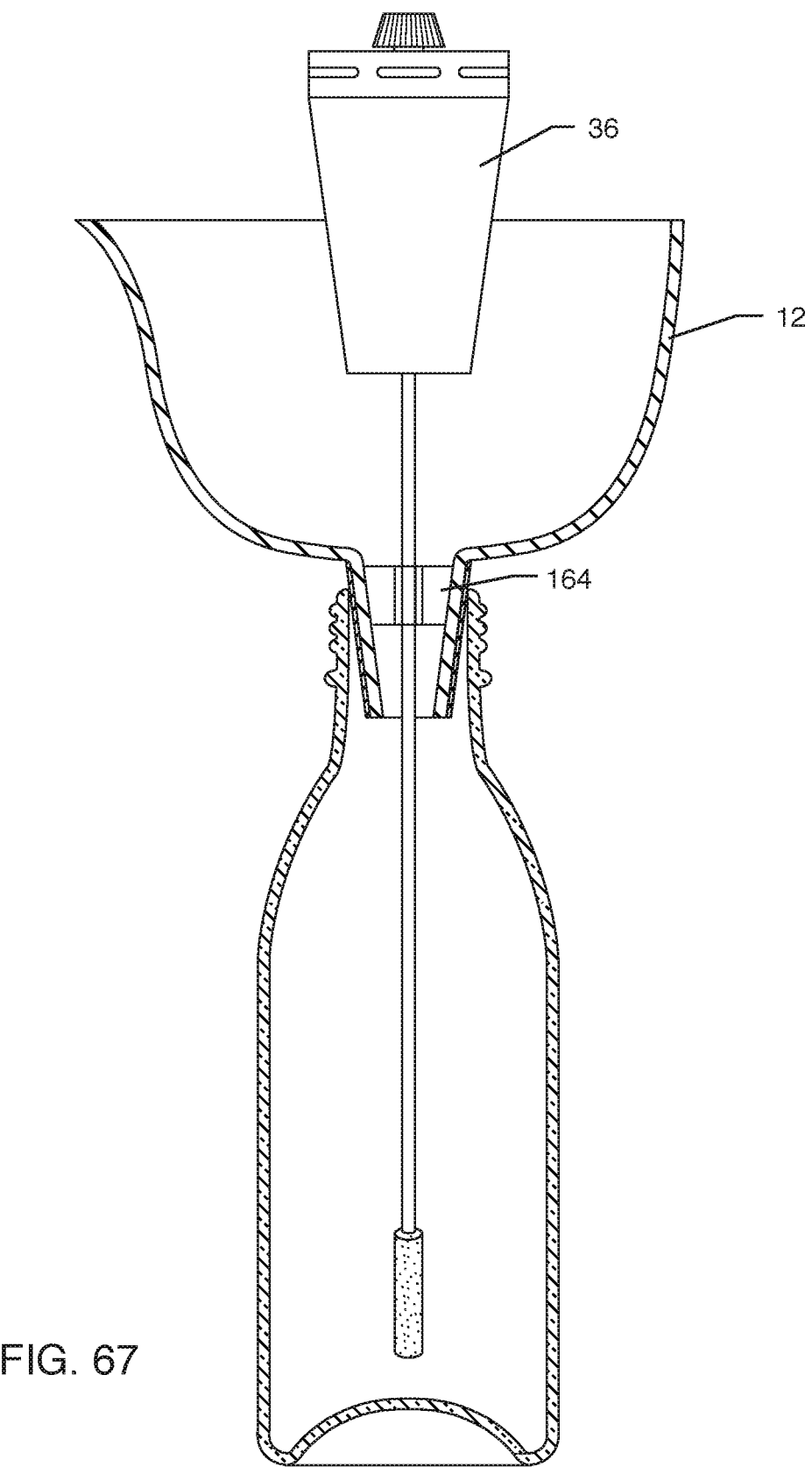
FIG. 67 is a side sectional view of the structures of FIGS. 65 and 66 combined.

FIG. 67 shows the assembly of FIG. 66 mated with the assembly of FIG. 65 showing the stop 164 fitting securely into the bottom area of the retention chamber 12. Stop 164 is specially designed so that air and wine bubbles can escape up into retention chamber 12.

Figure 68A:
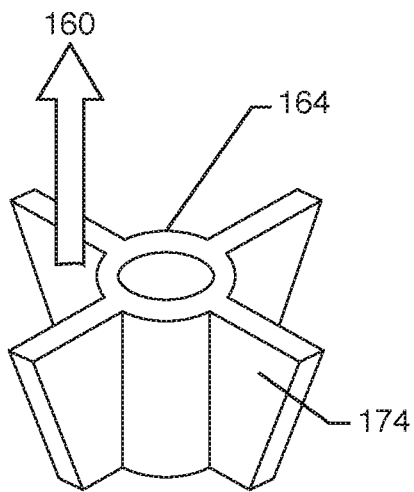
FIG. 68A is a perspective view of an embodiment of the stop taken from FIGS. 66 and 67.
Figure 68B:
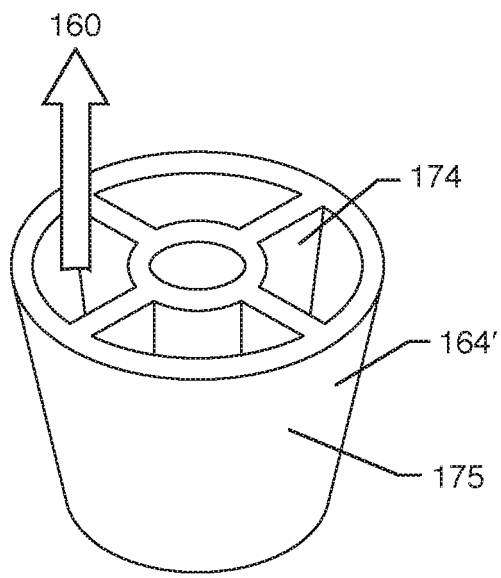
FIG. 68B is a perspective view of another embodiment of the stop taken from FIGS. 66 and 67.

Two types of stops are illustrated in FIGS. 68A and 68B. In FIG. 68, one can see that the stop 164 has fin elements 174, as shown. FIG. 68B also embodies fin elements 174 that are enclosed in an overall structure 175. The stop 164, as illustrated in FIG. 68A, is considered to be superior in that, it provides great stability to the pump assembly 36, but at the same time, it is easy to remove. A disadvantage of the assembly shown in FIG. 68B is that surface 175 can easily get stuck to the inside surface of the mating bottom portion of the retention chamber 12, particularly when a liquid, such as wine, is present. As can be seen in both FIGS. 68A and 68B, air and bubbles are free to flow through openings 160.

Figure 69:
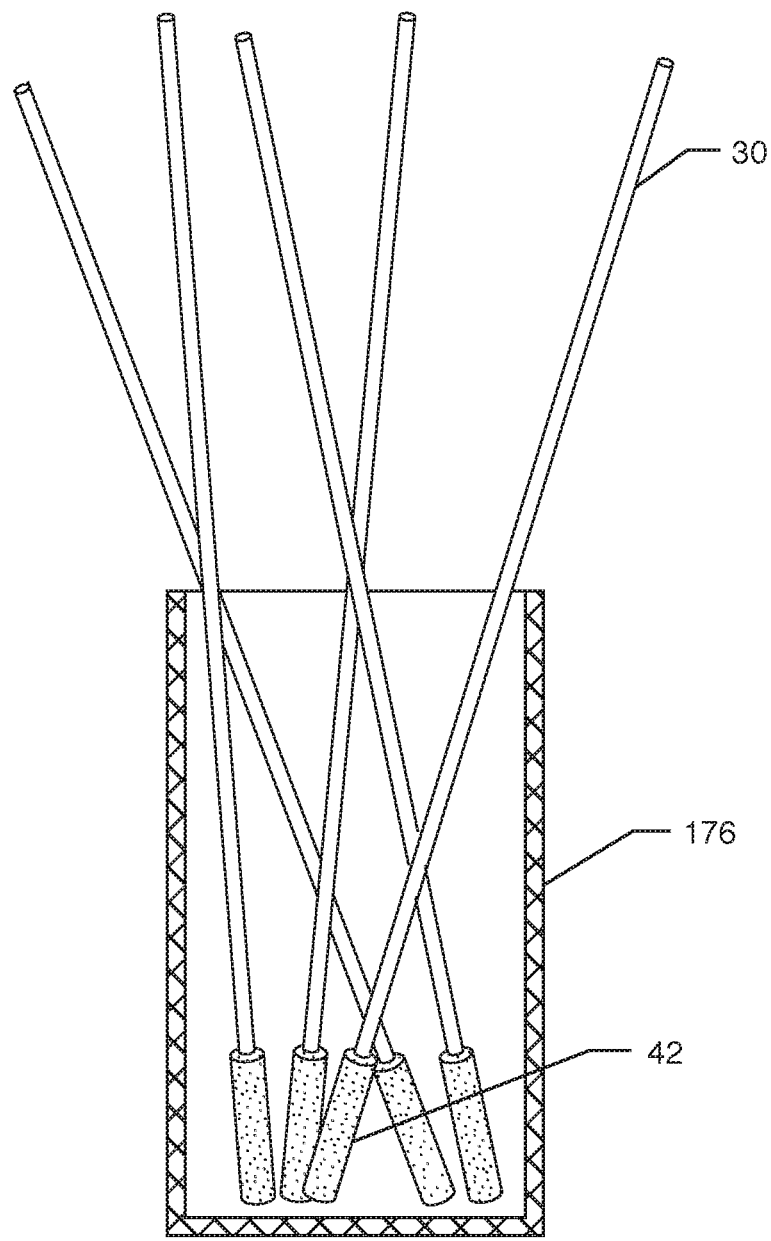
FIG. 69 is a side sectional view of an novel basket for cleaning of a plurality of gas conduits with aeration elements.

FIG. 69 illustrates a dishwasher basket 176, which is generally of stainless steel or the like and has a mesh or open weave type of structure. This allows for the holding of any number of air passage tube 30 and distal aeration element 42 of the present invention. For example, in a restaurant operation, one may need to wash 20, 30 or even more of these at the same time.

Figure 70:
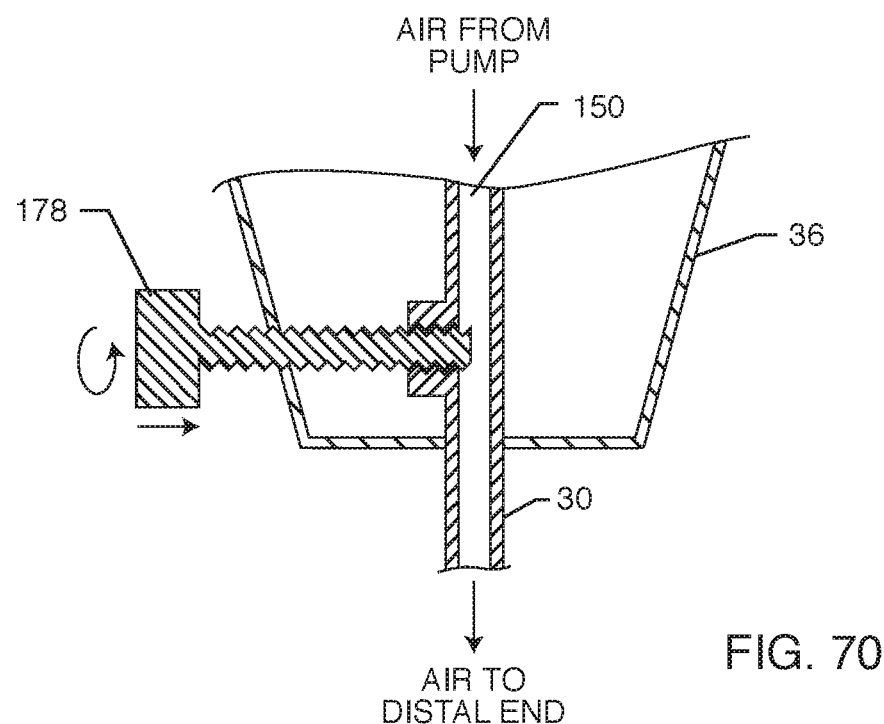
FIG. 70 is an enlarged side view of a novel air restriction screw.

FIG. 70 illustrates a different method of air control wherein, the pump speed is held constant. In this case, the air screw 178 can be turned to pinch off the air flow in portion 150 thereby allowing air flow control. A disadvantage of having the set screw 178 screwed all the way in is that this would almost completely block off the air flow from the pump. A negative of this is that back pressure is created against the pump, which also increases its temperature while draining more electrical energy.

Figure 71:
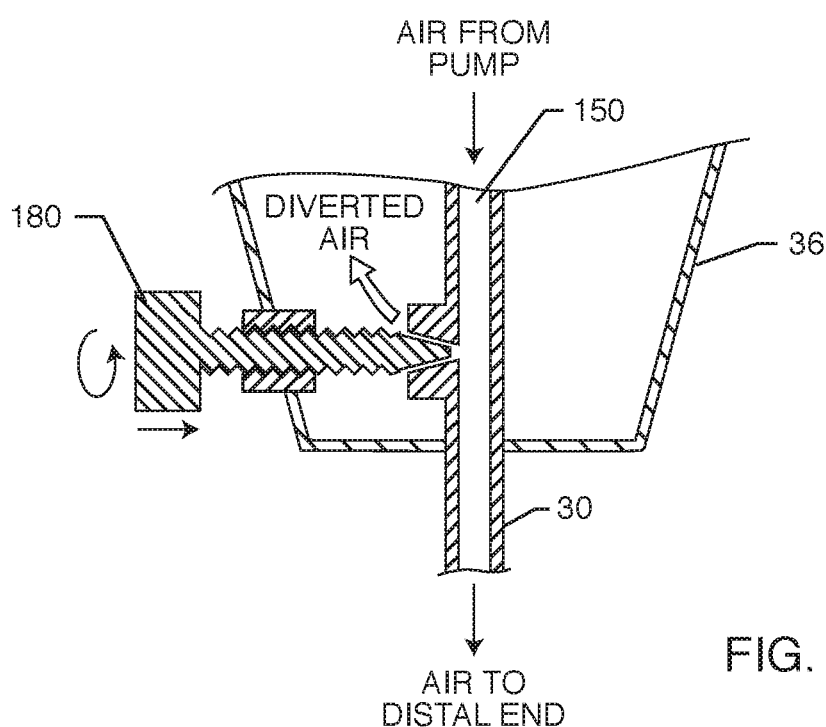
FIG. 71 is an enlarged side view of a novel air bleeder valve.

A superior embodiment is shown in FIG. 71 wherein, the pump speed is still held constant and an air bleeder screw 180 is employed. As the screw 180 is unscrewed and the distal end of the screw is pulled out, this allows air to escape from passage 150 and be bled off, which thereby reduces the amount of air to the aerator element 42 (not shown). An advantage of the air bleeder structure shown in FIG. 71 is that air can be diverted from the distal aeration element 42 without placing back pressure on the pump, which could cause damage to the pump or at the very least, increase electrical current flow to the pump.

FIG. 72 illustrates a pump assembly 36 along with the gas flow tube 30 and aeration element 42. In this case, interior elements, including the battery, circuit board, motor and pump assembly are schematically shown. Now, there is a novel heating element 182 that has been added in series with the air flow tube 30. By selecting a digital or mechanical switch, one can select to activate heating element 182.

Some explanation is required to understand why the heating element 182 can be very important. It is very common with wines to properly store them either in cellars, which are very cool or what has become very popular are wine storage vaults or wine storage refrigerators within one's home. In general, red wines are preferably stored at 55° F. and white wines are stored typically at a much lower temperature, such as around 45° F. It is fully acceptable to drink white wines very chilled, including champagnes. However, a number of connoisseurs believe they should be actually a little warmer so that one can get the full bouquet and aromas of the wine. And in particular, red wines are never supposed to be served extremely chilled. It is a myth that red wines should be served at room temperature. Typically, they should be a few degrees colder than room temperature. Assuming room temperature is around 72° F., it would be appropriate to serve a red wine slightly chilled, say at around 65°. The problem is, if one has one of these wine storage refrigerators, one must remove the bottle of wine that they wish to drink at least an hour, if not several hours before drinking and set it on an outside counter so that it can warm up somewhat.

The novel system, as shown in FIG. 72, eliminates this need by not only aerating the wine, but also having the air bubbles 54 that are emitted from aerator element 42, be heated. By using very small bubbles and having an enormously high volume of bubbles that is consistent with the present invention, this rapidly warms up the red wine to the desired drinking temperature. A user may open a bottle taken directly from a wine storage refrigerator and be able to aerate and warm the wine for immediate consumption at the proper aeration level and proper temperature.

The heating element could also be based on thermoelectric cooling/heating, which uses the Peltier Effect to create a heat flux between the junction of two different types of materials. A Peltier cooler, heater or thermal-electric heat pump is a solid-state active heat pump, which transfers heat from one side of the device to the other with consumption of electrical energy, depending on the direction of current. Such an instrument is also called a Peltier Device, Peltier Heat Pump, Solid-State Refrigerator or Thermal-electric cooler (TEC). It can be used either for heating or for cooling, although in practice, the main application is cooling. It can also be used as a thermal-electric controller that either heats or cools. The TEC device can also be combined with a temperature sensor, such that the wine would reach the ideal temperature before the TEC device turned off.

FIG. 73 illustrates an alternate location 182' for the heating element. In this case, instead of being in series with the gas tube 30, the heating element 182' is disposed across one or more holes 183 in the pump housing assembly, where cooler air comes in. By passing across the heating element 182', the cool air is heated and then drawn into the pump intake 185 and then discharged through the pump outlet 187, where the air comes out through the aeration element 42 as heated air.

Having the heating element 182 in series with the air tube 30, as illustrated in FIG. 72, is more efficient. Having the heater element 182' disposed where cool air comes in, as described in FIG. 73, is actually inefficient, as that heated air then must flow past the battery 184, past the circuit board 186 and then past the motor 188 thereby, heating all of them up slightly before it is drawn into the inlet of the pump assembly 190 and then discharged through the gas tube 30. Accordingly, the assembly of FIG. 72 is considered the more efficient embodiment, but FIG. 73 illustrates that the heating element 182 or 182' may be placed anywhere such that the air exiting the aeration element 42 is heated.

It will be understood within the present invention for any of the embodiments disclosed herein that every reference to the word "wine bottle" is also extendable to any other type of liquor bottle, including tequila bottles, whiskey bottles and the like. Similarly, the present invention is applicable to all types of wines, including red wines, white wines, varietals and the like. It is also applicable to all types of spirits and liquors, including Scotch, Tequilas, Whiskeys, Bourbon and the like. It will be understood that every time the term wine is used in the present invention that is for brevity and does not narrow the scope of the invention. In other words, the term "wine" applies to all types of liquors and spirits as other drinks beyond wine may be benefited from the aeration process.

It will be understood that retention chamber 12 is interchangeably called the expansion chamber 12 throughout the invention. If the retention chamber or expansion chamber 12 creates a space to hold wine bubbles during the aeration process, it will also be understood that the expansion chamber or retention chamber may also hold liquid wine. For example, through experimentation the inventors have found that, particularly for a full bottle of wine, sometimes liquid wine gets pushed up into the retention/expansion chamber as well as bubbles. Therefore, it is understood that the expansion chamber/retention chamber is capable of holding liquid wine in addition to wine bubbles.

Although several embodiments have been described in detail for purposes of illustration, various modifications may be made to each without departing from the scope and spirit of the invention. Accordingly, the invention is not to be limited, except as by the appended claims.

What is claimed is:

1. An aeration assembly for aerating liquids including wine and other alcoholic beverages, the aeration assembly comprising:
    an expansion chamber defined as having a top portion and a bottom portion, wherein both the top portion and the bottom portion have an opening disposed there through, wherein the bottom portion necks down and is configured to be partially disposed inside of and engage an opening of an uncorked and/or opened bottle, wherein the top portion is disposed above the opening of the uncorked and/or opened bottle when the bottom portion is engaged with the opening of the uncorked and/or opened bottle, and wherein the expansion chamber is configured to be in fluid communication with an inside of the uncorked and/or opened bottle when the bottom portion is engaged with the opening of the uncorked and/or opened bottle; and
    an aerating device comprising:
        a gas conduit having a proximal end in fluid communication with a distal end, wherein the gas conduit is configured to pass through the opening of the bottom portion of the expansion chamber wherein the distal end is locatable below the bottom portion of the expansion chamber while the proximal end is locatable above the bottom portion of the expansion chamber;
        a gas source in fluid communication with the proximal end of the gas conduit, the gas source supplying the gas conduit through the opening of the top portion of the expansion chamber;
    wherein the expansion chamber is configured to temporarily contain an expansion of bubbles during an aeration process and to include an air gap between the expansion chamber and the aerating device, the air gap configured to allow air to escape through the top portion of the expansion chamber during the aeration process; and
    wherein the expansion chamber and aerating device are not permanently connected as the aerating device is configured to slip down through the opening in the top portion of the expansion chamber, wherein the aerating device can be fully removed from the expansion chamber before, during or after the aeration process by lifting the aeration element up and out of the opening at the top portion of the expansion chamber thereby leaving the expansion chamber engaged with the opening of the bottle.

2. The aeration assembly of claim 1, wherein the expansion chamber is optically transparent or translucent.

3. The aeration assembly of claim 1, including a sealing element attached to the bottom portion of the expansion chamber, wherein the sealing element is configured to seal against an inside surface of the opening of the uncorked and/or opened bottle.

4. The aeration assembly of claim 3, wherein the sealing element comprises an elastic or rubber-like material.

5. The aeration assembly of claim 1, including an aeration element attached to the distal end of the gas conduit.

6. The aeration assembly of claim 1, wherein the opening at the bottom portion of the expansion chamber is larger than a maximum width of the aeration element and/or the distal end of the gas conduit.

7. The aeration assembly of claim 1, wherein a middle portion and/or the top portion of the expansion chamber is larger in cross-sectional area as compared to the bottom portion of the expansion chamber.

8. The aeration assembly of claim 7, wherein the middle portion and/or top portion of the expansion chamber that is larger in cross-sectional area as compared to the bottom portion of the expansion chamber has a diameter of at least 2 inches.

9. The aeration assembly of claim 1, wherein a middle portion of the expansion chamber is larger in cross-sectional area as compared to the bottom portion and the top portion of the expansion chamber.

10. The aeration assembly of claim 9, wherein the middle portion of the expansion chamber that is larger in cross-sectional area as compared to the bottom portion and top portion of the expansion chamber has a diameter of at least 2 inches.

11. The aeration assembly of claim 1, wherein the gas source comprises an electrically powered air pump, a manually powered air pump or a pressurized cartridge of air.

12. The aeration assembly of claim 11, wherein the electrically powered air pump comprises an electronic display and/or a LED display, where the electrically powered air pump comprises at least one button configured to control the electrically powered air pump.

13. The aeration assembly of claim 12, wherein electrically powered air pump includes an adjustable flow rate of at least 0.1 liters per minute up to a maximum of 20 liters per minute.

14. The aeration assembly of claim 13, wherein the electrically powered air pump includes a timer configured to turn off the electrically powered air pump after an adjustable and preset elapsed time has expired.

15. The aeration assembly of claim 11, wherein the electrically powered air pump is electrically powered by a battery or by an electrical plug.

16. The aeration assembly of claim 1, wherein the gas source is disposed remote from the gas conduit.

17. The aeration assembly of claim 1, wherein the gas source is attached to a portion of the gas conduit.

18. The aeration assembly of claim 1, wherein the expansion chamber includes at least one pour spout.

19. The aeration assembly of claim 1, including a bubble-reducing filter element disposed within the expansion chamber and/or connected to the gas conduit.

20. The aeration assembly of claim 1, wherein the gas conduit is removably attachable to the gas source with the use of an O-ring and/or seal ring, and including a second gas conduit removably attachable to the gas source, the second gas conduit comprising at least one bend and an aeration element disposed at its distal end, wherein the aeration element is positioned perpendicular in relation to the proximal end of the second gas conduit.

21. The aeration assembly of claim 1, wherein the aerating device is configured to be removably captured by the expansion chamber.

22. The aeration assembly of claim 1, including a stop attached to a portion of the gas conduit, wherein the stop is removably engageable with a portion of the expansion chamber, the stop locating and removably securing the aerating device relative to the expansion chamber.

23. The aeration assembly of claim 1, wherein the aerating device comprises a housing, where a distal end of the housing engages a counter-bore formed in the expansion chamber, the distal end of the housing and counter-bore locating and removably securing the aerating device relative to the expansion chamber.

24. The aeration assembly of claim 1, wherein the aerating device comprises an air restriction valve controlling a flow of gas from the gas source to the gas conduit.

25. The aeration assembly of claim 1, wherein the aerating device comprises a heater element disposed in fluidic communication with the gas source and/or gas conduit, the heater element configured to heat a flow of gas supplied to the gas conduit.

26. The aeration assembly of claim 25, wherein the heater element comprises a thermoelectric heater configured to utilize the Peltier effect to create a heat flux between a junction of two different types of materials.

27. The aeration assembly of claim 1, wherein the opening at the bottom portion of the expansion chamber has a diameter greater than 0.45 inches.

28. An aeration assembly for aerating liquids including wine and other alcoholic beverages, the aeration assembly comprising:
  an expansion chamber defined as having a top portion, a middle portion and a bottom portion, wherein both the top portion and the bottom portion have an opening disposed there through, wherein the bottom portion necks down and is configured to be partially disposed inside of and engage an opening of an uncorked and/or opened bottle, wherein the top portion is disposed above the opening of the uncorked and/or opened bottle when the bottom portion is engaged with the opening of the uncorked and/or opened bottle, wherein the expansion chamber is configured to be in fluid communication with an inside of the uncorked and/or opened bottle when the bottom portion is engaged with the opening of the uncorked and/or opened bottle, wherein the middle portion and/or the top portion of the expansion chamber is larger in cross-sectional area as compared to the bottom portion of the expansion chamber;
  a sealing element attached to the bottom portion of the expansion chamber, wherein the sealing element is configured to seal against an inside surface of the opening of the uncorked and/or opened bottle;
  an aerating device comprising:
    a gas conduit having a proximal end in fluid communication with a distal end, wherein the gas conduit is configured to pass through the opening of the bottom portion of the expansion chamber wherein the distal end is locatable below the bottom portion of the expansion chamber while the proximal end is locatable above the bottom portion of the expansion chamber;
    a gas source in fluid communication with the proximal end of the gas conduit, wherein the gas source comprises an electrically powered air pump, the gas source supplying the gas conduit through the opening of the top portion of the expansion chamber;
    an aeration element attached to the distal end of the gas conduit;
  wherein the expansion chamber is configured to temporarily contain an expansion of bubbles during an aeration process and to include an air gap between the expansion chamber and the aerating device, the air gap configured to allow air to escape through the top portion of the expansion chamber during the aeration process;
  wherein the expansion chamber and aerating device are not permanently connected as the aerating device is configured to slip down through the opening in the top portion of the expansion chamber, wherein the aerating device can be fully removed from the expansion chamber before, during or after the aeration process by lifting the aeration element up and out of the opening at the top portion of the expansion chamber thereby leaving the expansion chamber engaged with the opening in the bottle; and
  wherein the opening at the bottom portion of the expansion chamber is larger than a maximum width of the aeration element and/or the distal end of the gas conduit.

29. The aeration assembly of claim 28, wherein the aerating device comprises a bleeder valve controlling a flow of gas from the gas source to the gas conduit.

30. The aeration assembly of claim 28, wherein the expansion chamber includes at least one pour spout disposed at or near the top portion.

31. The aeration assembly of claim 28, wherein the gas conduit is removably attachable to the gas source with the use of an O-ring and/or seal ring, and including a second gas conduit removably attachable to the gas source, the second gas conduit comprising at least one bend and an aeration element disposed at its distal end, wherein the aeration element is positioned perpendicular in relation to the proximal end of the second gas conduit.

32. The aeration assembly of claim 28, wherein the aerating device is configured to be removably captured by the expansion chamber.

33. The aeration assembly of claim 28, including a stop attached to a portion of the gas conduit, wherein the stop is removably engageable with a portion of the expansion chamber, the stop locating and removably securing the aerating device relative to the expansion chamber.

34. The aeration assembly of claim 28, wherein the aerating device comprises a housing, where a distal end of the housing engages a counter-bore formed in the expansion chamber, the distal end of the housing and counter-bore locating and removably securing the aerating device relative to the expansion chamber.

35. The aeration assembly of claim 28, wherein the aerating device comprises a heater element disposed in fluidic communication with the gas source and/or gas conduit, the heater element configured to heat a flow of gas supplied to the gas conduit, wherein the heater element comprises a thermoelectric heater.

36. The aeration assembly of claim 28, wherein the opening at the bottom portion of the expansion chamber has a diameter greater than 0.45 inches.

37. The aeration assembly of claim 28, wherein the expansion chamber is optically transparent or translucent.

38. An aeration assembly for aerating liquids including wine and other alcoholic beverages, the aeration assembly comprising:
- an expansion chamber defined as having a top portion and a bottom portion, wherein both the top portion and the bottom portion have an opening disposed there through, wherein the bottom portion necks down and is configured to be partially disposed inside of and engage an opening of an uncorked and/or opened bottle, wherein the top portion is disposed above the opening of the uncorked and/or opened bottle when the bottom portion is engaged with the opening of the uncorked and/or opened bottle, and wherein the expansion chamber is configured to be in fluid communication with an inside of the uncorked and/or opened bottle when the bottom portion is engaged with the opening of the uncorked and/or opened bottle; and
- an aerating device comprising:
  - a gas conduit having a proximal end in fluid communication with a distal end, wherein the gas conduit is configured to pass through the opening of the bottom portion of the expansion chamber wherein the distal end is locatable below the bottom portion of the expansion chamber while the proximal end is locatable above the bottom portion of the expansion chamber;
  - a gas source in fluid communication with the proximal end of the gas conduit, the gas source supplying the gas conduit through the opening of the top portion of the expansion chamber;
  - an aeration element attached to the distal end of the gas conduit;
- wherein a middle portion of the expansion chamber is larger in cross-sectional area as compared to the bottom portion and the top portion of the expansion chamber, and wherein the expansion chamber is configured to temporarily contain an expansion of bubbles during an aeration process and to include an air gap between the expansion chamber and the aerating device, the air gap configured to allow air to escape through the top portion of the expansion chamber during the aeration process; and
- wherein the expansion chamber and aerating device are not permanently connected as the aerating device is configured to slip down through the opening in the top portion of the expansion chamber, wherein the aerating device can be fully removed from the expansion chamber before, during or after the aeration process by lifting the aeration element up and out of the opening at the top portion of the expansion chamber thereby leaving the expansion chamber engaged with the opening in the bottle and wherein the aerating device is configured to be removably captured by the expansion chamber.

39. The aeration assembly of claim 38, wherein the opening at the bottom portion of the expansion chamber is larger than a maximum width of the aeration element and/or distal end of the gas conduit.

40. The aeration assembly of claim 38, wherein the middle portion of the expansion chamber that is larger in cross-sectional area as compared to the bottom portion and top portion of the expansion chamber has a diameter of at least 2 inches.

41. An aeration assembly for aerating liquids including wine and other alcoholic beverages, the aeration assembly comprising:
- an expansion chamber defined as having a top portion and a bottom portion, wherein both the top portion and the bottom portion have an opening disposed there through, wherein the bottom portion neck down and is configured to be partially disposed inside of and engage an opening of an uncorked and/or opened bottle, wherein the top portion is disposed above the opening of the uncorked and/or opened bottle when the bottom portion is engaged with the opening of the uncorked and/or opened bottle, and wherein the expansion chamber is configured to be in fluid communication with an inside of the uncorked and/or opened bottle when the bottom portion is engaged with the opening of the uncorked and/or opened bottle; and
- an aerating device comprising:
  - a gas conduit having a proximal end in fluid communication with a distal end, wherein the gas conduit is configured to pass through the opening of the bottom portion of the expansion chamber wherein the distal end is locatable below the bottom portion of the expansion chamber while the proximal end is locatable above the bottom portion of the expansion chamber;
  - a gas source in fluid communication with the proximal end of the gas conduit, the gas source supplying the gas conduit through the opening of the top portion of the expansion chamber;
  - an aeration element attached to the distal end of the gas conduit;
- wherein the aerating device is configured to be removably captured by the expansion chamber;
- wherein the expansion chamber is configured to temporarily contain an expansion of bubbles during an aeration process and to include an air gap between the expansion chamber and the aerating device, the air gap configured to allow air to escape through the top portion of the expansion chamber during the aeration process;
- wherein the expansion chamber and aerating device are not permanently connected as the aerating device is configured to slip down through the opening in the top portion of the expansion chamber, wherein the aerating device can be fully removed from the expansion chamber before, during or after the aeration process by lifting the aeration element up and out of the opening at the top portion of the expansion chamber thereby leaving the expansion chamber engaged with the opening in the bottle;
- a sealing element attached to the bottom portion of the expansion chamber, wherein the sealing element is configured to seal against an inside surface of the opening of the uncorked and/or opened bottle, wherein the sealing element comprises an elastic or rubber-like material.

42. The aeration assembly of claim 41, wherein the expansion chamber is optically transparent or translucent.

43. The aeration assembly of claim 41, wherein the expansion chamber includes at least one pour spout.

44. An aeration assembly for aerating liquids including wine and other alcoholic beverages, the aeration assembly consisting essentially of:
- an expansion chamber defined as having a top portion and a bottom portion, wherein both the top portion and the bottom portion have an opening disposed there through, wherein the bottom portion necks down and is configured to be partially disposed inside of and engage an opening of an uncorked and/or opened bottle, wherein the top portion is disposed above the opening of the uncorked and/or opened bottle when the bottom portion is engaged with the opening of the uncorked and/or opened bottle, and wherein the expansion chamber is configured to be in fluid communication with an inside of the uncorked and/or opened bottle when the bottom portion is engaged with the opening of the uncorked and/or opened bottle; and an aerating device comprising:
- a gas conduit having a proximal end in fluid communication with a distal end, wherein the gas conduit is configured to pass through the opening of the bottom portion of the expansion chamber wherein the distal end is locatable below the bottom portion of the expansion chamber while the proximal end is locatable above the bottom portion of the expansion chamber;
- a gas source in fluid communication with the proximal end of the gas conduit, the gas source supplying the gas conduit through the opening of the top portion of the expansion chamber;

wherein the expansion chamber is configured to temporarily contain an expansion of bubbles during an aeration process and to include an air gap between the expansion chamber and the aerating device, the air gap configured to allow air to escape through the top portion of the expansion chamber during the aeration process; and wherein the expansion chamber and aerating device are not permanently connected as the aerating device is configured to slip down through the opening in the top portion of the expansion chamber, wherein the aerating device can be fully removed from the expansion chamber before, during or after the aeration process by lifting the aeration element up and out of the opening at the top portion of the expansion chamber thereby leaving the expansion chamber engaged with the opening of the bottle.

* * * * *

UNITED STATES PATENT AND TRADEMARK OFFICE
CERTIFICATE OF CORRECTION

PATENT NO. : 10,654,007 B2
APPLICATION NO. : 15/230716
DATED : May 19, 2020
INVENTOR(S) : Robert A. Stevenson et al.

Page 1 of 1

It is certified that error appears in the above-identified patent and that said Letters Patent is hereby corrected as shown below:

In the Claims

In Claim 41, Column 38, Line 4, "neck" should be changed to --necks--.

Signed and Sealed this
Twenty-third Day of June, 2020

Andrei Iancu
*Director of the United States Patent and Trademark Office*